US007083071B1

(12) United States Patent
Crisp, III et al.

(10) Patent No.: US 7,083,071 B1
(45) Date of Patent: Aug. 1, 2006

(54) DRINK SUPPLY CANISTER FOR BEVERAGE DISPENSING APPARATUS

(75) Inventors: Harry Lee Crisp, III, Marion, IL (US); Christopher Paul Ramsey, Wantage Oxon (GB); Roger Tanner, Great Dunmow (GB)

(73) Assignee: Beverage Works, Inc., Marion, IL (US)

( * ) Notice: Subject to any disclaimer, the term of this patent is extended or adjusted under 35 U.S.C. 154(b) by 573 days.

(21) Appl. No.: 10/137,608

(22) Filed: May 1, 2002

Related U.S. Application Data

(63) Continuation-in-part of application No. 10/010,108, filed on Nov. 30, 2001, now Pat. No. 6,857,541, which is a continuation-in-part of application No. 09/589,725, filed on Jun. 8, 2000, now Pat. No. 6,751,525.

(51) Int. Cl.
*B67D 5/66* (2006.01)
(52) U.S. Cl. ............... 222/399; 222/482; 222/325; 222/129.3; 251/310; 62/390
(58) Field of Classification Search ............... 222/482, 222/325, 129.3, 399, 394, 525, 522, 549, 222/553, 402.24, 546; 62/390; 251/208, 251/292, 310
See application file for complete search history.

(56) References Cited

U.S. PATENT DOCUMENTS

| | | | |
|---|---|---|---|
| 2,317,548 A | 4/1943 | Miller |
| 2,841,176 A | 7/1958 | Buss |
| 2,859,760 A | 11/1958 | Borell |
| 3,283,530 A | 11/1966 | Bayne et al. |
| 3,409,175 A | 11/1968 | Byrne |
| 3,666,143 A | 5/1972 | Weston |
| 3,878,970 A | 4/1975 | Nezworski |
| 3,896,827 A | 7/1975 | Robinson |
| 3,904,079 A | 9/1975 | Kross |
| 3,938,639 A | 2/1976 | Birrell |
| 3,949,903 A | 4/1976 | Benasutti et al. |
| 3,960,298 A | 6/1976 | Birrell |
| 3,991,911 A | 11/1976 | Shannon et al. |
| 3,995,441 A | 12/1976 | McMillin |
| 4,076,145 A | 2/1978 | Zygiel |
| 4,143,793 A | 3/1979 | McMillin et al. |
| 4,172,669 A | 10/1979 | Edelbach |
| 4,174,872 A | 11/1979 | Fessler |

(Continued)

FOREIGN PATENT DOCUMENTS

DE 39 03 636 A1 8/1990

(Continued)

OTHER PUBLICATIONS

"Sunbeam Joins Microsoft in University Plug and Play Forum," Mar. 23, 2000.

(Continued)

*Primary Examiner*—Joseph A. Fischetti
(74) *Attorney, Agent, or Firm*—Bell, Boyd & Lloyd, LLC

(57) ABSTRACT

A drink supply canister for a beverage dispensing apparatus. The drink supply canister includes a removable valve assembly member having a drink supply outlet valve and a gas inlet valve. The beverage dispensing apparatus pressurizes the drink supply canister by supplying gas to the gas inlet valve. The beverage dispensing apparatus includes a drink supply canister holder for holding a plurality of such drink supply canisters. The beverage dispensing apparatus directs a supply of water and gas to the drink supply canister holder for producing carbonated and non-carbonated beverages.

32 Claims, 59 Drawing Sheets

U.S. PATENT DOCUMENTS

| | | |
|---|---|---|
| 4,181,242 A | 1/1980 | Zygiel et al. |
| RE30,301 E | 6/1980 | Zygiel |
| 4,213,338 A | 7/1980 | Hardy |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,264,019 A | 4/1981 | Roberts et al. |
| 4,265,376 A | 5/1981 | Skidell |
| 4,269,330 A | 5/1981 | Johnson |
| 4,333,587 A | 6/1982 | Fessler et al. |
| 4,341,382 A | 7/1982 | Arnold |
| 4,354,613 A | 10/1982 | Desai et al. |
| 4,377,246 A | 3/1983 | McMillin et al. |
| 4,392,588 A | 7/1983 | Scalera |
| 4,413,752 A | 11/1983 | McMillin et al. |
| 4,440,382 A * | 4/1984 | Pruvot et al. ............... 251/248 |
| 4,458,584 A | 7/1984 | Annese et al. |
| 4,466,342 A | 8/1984 | Basile et al. |
| 4,475,448 A | 10/1984 | Shoaf et al. |
| 4,496,078 A | 1/1985 | Nelzow et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,566,287 A | 1/1986 | Schmidt et al. |
| 4,568,081 A * | 2/1986 | Martin ....................... 473/611 |
| 4,577,782 A | 3/1986 | Fessler |
| 4,582,223 A | 4/1986 | Kobe |
| RE32,179 E | 6/1986 | Sedam et al. |
| 4,651,862 A | 3/1987 | Greenfield, Jr. |
| 4,658,988 A | 4/1987 | Hassell |
| 4,687,120 A | 8/1987 | McMillin |
| 4,709,835 A | 12/1987 | Kruger et al. |
| 4,711,374 A | 12/1987 | Gaunt et al. |
| 4,719,056 A | 1/1988 | Scott |
| 4,726,494 A | 2/1988 | Scott |
| 4,747,516 A | 5/1988 | Baker |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,860,923 A | 8/1989 | Kirschner et al. |
| 4,866,949 A | 9/1989 | Rudick |
| 4,901,887 A * | 2/1990 | Burton ....................... 222/131 |
| 4,921,315 A | 5/1990 | Metcalfe et al. |
| 4,930,666 A | 6/1990 | Rudick |
| 4,932,564 A | 6/1990 | Austin et al. |
| 4,936,331 A | 6/1990 | Sundberg |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,974,643 A | 12/1990 | Bennett et al. |
| 4,979,641 A | 12/1990 | Turner |
| 4,982,876 A | 1/1991 | Scott |
| 4,993,604 A | 2/1991 | Gaunt et al. |
| 5,000,357 A | 3/1991 | Shannon et al. |
| 5,007,560 A | 4/1991 | Sassak |
| 5,033,645 A | 7/1991 | Shannon et al. |
| 5,040,106 A | 8/1991 | Maag |
| 5,044,171 A | 9/1991 | Farkas |
| 5,118,009 A | 6/1992 | Novitsky |
| 5,129,548 A | 7/1992 | Wisniewski |
| 5,129,549 A | 7/1992 | Austin |
| 5,139,708 A | 8/1992 | Scott |
| 5,156,301 A | 10/1992 | Hassell et al. |
| 5,156,823 A | 10/1992 | Hori et al. |
| 5,156,871 A | 10/1992 | Goulet et al. |
| 5,165,575 A * | 11/1992 | Scott ....................... 222/129.1 |
| 5,181,540 A | 1/1993 | Campau |
| 5,190,083 A | 3/1993 | Gupta et al. |
| 5,190,189 A | 3/1993 | Zimmer et al. |
| 5,193,718 A | 3/1993 | Hassell et al. |
| 5,203,474 A | 4/1993 | Haynes |
| 5,228,312 A | 7/1993 | Williams |
| 5,228,486 A | 7/1993 | Henninger |
| 5,240,144 A | 8/1993 | Feldman |
| 5,263,509 A | 11/1993 | Cherry et al. |
| 5,269,156 A | 12/1993 | van de Velde et al. |
| 5,269,442 A | 12/1993 | Vogel |
| 5,280,711 A | 1/1994 | Motta et al. |
| 5,297,400 A | 3/1994 | Benton et al. |
| 5,303,846 A | 4/1994 | Shannon |
| 5,320,817 A | 6/1994 | Hardwick et al. |
| 5,343,716 A | 9/1994 | Swanson et al. |
| 5,368,198 A | 11/1994 | Goulet |
| 5,392,960 A | 2/1995 | Kendt et al. |
| 5,411,179 A | 5/1995 | Oyler et al. |
| 5,417,146 A | 5/1995 | Zimmer et al. |
| 5,437,395 A | 8/1995 | Bull et al. |
| 5,454,406 A | 10/1995 | Rejret et al. |
| 5,507,420 A * | 4/1996 | O'Neill ....................... 222/635 |
| 5,538,160 A | 7/1996 | Ziesel |
| 5,542,265 A | 8/1996 | Rutland |
| 5,553,755 A | 9/1996 | Bonewald et al. |
| 5,568,882 A | 10/1996 | Takacs |
| 5,570,587 A | 11/1996 | Kim |
| 5,575,405 A | 11/1996 | Stratton et al. |
| 5,603,230 A | 2/1997 | Tsai |
| 5,607,083 A | 3/1997 | Vogel et al. |
| 5,608,643 A | 3/1997 | Wichter et al. |
| 5,611,867 A | 3/1997 | Cooper et al. |
| 5,626,407 A | 5/1997 | Westcott |
| 5,647,512 A | 7/1997 | deOliveira et al. |
| 5,667,110 A | 9/1997 | McCann et al. |
| 5,694,794 A | 12/1997 | Jerg et al. |
| 5,699,328 A | 12/1997 | Ishizaki et al. |
| 5,706,191 A | 1/1998 | Bassett et al. |
| 5,706,976 A | 1/1998 | Purkey |
| 5,721,693 A | 2/1998 | Song |
| 5,732,563 A | 3/1998 | Bethuy et al. |
| 5,743,432 A | 4/1998 | Barbe |
| 5,743,433 A | 4/1998 | Hawkins et al. |
| 5,745,366 A | 4/1998 | Higham et al. |
| RE35,780 E | 5/1998 | Hassell et al. |
| 5,785,740 A | 7/1998 | Brugerolle et al. |
| 5,791,517 A | 8/1998 | Avital |
| 5,791,523 A | 8/1998 | Oh |
| 5,797,519 A | 8/1998 | Schroeder |
| 5,829,085 A | 11/1998 | Jerg et al. |
| 5,839,454 A | 11/1998 | Matz |
| 5,845,815 A | 12/1998 | Vogel |
| 5,855,296 A | 1/1999 | McCann et al. |
| 5,862,961 A | 1/1999 | Motta et al. |
| 5,875,930 A | 3/1999 | Nakajima et al. |
| 5,899,245 A | 5/1999 | Wrigley et al. |
| 5,901,884 A | 5/1999 | Goulet et al. |
| 5,907,285 A | 5/1999 | Toms et al. |
| 5,915,407 A | 6/1999 | West |
| 5,920,801 A | 7/1999 | Thomas et al. |
| 5,956,967 A | 9/1999 | Kim |
| 5,967,367 A | 10/1999 | Orsborn |
| 5,979,668 A | 11/1999 | Kane et al. |
| 5,979,694 A | 11/1999 | Bennett et al. |
| 5,980,959 A | 11/1999 | Frutin |
| 5,987,105 A | 11/1999 | Jenkins et al. |
| 5,993,739 A | 11/1999 | Lyon |
| 5,997,617 A * | 12/1999 | Czabala et al. ............... 96/130 |

| | | | |
|---|---|---|---|
| 6,003,078 A | 12/1999 | Kodimer et al. | |
| 6,012,450 A | 1/2000 | Rubsamen | |
| 6,036,166 A | 3/2000 | Olson | |
| 6,039,219 A | 3/2000 | Bach et al. | |
| 6,041,970 A | 3/2000 | Vogel | |
| 6,056,194 A | 5/2000 | Kolls | |
| 6,085,740 A | 7/2000 | Ivri et al. | |
| 6,101,452 A | 8/2000 | Krall et al. | |
| 6,138,693 A | 10/2000 | Matz | |
| 6,155,457 A * | 12/2000 | Landa et al. | 222/94 |
| 6,161,059 A | 12/2000 | Tedesco et al. | |
| 6,176,399 B1 * | 1/2001 | Schantz et al. | 222/484 |
| 6,181,981 B1 | 1/2001 | Varga et al. | |
| 6,204,763 B1 * | 3/2001 | Sone | 340/568.1 |
| 6,213,148 B1 * | 4/2001 | Wadsworth et al. | 137/556 |
| 6,217,004 B1 * | 4/2001 | Tanner | 251/209 |
| 6,230,767 B1 | 5/2001 | Nelson | |
| 6,234,223 B1 | 5/2001 | Nelson | |
| 6,237,812 B1 | 5/2001 | Fukada | |
| 6,264,548 B1 | 7/2001 | Payne et al. | |
| 6,305,269 B1 | 10/2001 | Stratton | |
| 6,321,985 B1 | 11/2001 | Kolls | |
| 6,377,868 B1 | 4/2002 | Gardner, Jr. | |
| 6,394,311 B1 | 5/2002 | McCann et al. | |
| 6,411,462 B1 | 6/2002 | Ostwald et al. | |
| 6,491,047 B1 | 12/2002 | Abe | |
| 6,526,824 B1 | 3/2003 | Chase et al. | |
| 6,536,224 B1 | 3/2003 | Frank et al. | |
| 6,536,626 B1 | 3/2003 | Newman et al. | |
| 6,581,804 B1 | 6/2003 | Ciavarella et al. | |
| 6,607,105 B1 * | 8/2003 | Phelps et al. | 222/400.8 |
| 6,690,979 B1 | 2/2004 | Smith | |
| 6,751,525 B1 | 6/2004 | Crisp, III | |
| 6,766,656 B1 | 7/2004 | Crisp, III et al. | |
| 6,798,997 B1 | 9/2004 | Hayward et al. | |
| 6,799,085 B1 | 9/2004 | Crisp, III | |
| 6,848,600 B1 | 2/2005 | Crisp, III | |
| 6,857,541 B1 | 2/2005 | Crisp, III | |
| 6,896,159 B1 | 5/2005 | Crisp, III et al. | |
| 6,915,925 B1 | 7/2005 | Crisp, III et al. | |
| 2001/0049846 A1 | 12/2001 | Guzzi et al. | |
| 2002/0161652 A1 | 10/2002 | Paullin et al. | |
| 2004/0250564 A1 | 12/2004 | Crisp, III et al. | |
| 2005/0177454 A1 | 8/2005 | Crisp, III | |
| 2005/0177481 A1 | 8/2005 | Crisp, III | |
| 2005/0178144 A1 | 8/2005 | Crisp, III | |

FOREIGN PATENT DOCUMENTS

| | | |
|---|---|---|
| EP | 0 301 169 A1 | 2/1989 |
| EP | 0166 586 B1 | 1/1991 |
| EP | 0 236 633 B1 | 5/1991 |
| EP | 0 478 624 B1 | 4/1992 |
| GB | 2 067 800 A | 7/1981 |
| JP | 3-134455 | 6/1991 |
| JP | 4-363570 | 12/1992 |
| WO | WO 89/05029 | 6/1989 |
| WO | WO 89/11443 | 11/1989 |
| WO | WO 91/00238 | 1/1991 |
| WO | WO 95/11855 | 5/1995 |
| WO | WO 99/03776 | 1/1999 |
| WO | WO 99/26860 | 6/1999 |
| WO | WO 99/65818 | 12/1999 |
| WO | WO 01/11281 A1 | 2/2001 |

OTHER PUBLICATIONS

Steiner, Rupert, "Coke chief's latest Daft idea—a cola tap in every house," Sunday Times, Mar. 18, 2001.
Brown, Erika, "Best of the Web—General Electric," Forbes, May 21, 1001, p. 80.
"Whirlpool Internet-Enabled Appliances to Use Beeline Shopper Software Features," Feb. 16, 2001.
Fisher, Daniel, "Gone Flat," Forbes, Oct. 15, 2001, pp. 76-79.
Soda—Club Enterprises from www.sodaclubenterprise.com printed on May 2, 2000.
Wunder-Bar Dispensing Systems from www.wunderbar.com printed on May 2, 2000.
Swiss Mountain Coffees from www.ecommerce.dewpointinc.com printed on May 30, 2000.
BreakMate™ from www.bestrom.com printed on May 30, 2000.
Margherita2000.com from www.margherita2000.com printed Jan. 26, 2001.
Symbol from www.symbol.com printed on Dec. 12, 2000.
Wardell, Charles, "Help for Hurried Cooks?" Popular Science, May, 2000, p. 32.
BevStar Point of Use Water Model Advertisement.
Isoworth Beverage Dispensing Technology Worldwide Company Brochure.
BevStar Bottled Water Model Advertisement.
"The fridge *that makes shopping* 'Cool'," from www.icl.com printed on May 2, 2000.
The FuzzyLogic Beverage Dispenser—Remote Controlled or for Water Self-Service from www.bonator.com printed on May 2, 2000.
Tour A Virtual Trade Show from appliancemagazine.com printed on May 2, 2000.
Beverage Express from www.beverageexperss.com printed on May 2, 2000.
Isoworth Beverage Dispensing Technology Worldwide from www.bevstar.com printed on May 22, 2000.
"Co's Join On Home Web Wiring Network," from http://content.../content.asp printed on Jun. 7, 2000.

* cited by examiner

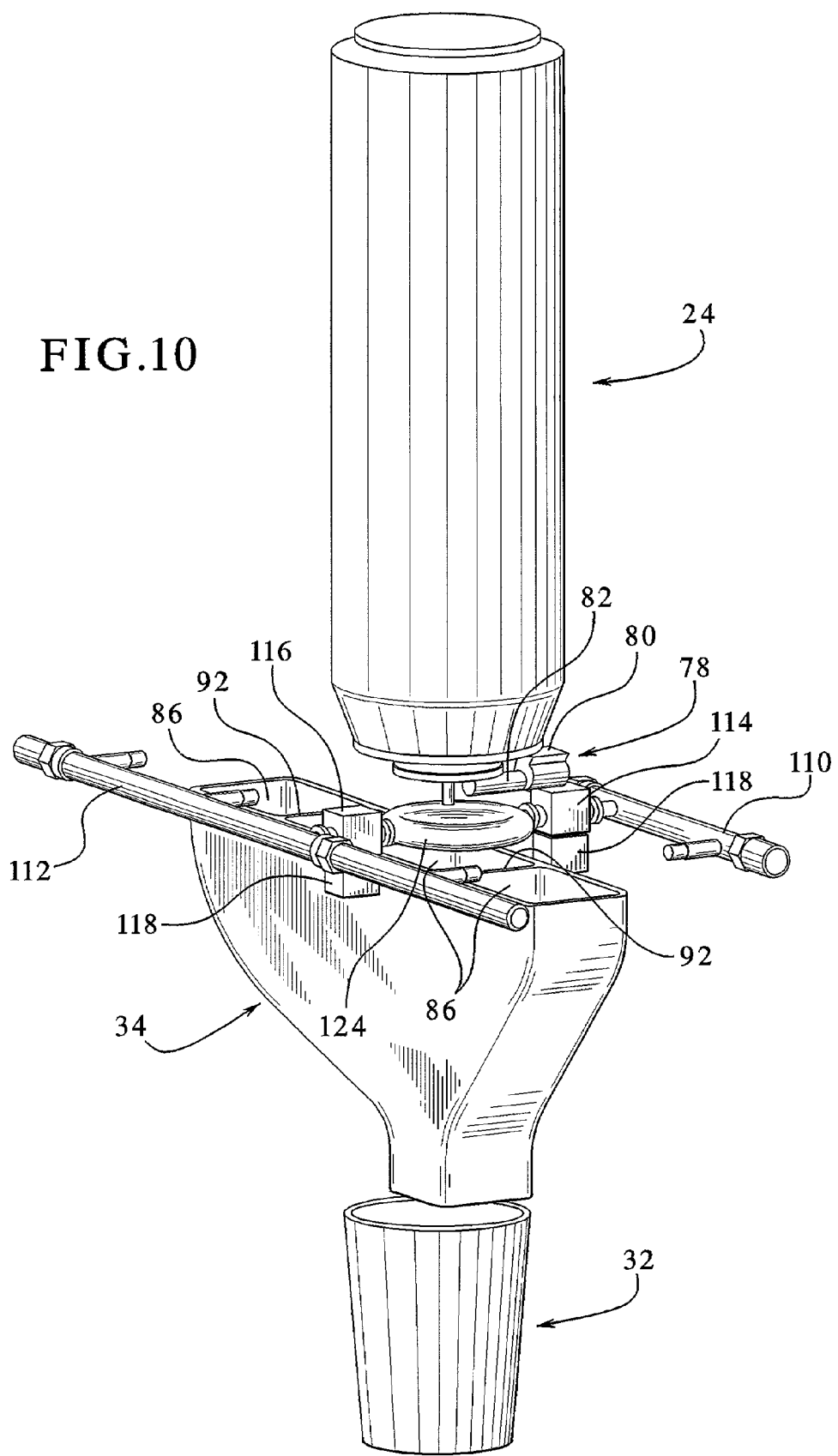

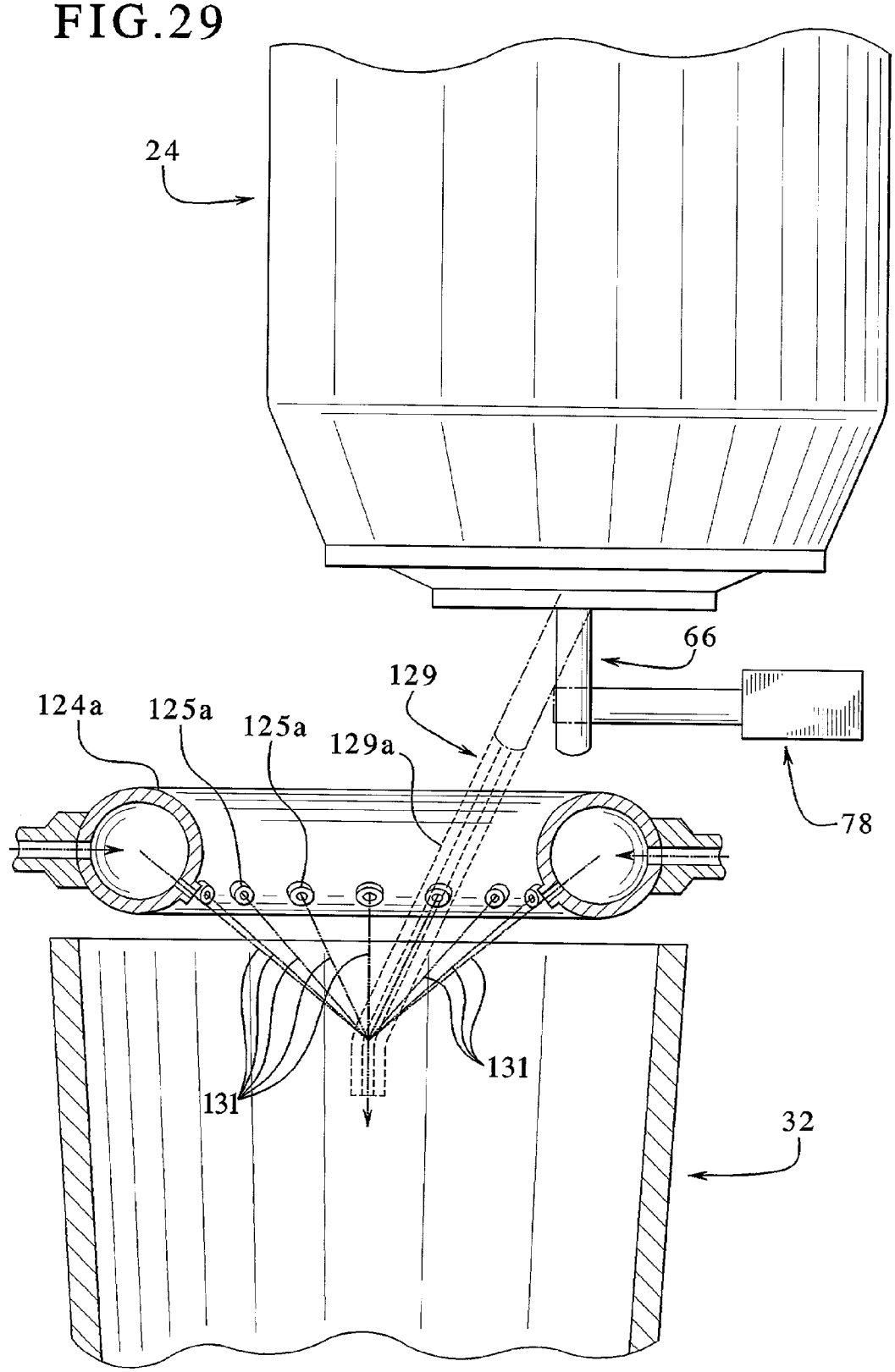

FIG.34
FIG.35
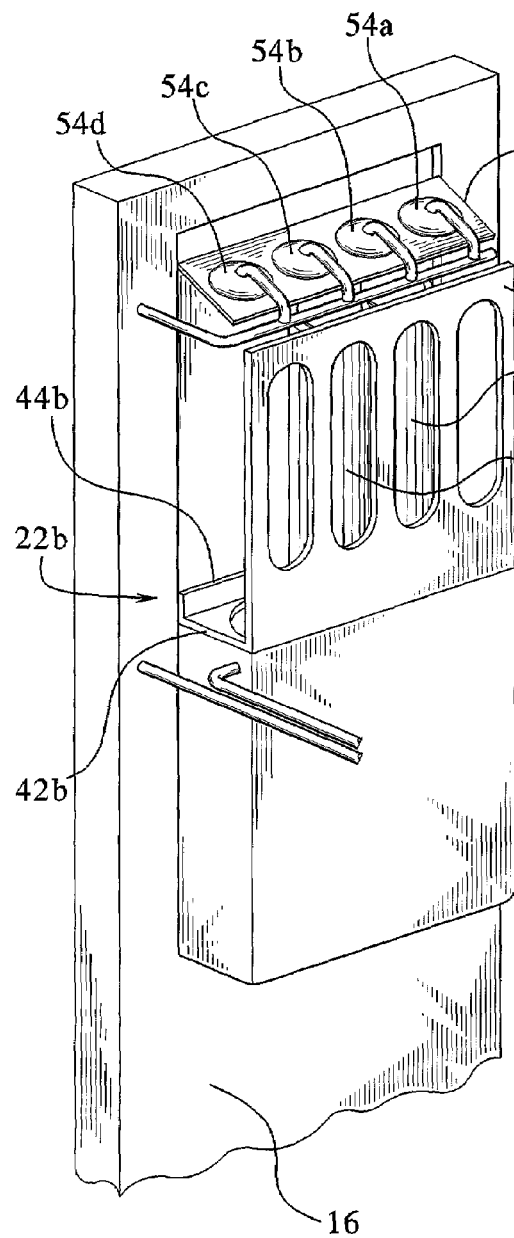
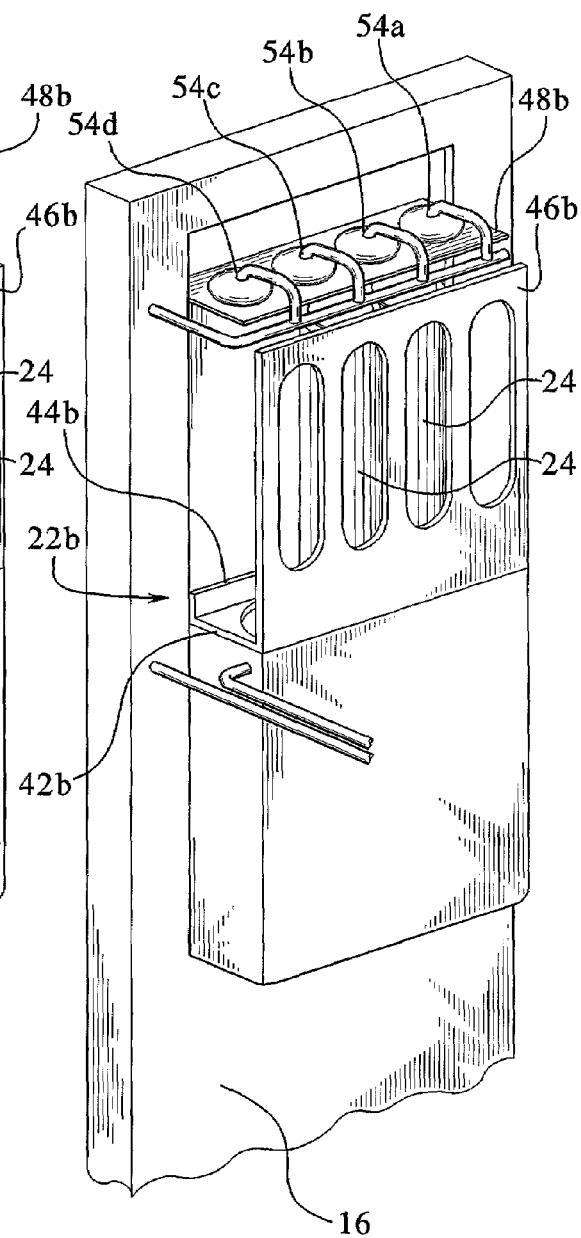

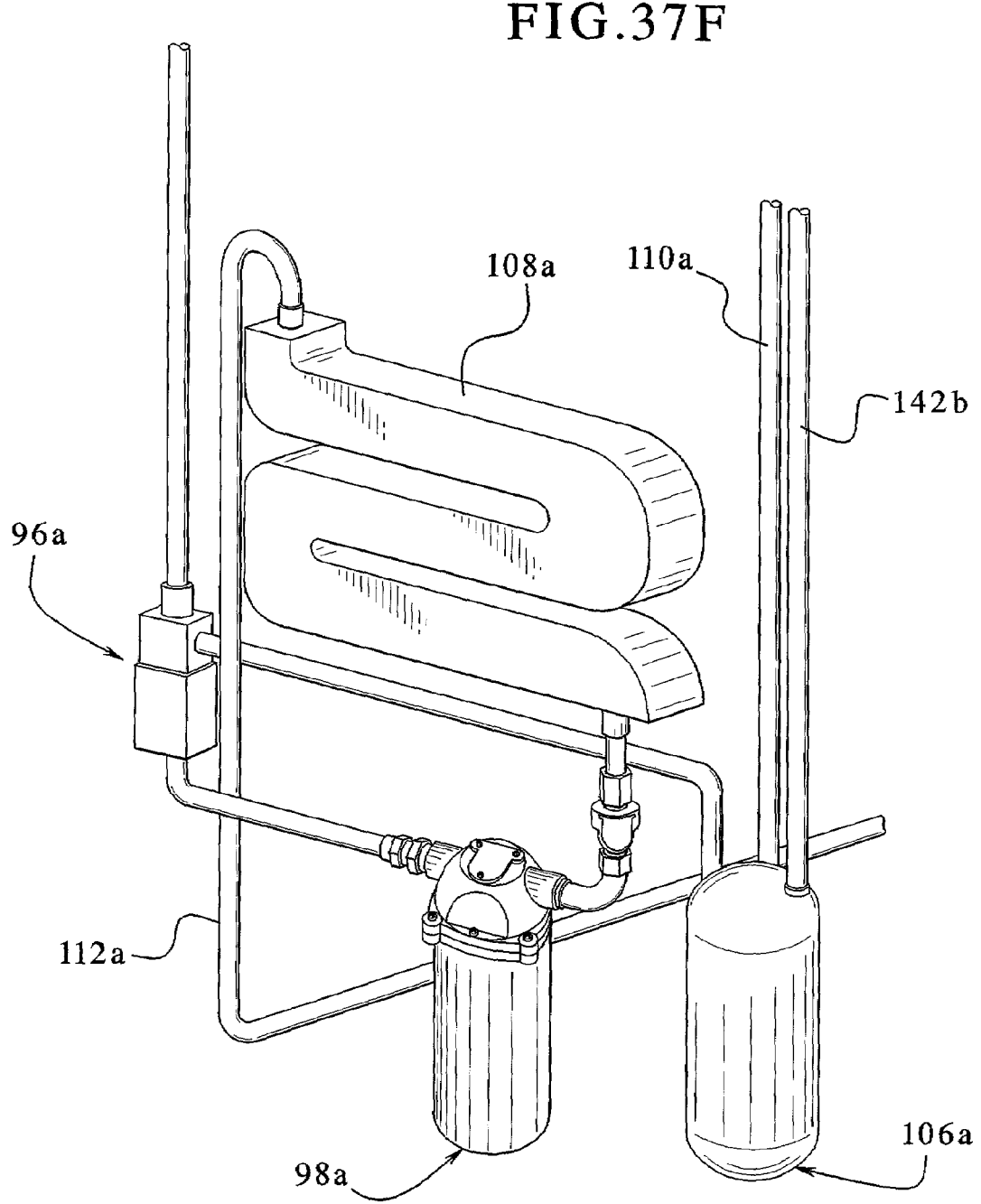

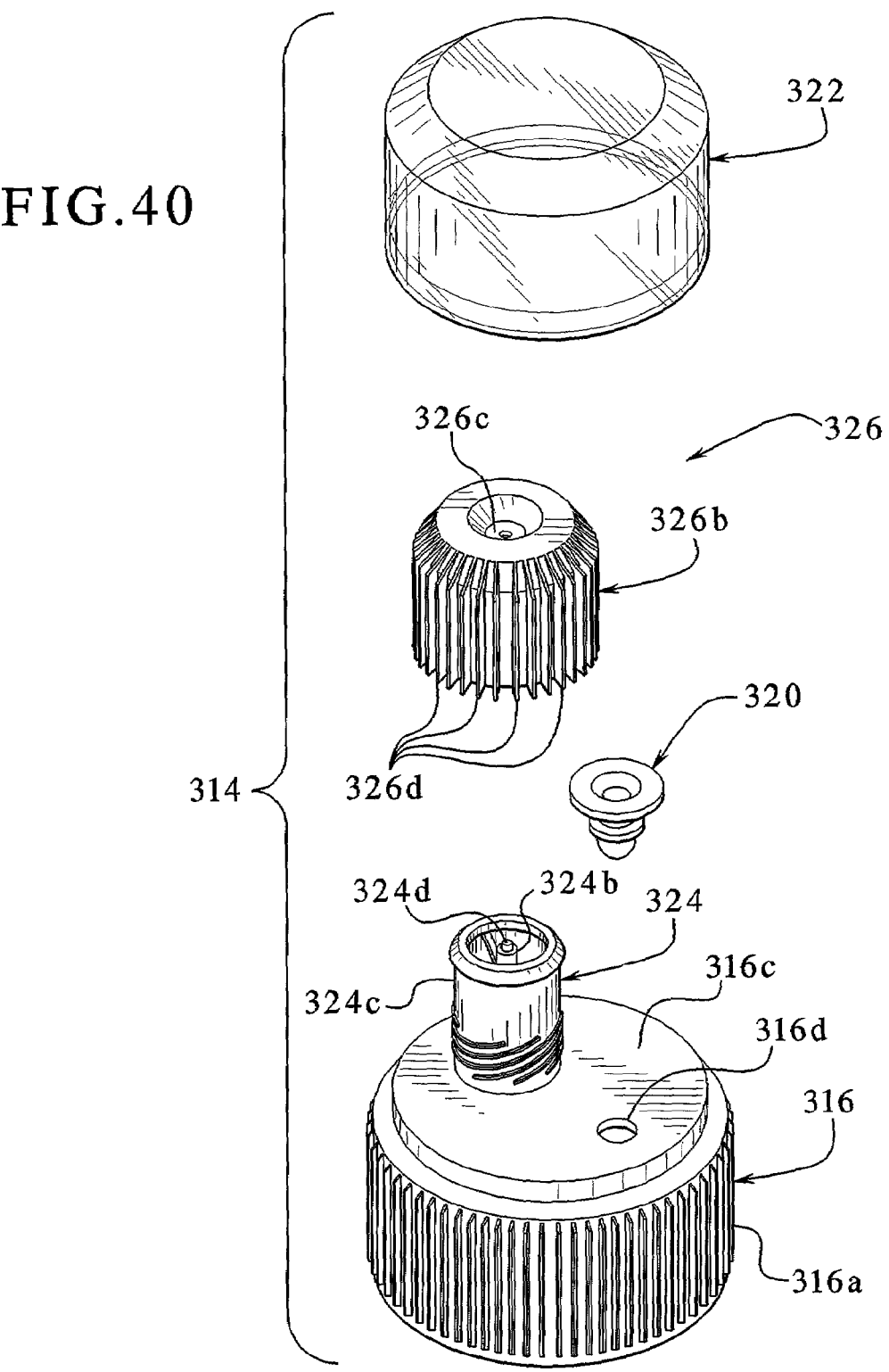

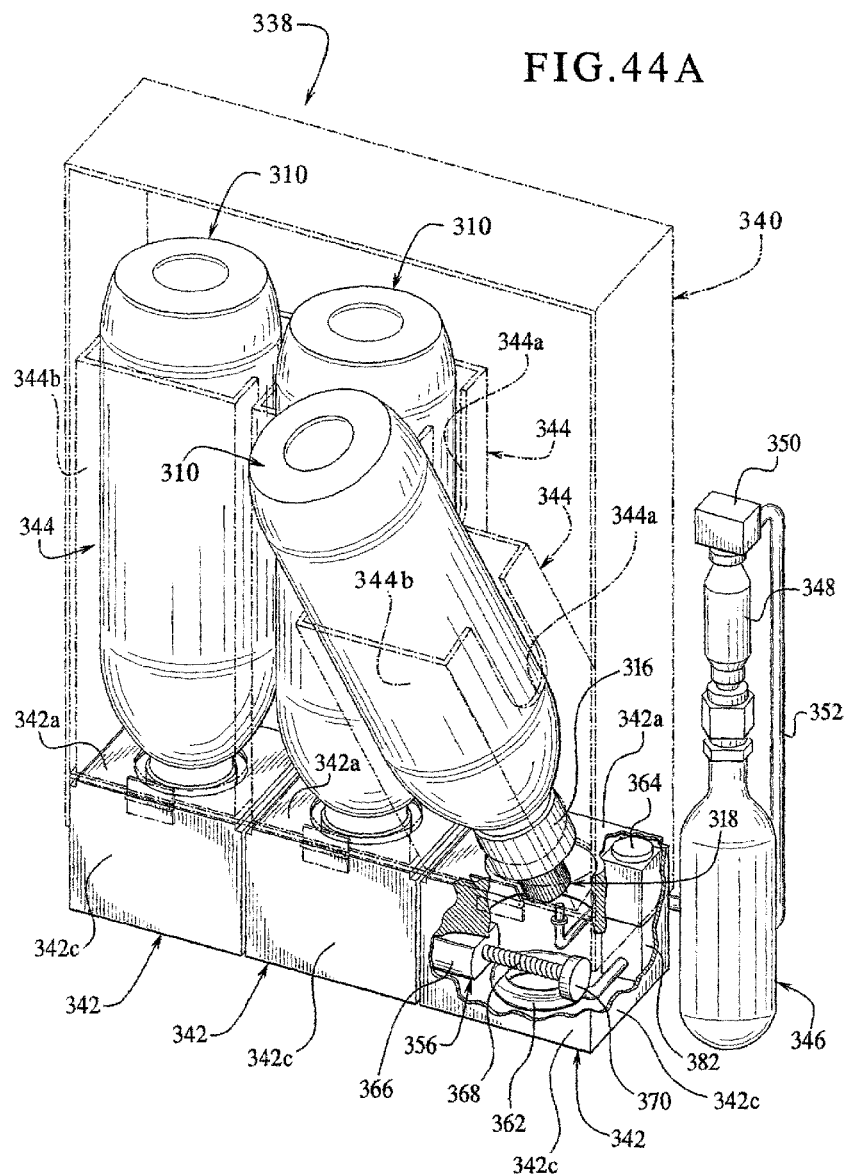

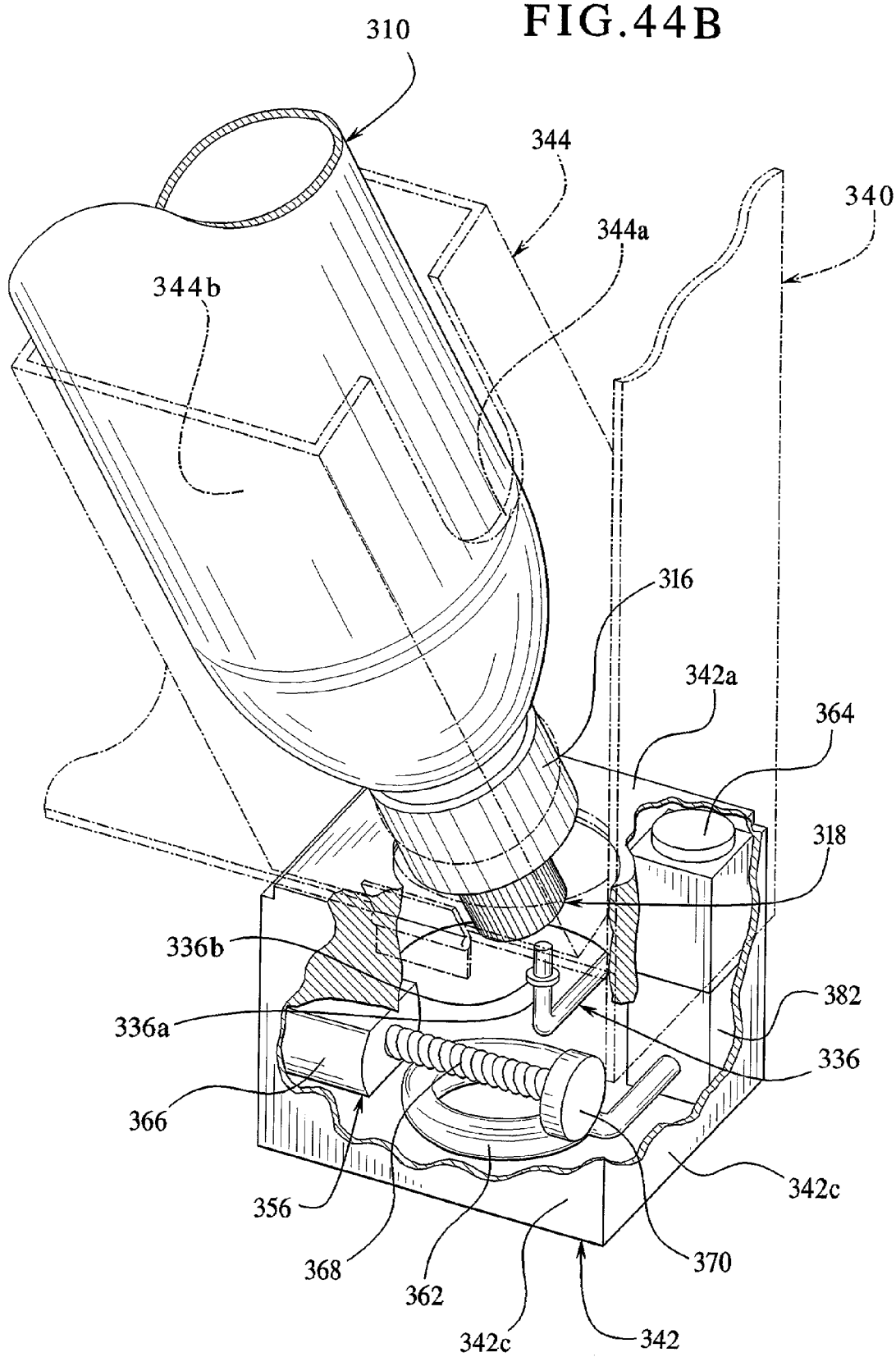

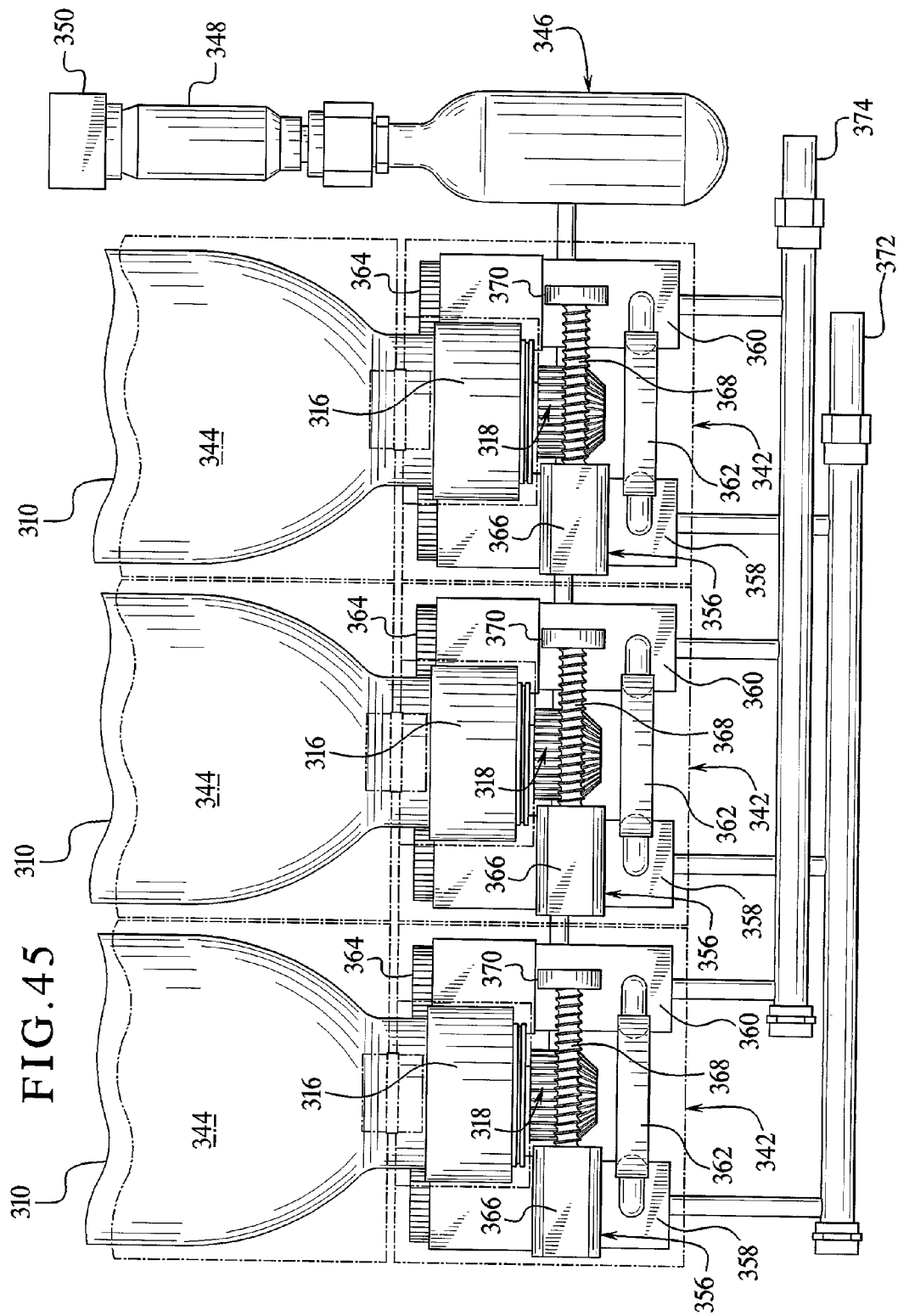

DRINK SUPPLY CANISTER FOR BEVERAGE DISPENSING APPARATUS

PRIORITY CLAIM

This application is a continuation-in-part of and claims the benefit of U.S. patent application Ser. No. 10/010,108, filed Nov. 30, 2001 now U.S. Pat. No. 6,857,541 which is a continuation-in-part of and claims the benefit of U.S. patent application Ser. No. 09/589,725, filed Jun. 8, 2000, now U.S. Pat. No. 6,751,525 both of which are hereby incorporated by reference in their entirety and relied upon.

CROSS REFERENCES TO RELATED APPLICATIONS

This application is related to the following commonly owned co-pending patent applications: "Beverage Distribution and Dispensing System and Method," Ser. No. 09/589,725, "Drink Supply Canister for Beverage Dispensing Apparatus," Ser. No. 10/010,108, "Appliance Supply Distribution, Dispensing and Use System and Method," Ser. No. 10/035,734, "Beverage Dispensing Apparatus," Ser. No. 10/007,419, "Beverage Dispensing Apparatus Having Fluid Director," Ser. No. 10/007,059, "Beverage Dispensing Apparatus Having Drink Supply Canister Holder," Ser. No. 10/011,173, and "Beverage Dispensing Apparatus Having Carbonated And Non-Carbonated Water Supplier," Serial No. 10/007,438.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a drink supply canister for beverage dispensing apparatus, and in particular to a drink supply canister for beverage dispensing apparatus for a residential refrigerator which produces and dispenses carbonated and non-carbonated beverages from a plurality of the drink supply canisters.

BACKGROUND OF THE INVENTION

Many households in the United States and throughout the world consume large volumes of beverages such as soft drinks, sodas, juices, lemonade, teas, isotonics, fruit drinks and other beverages on a daily basis. For instance, in 1998 retail sales of soft drinks in the United States were approximately 54 billion dollars, retail sales of fruit drinks in the United States were approximately 17.5 billion dollars and retail sales of isotonics in the United States were approximately 2.25 billion dollars.

Manufacturers in the beverage industry produce packaged beverages for consumers in the form of bottles, cans and cartons. They also produce liquid and powder beverage concentrates which require consumer preparation. Preparing beverages from concentrate by hand can be burdensome, time consuming and monotonous. Producing carbonated beverages from concentrate in homes using know commercial equipment is impractical because special equipment and supplies are required. Such home mixed beverages are often of inconsistent quality and flavor.

For those who choose not to prepare beverages from concentrates, maintaining an adequate supply of packaged ready-to-drink beverages can be relatively burdensome for families which experience a large consumption of beverages. Beverage containers, consisting largely of water, are somewhat heavy, and such beverage containers occupy substantial space in refrigerators. In many families, at least once per week, family members stock their refrigerators with packaged beverages because of limited refrigerator space. The amount of available refrigerator space limits a family's supply of refrigerated ready-to-drink beverages.

One way of minimizing a family's beverage supply tasks is by using a refrigerator which produces and dispenses ready-to-drink beverages. A number of beverage dispensing devices have been proposed specifically for household refrigerators, some of which involve producing carbonated beverages. The most common device enables consumers to dispense water and ice from a dispenser built into the exterior of a refrigerator door. Such types of dispensers are disclosed in U.S. Pat. Nos. 5,956,967 and 6,039,219. Other dispensers enable consumers to dispense ready-to-drink beverages. Certain of these devices involve a connection between a beverage container in the refrigerator and a spout attached to the outside of the refrigerator. Pumping and other approaches have also been suggested to move the ready-to-drink beverage from the container through the spout. Devices such as these are disclosed in U.S. Pat. Nos. 5,791,523, 5,791,517, 5,542,265 and 4,930,666.

One refrigerator dispenser, disclosed in U.S. Pat. No. 3,949,903, involves the mixing of syrup and water and the dispensing of non-carbonated beverages. Another refrigerator dispenser disclosed in U.S. Reissue Patent No. Re. 32,179 involves the mixing of syrup and carbonated water and the dispensing of carbonated beverages.

One problem with these refrigerator dispensers is the need to clean them. Since the refrigerator dispensers house and distribute consumable beverages, the dispenser components which come into contact with fluids must be cleaned to avoid bacteria growth and other contamination. The existing refrigerator dispensers include a relatively high number of separate components which require regular cleansing to prevent contamination. Furthermore, many of the components are not removable, and many are difficult to fully clean. Therefore, it is inconvenient and in many cases not possible to fully clean the components of the currently known refrigerator dispensers without disassembling these dispensers.

Although known refrigerator devices may enable users to dispense carbonated and non-carbonated beverages from residential refrigerators, the construction of these devices is relatively complex, and the use, supply and maintenance of these devices is relatively inconvenient, cumbersome, time consuming and generally impractical. Additionally, such know devices do not solve problems such as cross-contamination of different beverages. Thus, while the patents indicated above disclose beverage dispensing mechanisms, there is no known commercially available refrigerator system for dispensing ready-to-drink beverages which eliminate cross-contamination problems.

Dispensing machines in commercial establishments are also well known for producing concentrate-based beverages. These machines, often found in restaurants and eateries, typically involve the mixing of syrup and carbonated or non-carbonated water and the dispensing of beverages, such as soda. Commercial machines such as these are disclosed in U.S. Pat. Nos. 5,647,512, 5,392,960 and 4,993,604. However, such commercial machines have not been suitably adapted for residential or home use or use in conjunction with residential refrigerators.

Countertop units for dispensing beverages have also been developed. For instance, Bev Star, Inc. produces a three drink countertop dispenser. However, such countertop units take up substantial additional counter space which is highly undesirable in most households. These devices also only dispense a limited number of drinks. Such countertop units may have valve brixing problems, mechanical failures and general reliability issues. Countertop units also utilize mechanical refrigeration to chill the water, which adds tremendous costs to the potential home consumer, thus adding to the impracticability of the application for the home user.

Accordingly, the assignee of the present invention owns U.S. patent application Ser. No. 09/589,725 entitled "Beverage Distribution and Dispensing System and Method" which discloses and claims a beverage distribution and dispensing system which enables users to dispense a plurality of beverages from a residential refrigerator, which tracks beverage consumption and the use of the drink supply and $CO_2$ supply, which automatically orders drink supply and $CO_2$ supply as necessary, which facilitates the delivery of drink supply and $CO_2$ supply to the users, which enables the users to determine beverage consumption and to change the dispensed beverages, and which reduces the need to store conventional beverage containers in the refrigerators of the users.

The present invention provides an improved beverage dispensing apparatus which is adapted to be used in conjunction with the beverage distribution system disclosed in that U.S. patent application.

SUMMARY OF THE INVENTION

The beverage dispensing apparatus of the present invention is preferably housed within a residential refrigerator to enable consumers to practically, conveniently and reliably produce and dispense non-carbonated and carbonated beverages from their refrigerators. The dispensing apparatus also facilitates the commercial availability and standardized manufacture and distribution of drink supply canisters and $CO_2$ gas supply canisters for residential refrigerators.

For purposes of this application, the term: (a) "user" or "users" includes users of the beverage dispensing apparatus of the present invention such as users, consumers, household members and other operators of the apparatus; (b) "beverage dispensing apparatus" is alternatively referred to as "dispensing apparatus" or "beverage dispenser"; (c) "beverage" includes any ready-to-drink liquid; and (d) "drink supply" includes any liquid, which in and of itself, is a ready-to-drink liquid or any liquid or non-liquid which requires the addition of carbonated or non-carbonated water or other fluid(s) in order to become a ready-to-drink beverage including, but not limited to, any syrup or concentrate which consists of predetermined percentages of water and flavoring or sugar.

Generally, one embodiment of the beverage dispensing apparatus of the present invention includes: (a) a drink supplier including a drink supply canister holder for holding or maintaining at least one and preferably a plurality of drink supply canisters, and at least one and preferably a plurality of valve actuators for causing the drink supply to be selectively released from the drink supply canisters; (b) a water supplier for selectively supplying carbonated water and non-carbonated water for producing the beverages; (c) a gas supplier for supplying $CO_2$ gas to carbonate the carbonated water provided by the water supplier, and in one embodiment, for supplying $CO_2$ gas or other gas for pressurizing the drink supply canisters to provide a consistent flow rate of the drink supply from the drink supply canisters; (d) a beverage container compartment for holding a beverage collector or container such as a glass, cup or pitcher; (e) in one embodiment, a fluid director for facilitating the mixing of the drink supply from one of the drink supply canisters and the carbonated or non-carbonated water from the water supplier and for directing the mixed beverage to the beverage container compartment; (f) a controller or dispensing computer or processor for controlling and tracking the dispensing of drink supply and carbonated or non-carbonated water; and (g) one or more suitable beverage requesters (such as indicators, actuators, buttons, a touch panel or a touch screen) for enabling users to request one of a plurality of beverages.

In one alternative embodiment of the present invention, the gas supplier includes an air pressurizer or pressurization device for pressurizing the drink supply canisters to reduce the volume of $CO_2$ gas used by the dispensing apparatus.

In one preferred alternative embodiment, the drink supply and carbonated or non-carbonated water is directed directly to a beverage container in the beverage container compartment (i.e., without a fluid director) to eliminate any potential cross-contamination and the need to regularly clean the fluid director. These and other alternative embodiments of the present invention are discussed in more detail below.

Generally, in operation, after the user installs the drink supply canisters, the $CO_2$ gas or other pressurized gas from the gas supplier pressurizes the drink supply canisters. When a user desires to obtain a beverage, the user makes the user's request through the beverage requester which is preferably connected to or in communication with the dispensing computer or controller. The controller determines the user's request and generates a beverage dispense signal. Upon receiving a beverage dispense signal from the controller, the appropriate drink supply outlet valve actuator associated with the appropriate drink supply outlet valve in the appropriate drink supply canister opens for a predetermined period of time to dispense the appropriate amount of drink supply from the drink supply canister. This drink supply is directed into one of the channels of the fluid director (or in the alternative embodiment directly into the beverage container). Simultaneously, upon receiving a beverage request signal from the controller, the water supplier directs the appropriate amount of carbonated or non-carbonated water into the same channel of the fluid director (or in the alternative embodiment directly into the same beverage container). The drink and the carbonated or non-carbonated water mix in that channel of the fluid director (or in the alternative embodiment, mix as both the drink supply and carbonated or non-carbonated water are directed into the beverage container), and the fluid director directs the mixed drink supply and the carbonated or non-carbonated water (i.e., the beverage) to the beverage container compartment.

The drink supply canister holder is preferably built into or constructed within the freezer compartment door or refrigerator compartment door, and includes drink supply canister slots or areas for receiving and holding the plurality of drink supply canisters. The drink supply canister holder enables users to remove used drink supply canisters and insert new drink supply canisters into the drink supply canister holder.

In one preferred embodiment of the present invention, the drink supply canister is a pressurizable encasement which has a gas inlet valve and a drink supply outlet valve. One embodiment of the gas inlet valve is a spring activated valve which is predisposed to be normally closed to prevent the flow of gas into or out of the drink supply canister. When the gas inlet valve is depressed or activated, gas such as $CO_2$ or pressurized air is communicated through the gas inlet valve into the drink supply canister. One embodiment of the drink supply outlet valve includes a sealing member which is positioned in the bottom wall or end of the canister such that the sealing member can be tilted or displaced horizontally. The drink supply outlet valve maintains a seal on the inside of the canister when the drink supply canister is pressurized. When the sealing member is displaced, the sealing member unseats, and the drink supply outlet valve opens and causes pressurized drink supply to flow from the drink supply canister. One or more valve actuators are mounted to or adjacent to the drink supply canister holder. When a user activates a beverage requester, a controller causes one of the valve actuators to engage and displace the sealing member of the drink supply outlet valve for a predetermined amount of time, which in turn causes drink supply to flow from the drink supply canister. After a predetermined time period elapses, the valve actuator disengages the sealing member, stopping the flow of drink supply from the drink supply canister. It should be appreciated that the present invention contemplates alternative suitable gas inlet valves, drink supply outlet valves and drink supply outlet valve actuators as discussed below.

The water supplier of the present invention provides carbonated and non-carbonated water to the fluid director or directly to the beverage container in the beverage container compartment for mixing the beverages. The water supplier is connected to a drinkable water source, such as a conventional cold water source commonly available in residential kitchens. One embodiment of the water supplier includes a holding tank which stores a sufficient supply of water. The water supply from the holding tank is used if a user requests the dispensing apparatus to dispense non-carbonated water alone or if the dispensing apparatus requires substantial amounts of non-carbonated water. The water supplier also includes a carbonation tank connected to the gas supplier. The carbonation tank uses $CO_2$ gas obtained from the $CO_2$ gas supply canister and particularly the gas supplier to carbonate the water.

In one embodiment, a carbonated water supply line and a non-carbonated water supply line are each separately mounted above the fluid director or directly above the beverage container compartment. In one embodiment, the water supplier includes a plurality of carbonated water valves and non-carbonated water valves. The carbonated water valves are connected to the carbonated water line, and the non-carbonated water valves are connected to the non-carbonated water line. A water valve actuator is mounted adjacent to and connected to each carbonated water valve and each non-carbonated water valve. When a user activates a beverage requester, the controller causes a water valve actuator to engage and open a carbonated water valve or a non-carbonated water valve located above a particular channel of the fluid director or directly above the beverage container compartment. The actuator maintains the valve open for a predetermined amount of time. After such time elapses, the water valve actuator allows the valve to close. In another embodiment illustrated, the carbonated water line is connected to a single multi-way carbonated water valve, and the non-carbonated water line is connected to a single multi-way non-carbonated water valve. When a user activates a beverage requester, the water valve actuator causes a multi-way valve to open and direct water to one of a plurality of channels for a predetermined period of time.

It should be appreciated that the drink supply outlet valve actuators and the water valve actuators can be constructed such that both cause the respective valves to open for the time period during which the beverage requestor is activated by the user. In such case, the exact amount of drink supply and carbonated and/or non-carbonated water are dispensed simultaneously to form the beverage.

One preferred embodiment of the present invention includes a plurality of water dispensers connected to the carbonated and non-carbonated water lines. The water dispensers are disposed between or connected to each pair of carbonated water valves and non-carbonated water valves over each channel entrance of the fluid director or over the predetermined location or slot for each beverage container in the embodiments without the fluid director. Depending on the request by the user and the type of beverages dispensed, either the non-carbonated water valve or the carbonated water valve will open and allow non-carbonated water or carbonated water to flow into the water dispenser. The water dispenser diffuses and directs the water into the appropriate channel of the fluid director or directly into the drink supply steam and the appropriate beverage container in the beverage container compartment. It should be appreciated that for some beverages, both the carbonated and non-carbonated water will be employed to create the correct mixture for the carbonated beverage.

In one embodiment, each water dispenser is a substantially cylindrical ring or tube referred to herein as a water ring. The water ring defines a central opening or aperture which enables the drink supply to flow through the water ring. The water ring includes a plurality of relatively small openings or orifices along its lower or inner circumference. When water flows into the water ring from one of the water valves, the water flows through the orifices, forming a spray or other relatively even distribution of water. The drink supply outlet valve of the drink supply canister is positioned over the central opening of the water ring to direct the drink supply into the channel of the fluid director or directly into the beverage container through the water ring. This causes the drink supply and the water to mix on the fly in the desired ratios. It should be appreciated that the water ring does not need to be cylindrical or completely cylindrical as discussed in detail below.

The gas supplier of the beverage dispenser includes one or more, and preferably a plurality of gas supply canisters which contain $CO_2$ gas. In one embodiment, the gas supplier includes a gas supply canister holder adapted to hold at least one and preferably a plurality of gas supply canisters. The gas supply canister holder may be attached to or mounted in the freezer compartment door, refrigerator compartment door or any suitable location in or connected to the refrigerator. Each gas supply canister includes a gas supply canister valve. The gas supplier includes a gas line connected to the gas supply canister holder or frame, and adapted to direct the gas to a gas manifold which equalizes or substantially equalizes the pressurized gas provided by each gas supply canister and provides a single stream of gas. In one embodiment, the gas stream serves a dual purpose and in particular is provided to pressurize the drink supply canisters and to carbonate the water in the carbonation tank for the production of carbonated water. In another embodiment, the gas stream is used to carbonate the water in the carbonation tank and an independent gas pressurizer is provided to pressurize the drink supply canisters.

In one embodiment, the controller includes a computer and electronic components and connections. The computer includes at least one processor and one or more memory devices for storing data and at least one actuation program, routine or module. The actuation program provides the processor with instructions for controlling the operation (including the synchronization) of the drink supply and water supply actuators and valves for providing the correct brix ratios for different beverages. It should be appreciated that the actuation program will include the appropriate brix ratios for the different beverages adapted to be dispensed from the beverage dispenser of the present invention. It should also be appreciated that the controller or the beverage requester can include an input mechanism which enables a user to select the type of beverage being dispensed.

It should also be appreciated that the dispensing apparatus of the present invention can be adapted to communicate electronically with any computer dispensing apparatus or electronic network. In one embodiment, the computer of the controller can electronically communicate with an order processing dispensing apparatus through communication channels such as existing telephone lines, cable lines, wireless communications or the Internet as described in U.S. patent application Ser. No. 09/589,725.

The beverage dispensing apparatus of the present invention thereby enables users to produce and dispense carbonated and non-carbonated beverages from their refrigerators. The dispensing apparatus provides a relatively high degree of consistent control over fluid flow rates and fluid mixing. The dispensing apparatus achieves this level of control through the use of pressurized drink supply canisters and computer-controlled valve activation. In addition, the drink supply canisters and gas supply containers are constructed in such a manner so as to facilitate their standardization, manufacture and commercialization on a large scale basis.

It is therefore an advantage of the present invention to provide a beverage dispensing apparatus.

A further advantage of the present invention is to provide a beverage dispensing apparatus which dispenses a plurality of carbonated and non-carbonated drinks from a residential refrigerator.

Another advantage of the present invention is to provide a beverage dispensing apparatus for refrigerators which has reliable and consistent control over the flow of drink supply and water.

Yet another advantage of the present invention is to provide a beverage dispensing apparatus for refrigerators which includes pressurized drink supply canisters allowing for a relatively high degree of control over drink flow.

Still another advantage of the present invention is to provide a beverage dispensing apparatus for refrigerators which has computer control over drink supply and water flow.

A further advantage of the present invention is to provide a beverage dispensing apparatus for refrigerators which is relatively convenient to use and maintain.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 10 is a perspective view of a drink supply canister positioned in relation to part of the water supplier, the fluid director and a beverage container of the embodiment of the dispensing apparatus of FIG. 1.

FIG. 29 is an enlarged fragmentary perspective view of the position of drink supply canister relative to the position of the water dispenser of one alternative embodiment of the present invention and illustrating in phantom the actuation of the drink supply outlet valve, the dispensing of the drink supply from the drink supply outlet valve and the water from the water dispenser directly into a beverage collector.

FIGS. 32, 33, 34 and 35 are fragmentary perspective views of a refrigerator door and an alternative embodiment of the drink supply canister holder of the present invention which illustrates part of the drink supply canister holder pivoting toward the interior of the refrigerator, the placement of drink supply canisters in the drink supply canister holder and the actuation of the drink supply securing member of the canister holder.

FIGS. 37A to 37F are perspective views of a further alternative embodiment of the beverage dispenser of the present invention.

FIG. 40 is an exploded perspective view of the valve assembly member of the drink supply canister of FIG. 38.

FIG. 44A is a perspective view of the drink supply canisters mounted in the drink supply canister holder and the gas supply canister illustrating an outwardly tilted drink supply canister compartment of one embodiment of the beverage dispenser of the present invention.

FIG. 44B is an enlarged perspective view of one of the housings of the drink supply canister holder of FIG. 44A.

FIG. 45 is a fragmentary side view of the drink supply canisters mounted in the drink supply canister holder, illustrating the worm gears engaging the drink supply outlet valves of one embodiment of the beverage dispenser of the present invention.

DETAILED DESCRIPTION OF THE INVENTION

General Description of Fluid Director Embodiment

Figure 1:
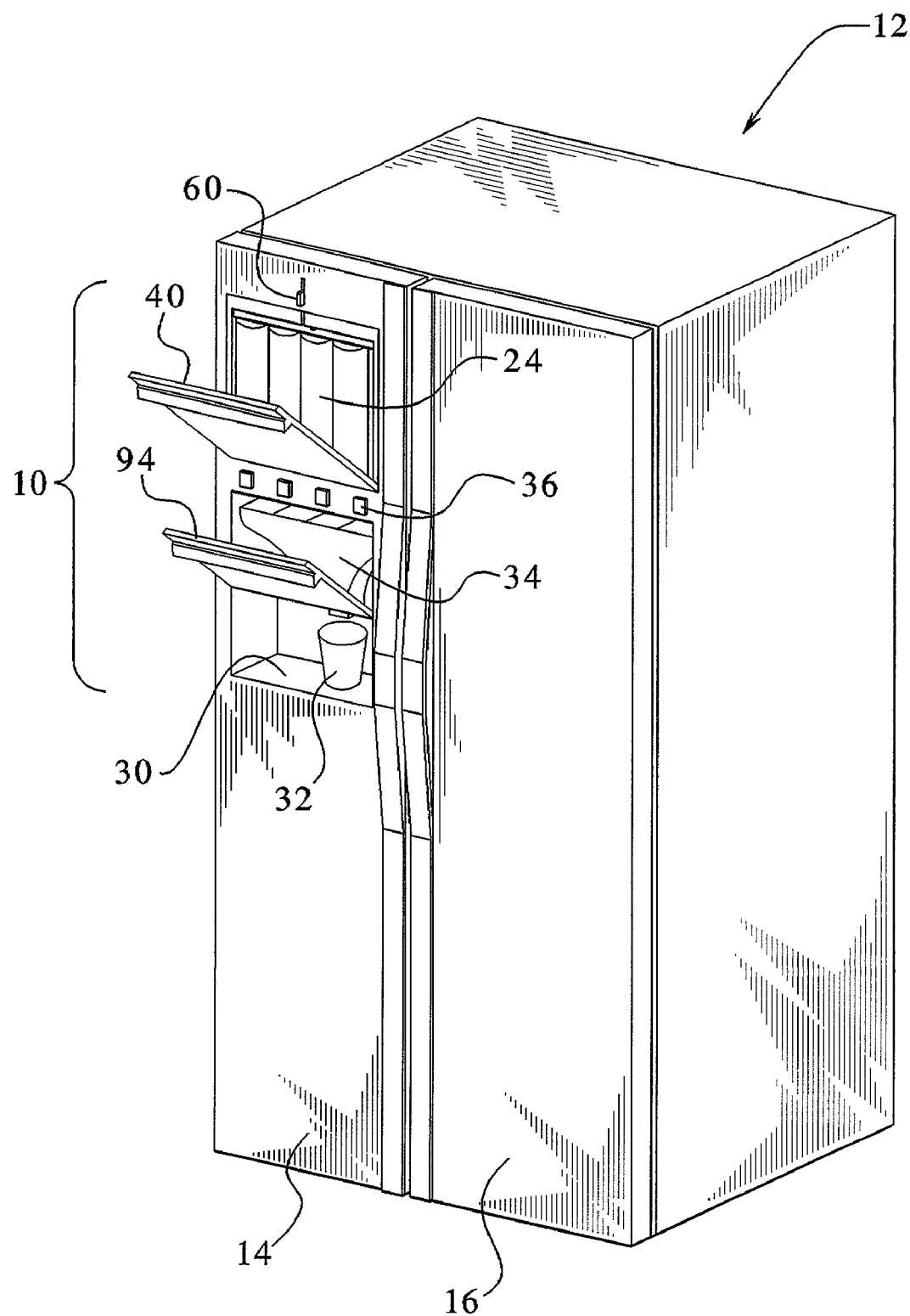
FIG. 1 is a perspective view of the exterior of a refrigerator having the beverage dispensing apparatus of one embodiment of the present invention, illustrating the drink supply canister access door, drink supply canisters, beverage container compartment, beverage container, fluid director and beverage requestors.

Referring now to the drawings, and particularly to FIGS. 1, 2, 3, 4, 5, 6 and 7, one embodiment of the beverage dispenser or beverage dispensing apparatus of the present invention, generally indicated by numeral 10, is adapted to be mounted in a housing and particularly in a refrigerator 12. The refrigerator 12 illustrated in FIGS. 1, 2, 4, 5, 6 and 7 is a residential side-by-side refrigerator which includes a freezer compartment door 14, a refrigeration compartment door 16, a freezer compartment 18 and a refrigeration compartment 20. The refrigerator 12 also includes standard refrigerator components such as a refrigeration system including a compressor (not shown). The refrigerator 12 may also include a water filter or filtration system and water routing system (not shown) integrated with the beverage dispenser or alternatively separate from the beverage dispenser 10. It should be appreciated that the beverage dispenser of the present invention may be adapted for any suitable refrigerator or other such suitable housing or structure.

Figure 2:
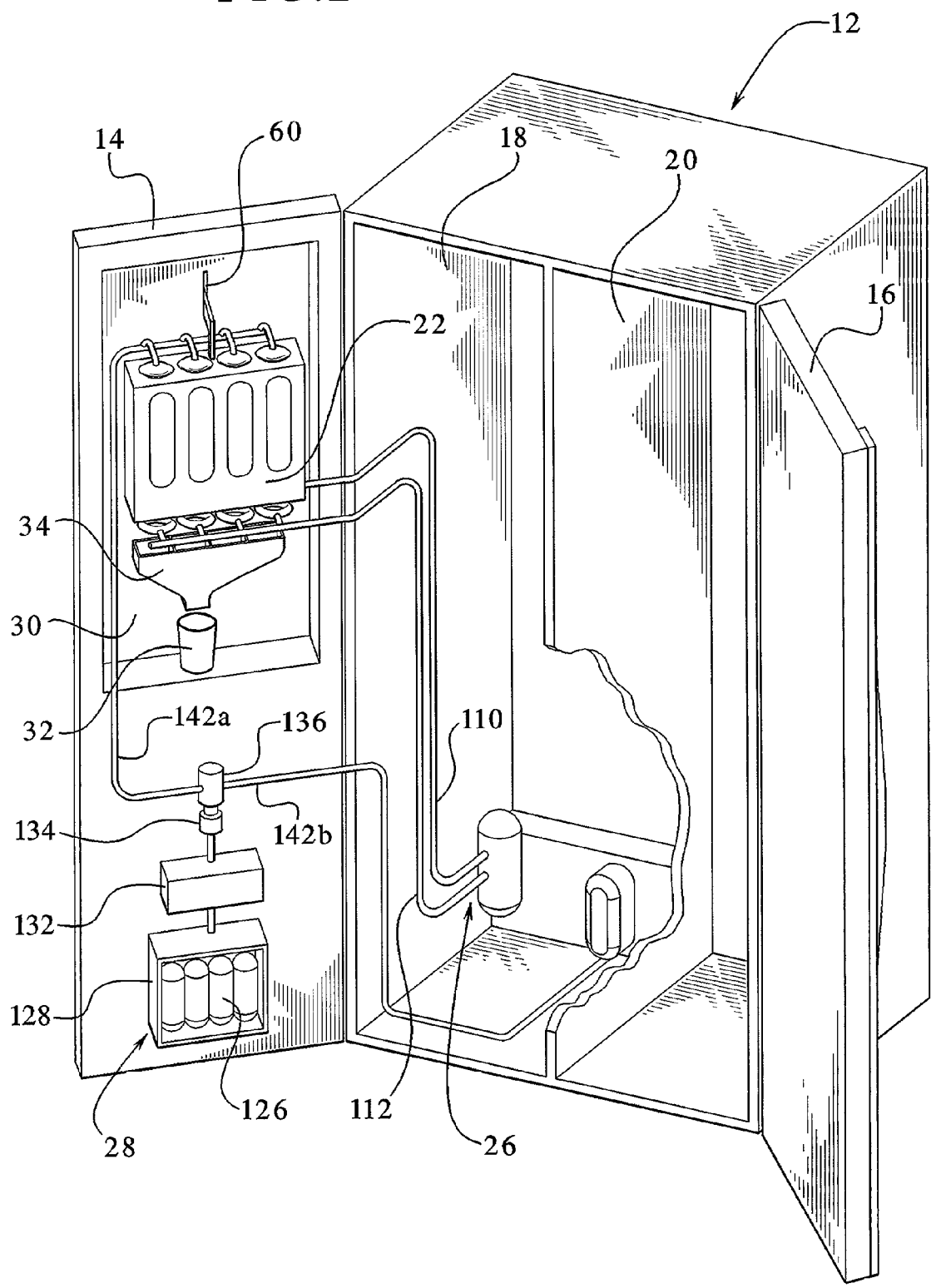
FIG. 2 is a fragmentary perspective view of the interior compartment of the refrigerator illustrating the beverage dispensing apparatus of FIG. 1, and specifically illustrating one embodiment of drink supply canister holder, one embodiment of gas supply canister holder, one embodiment of gas supplier and one embodiment of water supplier.
Figure 3:
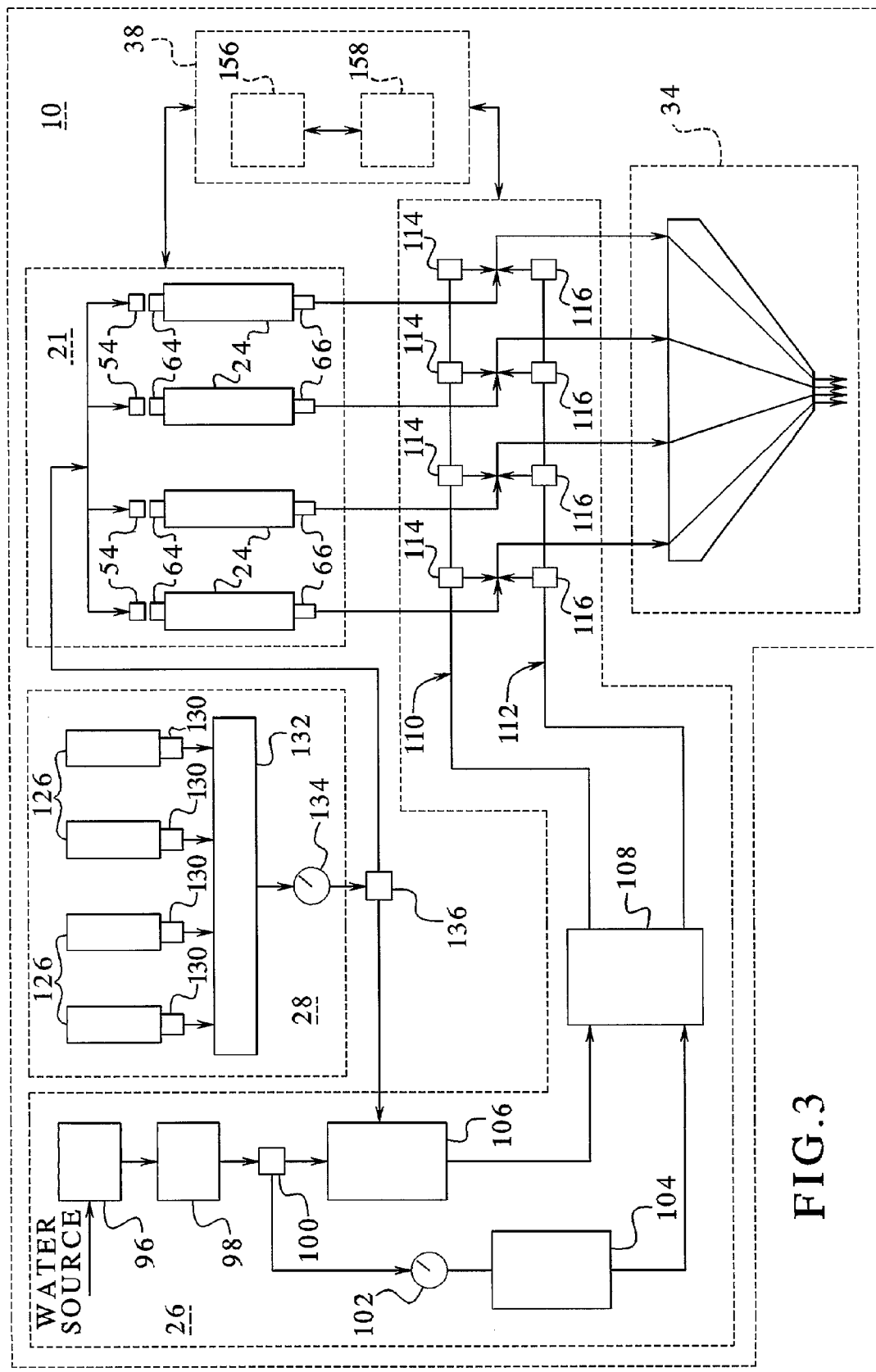
FIG. 3 is a schematic diagram of the dispensing apparatus of FIG. 1 schematically illustrating the drink supply canisters, water supplier, gas supplier, fluid director and controller or dispensing computer.
Figure 4:
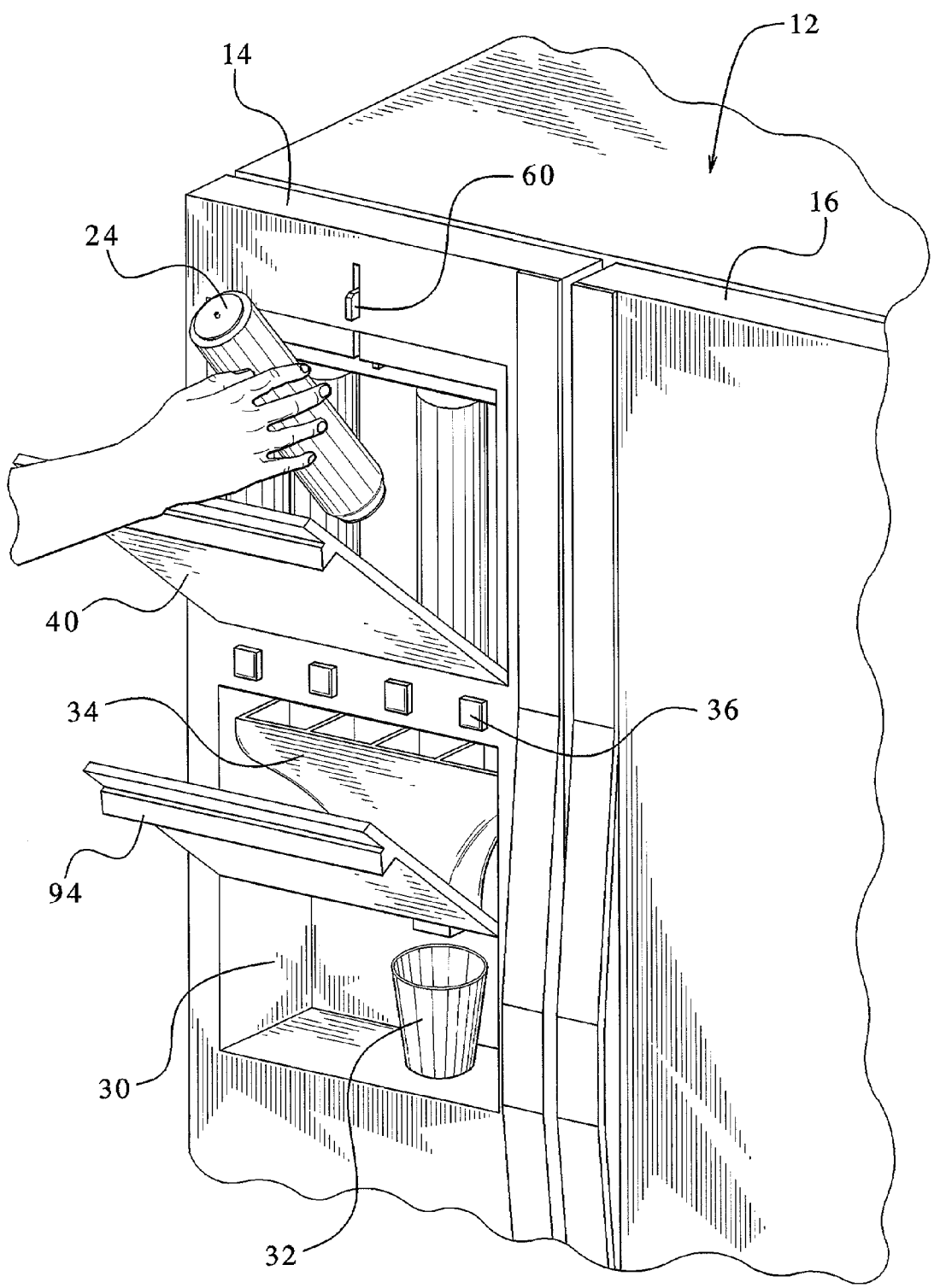
FIG. 4 is an enlarged fragmentary perspective view of the exterior of the refrigerator of FIG. 1 illustrating a person inserting a drink supply canister in the drink supply canister holder in the refrigerator.

As generally illustrated in FIGS. 1, 2 and 3, the beverage dispenser or beverage dispensing apparatus 10 of one embodiment of the present invention includes: (a) a drink supplier 21 including a drink supply canister holder or frame 22 for receiving and holding or maintaining at least one and preferably a plurality of drink supply containers or canisters 24, and at least one and preferably a plurality of drink supply valve actuators (see FIG. 10) for causing the drink supply to be selectively released from the drink supply canisters 24; (b) a water supplier 26 for selectively supplying carbonated water and non-carbonated water for mixing or making the beverages; (c) a gas supplier 28 for supplying $CO_2$ gas to carbonate the carbonated water provided by the water supplier 26, and for supplying $CO_2$ gas or other gas such as air from an air pressurizer (not shown) for pressurizing the drink supply containers or canisters 24; (d) a beverage container compartment 30 for holding the beverage collectors or containers 32 such as a glass, cup or pitcher; (e) a fluid director 34 for facilitating the mixing of the drink supply from one of the drink supply containers or canisters 24 and the carbonated or non-carbonated water from the water supplier 26 and for directing the mixed beverage to the beverage container compartment 30; (f) a controller 38 for controlling and tracking the dispensing of drink supply and carbonated and non-carbonated water; and (g) one or more suitable beverage requesters 36 (such as indicators, buttons, actuators, sensors, a keyboard, touch panel, touch screen or any combination thereof) for enabling a user to request one of a plurality of beverages. These components are all preferably mounted in the refrigerator 12, although it should be appreciated that one or more of these components could be mounted adjacent to, in a structure adjacent to or spaced apart from the refrigerator.

Figure 7:
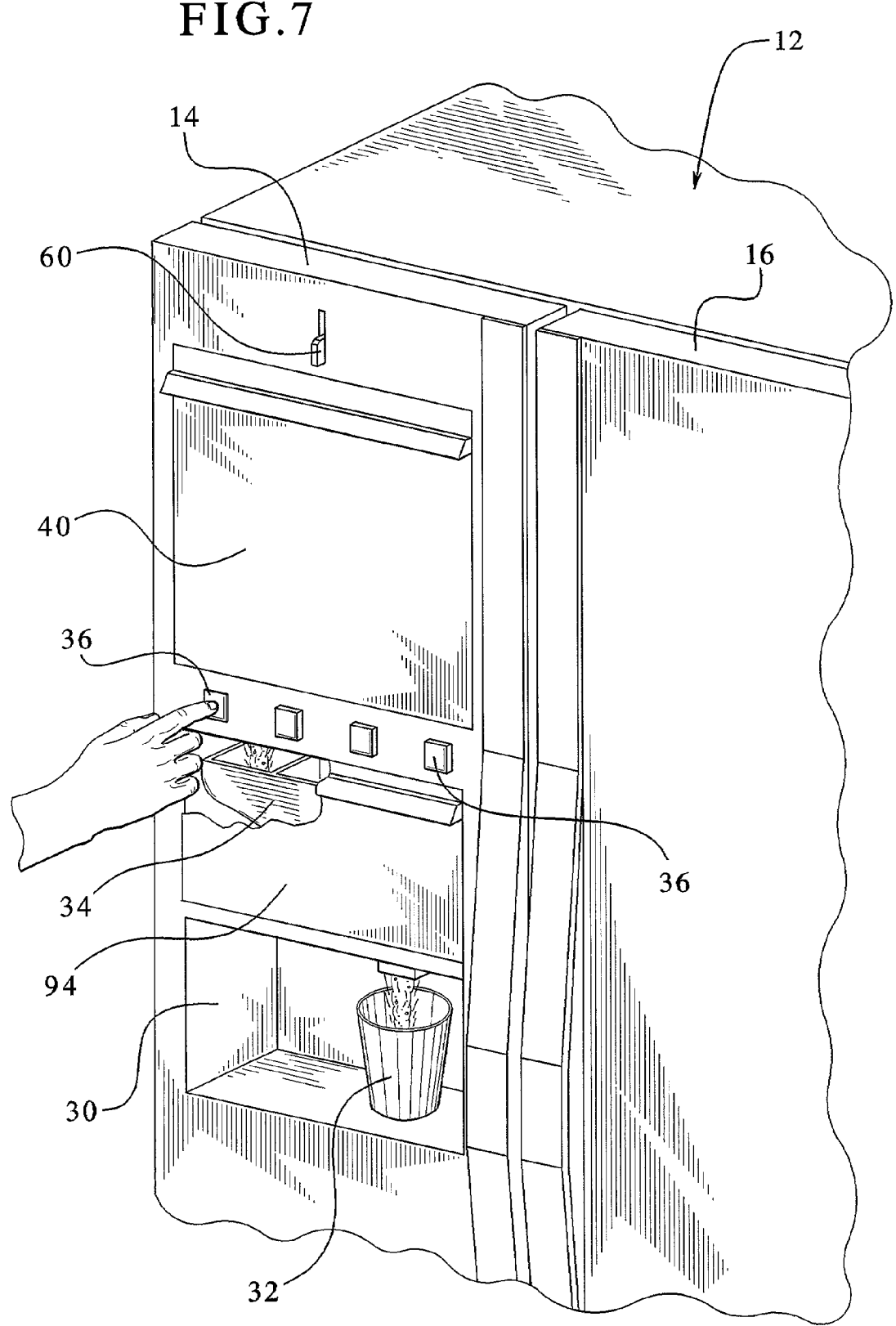
FIG. 7 is an enlarged fragmentary perspective view of the exterior of the refrigerator of FIG. 1 with the drink supply access door in a closed position, a partially broken away view of the fluid director access door in a closed position, a user's hand touching a beverage requestor and the beverage being dispensed.

As further generally illustrated in FIGS. 1, 2 and 3, in operation of this embodiment, after the user installs the drink supply canisters 24 (and closes the drink supply canister access door 40 as discussed below), the gas inlet valve (discussed below) associated with each drink supply canister 24 allows the $CO_2$ gas (or other pressurized gas) to flow from the gas supplier 28 into that drink supply canister 24. This pressurizes the drink supply canister 24. When a user desires to obtain a beverage, the user makes the user's request through one of the beverage requesters 36 which is connected to or in communication with the controller 38 as illustrated in FIG. 7. As shown in FIG. 3, the controller 38 generates the appropriate beverage dispense signal. Upon receiving a beverage dispense signal from the controller 38, the drink supply outlet valve (discussed below) associated with the appropriate drink supply canister 24 is opened or opens to dispense the appropriate amount of drink supply from the drink supply canister 24. This drink supply flows into one of the channels of the fluid director 34 as generally illustrated in FIG. 7. Simultaneously, upon receipt of a beverage dispense signal from the controller 38, the water supplier 26 directs the appropriate amount of carbonated or non-carbonated water into the same channel of the fluid director 34 as discussed below and as illustrated in FIG. 7. The drink and the carbonated or non-carbonated water mix in that channel of the fluid director 34, and the fluid director directs the mixture of the drink and the carbonated or non-carbonated water (i.e., the beverage) to the beverage container compartment 30. The channel of the fluid director 34 directs the beverage into a beverage container 32 such as a glass, cup or pitcher as illustrated in FIG. 7.

As mentioned above, other alternative embodiments of the beverage dispensing apparatus of the present do not include a fluid director. The drink supplier and the water supplier respectively, direct the drink supply from the appropriate drink supply canister and the carbonated or non-carbonated water directly into the beverage containers as discussed in more detail below.

Drink Supply Canister Holder Or Frame

Figure 25:
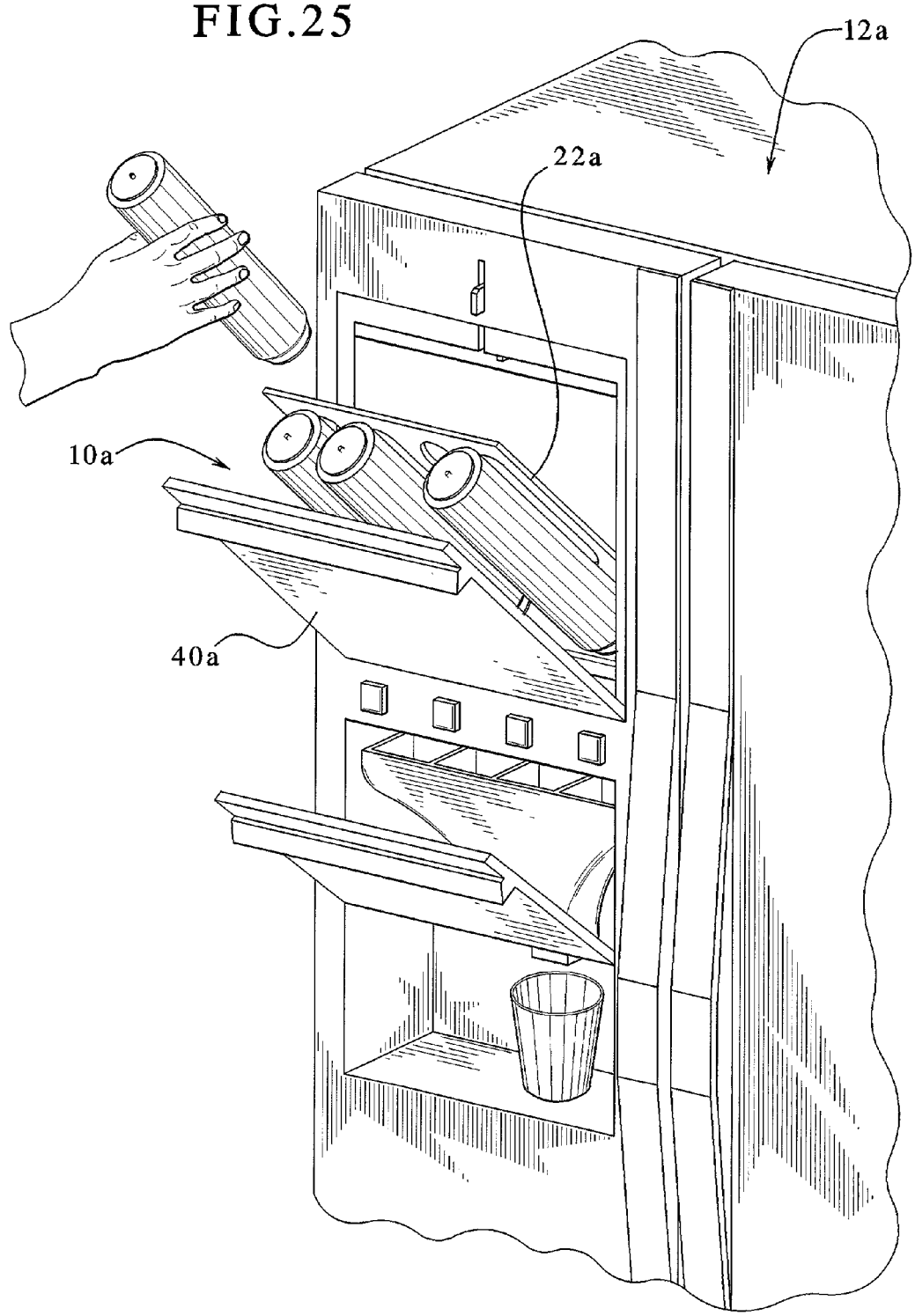
FIG. 25 is a fragmentary perspective view of the exterior of the refrigerator of an alternative embodiment of the present invention having a rotating or pivoting drink supply canister holder.
Figure 26:
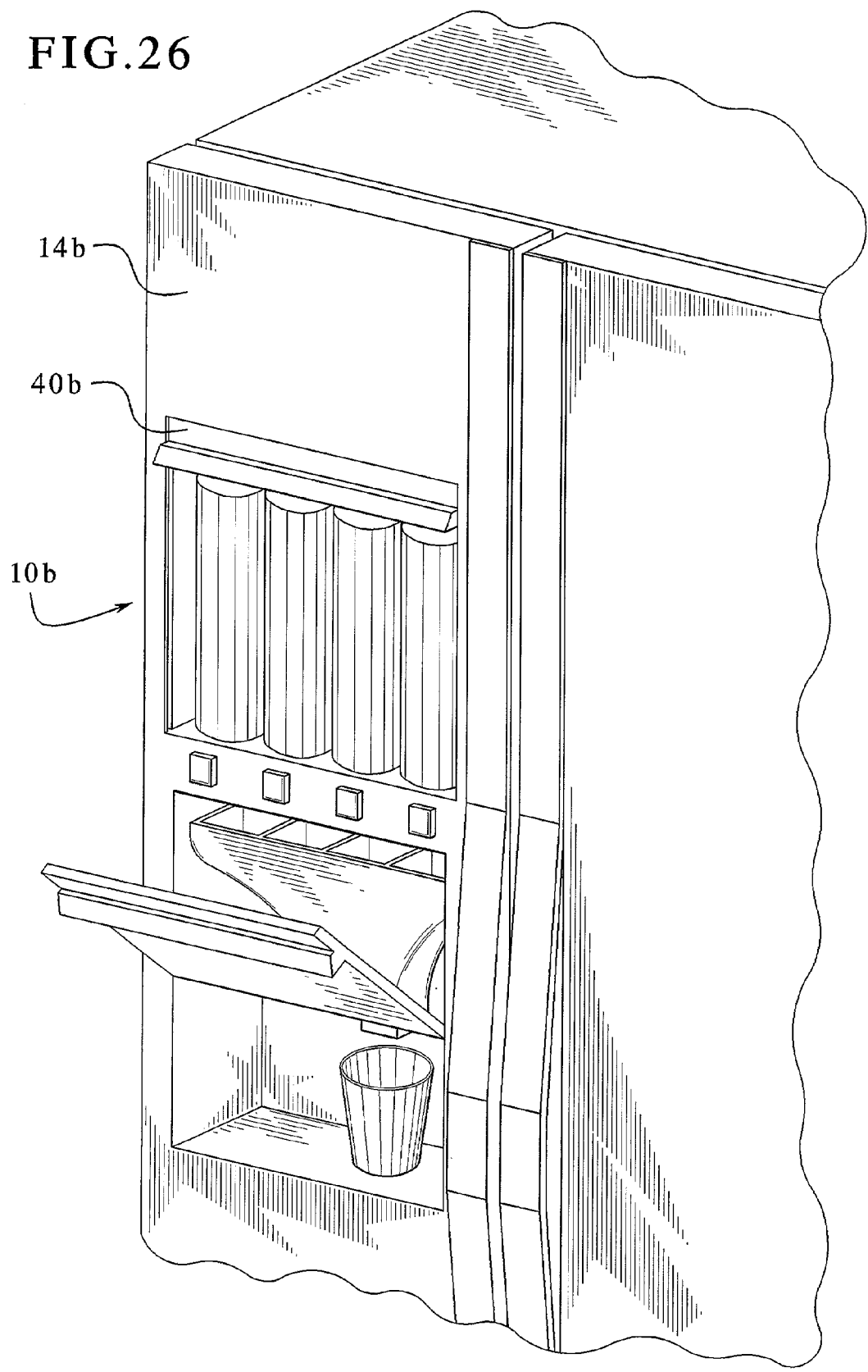
FIG. 26 is a fragmentary perspective view of the exterior of the refrigerator of a further alternative embodiment of the present invention having a sliding drink supply canister access door.
Figure 36A:
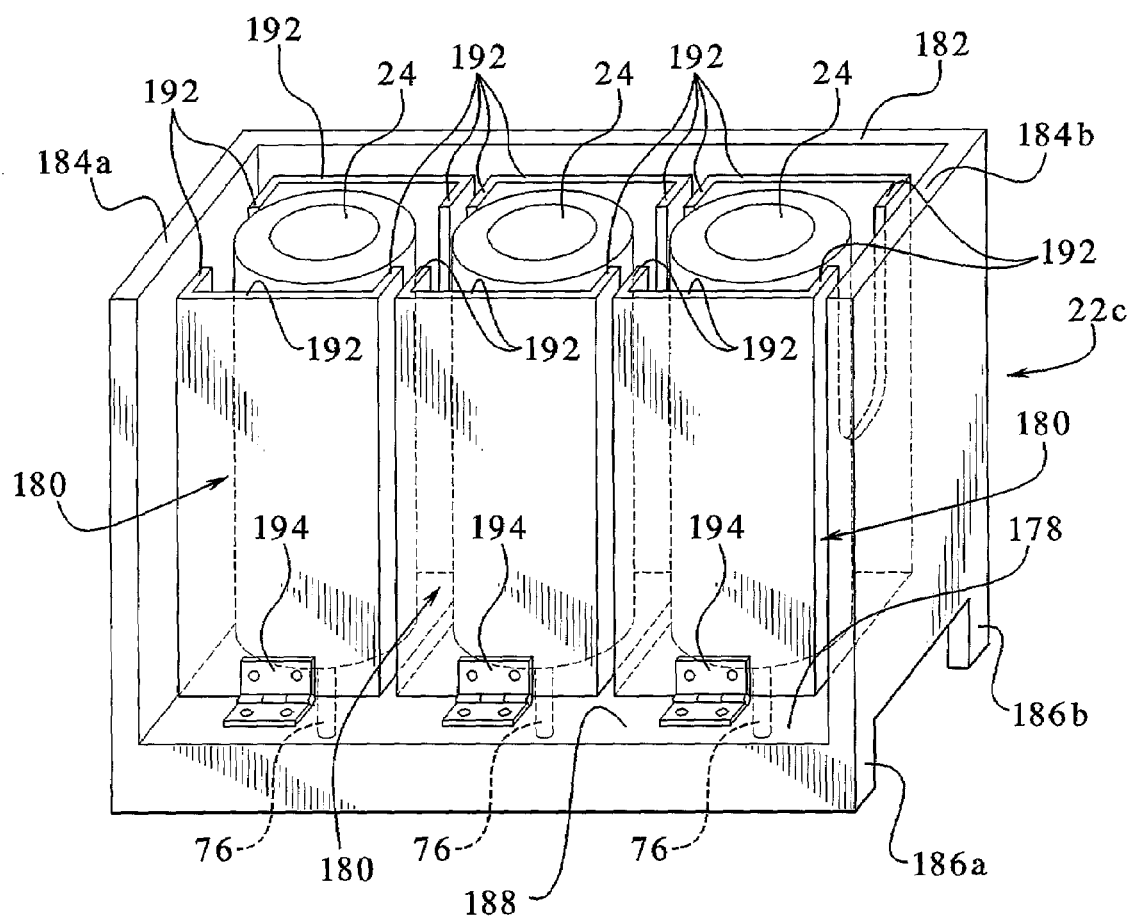
FIG. 36A is a perspective view of an alternative embodiment of the drink supply canister holder of the present invention illustrated removed from a door of the refrigerator and illustrating the drink supply canisters mounted in this holder.
Figure 36B:
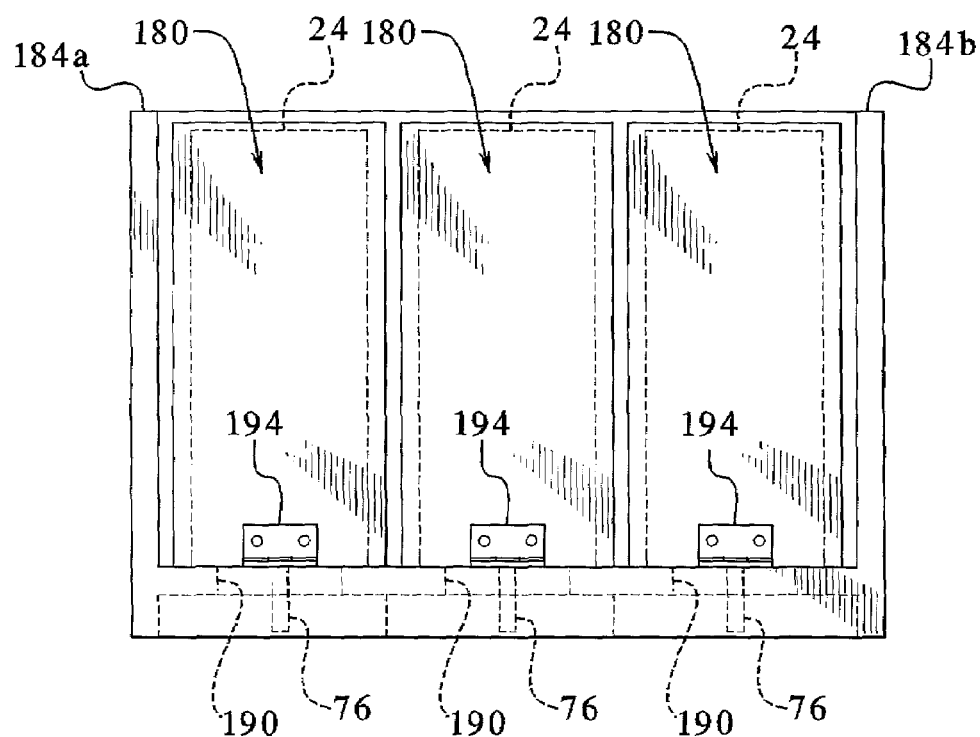
FIG. 36B is an interior view of the drink supply canister holder of FIG. 36A.
Figure 36C:
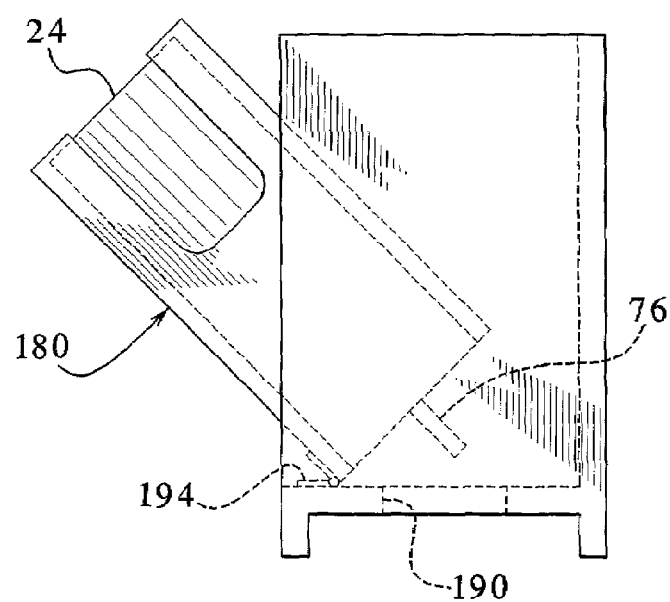
FIG. 36C is a side view of the drink supply canister holder of FIG. 36A illustrating the rotation of one of the individual independent canister holders or compartments rotated to an accessible position.

In the embodiment shown in FIGS. 1, 2, 4, 5, 6, 7, 8 and 9, the drink supply canister holder or frame 22 is built into or constructed within an insulated area of the freezer compartment door 14. It should be appreciated that the drink canister holder or frame 22 can alternatively be built into the refrigerator compartment door 16 or the refrigerator compartment 20. It should also be appreciated that the drink canister holder or frame 22 can also be built into the freezer compartment 18 if suitably insulated to prevent the drink supply in the drink supply canisters 24 from freezing. In one embodiment of the present invention, a suitable drink supply canister access door 40 is pivotally attached to the holder 22 or, alternatively, the freezer compartment door 14, for providing users access to the drink supply canisters 24 in the holder 22 as generally illustrated in FIGS. 1, 4, 5, 6 and 7. This enables the user to easily replace the drink supply canisters 24. It should be appreciated that the drink supply canister access door 40 alternatively may be located in the interior of the refrigerator 12 and also that any suitable access door or access mechanism may be used in conjunction with the drink supply canister holder of the present invention. For instance, the drink supply access door may be connected to the holder 22 or freezer compartment door 14 in any suitable movable fashion such as a horizontally disposed sliding door (not shown) or a vertically disposed sliding door (40b) as illustrated in FIG. 26 and discussed below. Alternatively, the entire drink supply canister holder or frame 22a could be pivotally mounted in the door (or other part of the refrigerator) as illustrated in FIG. 25 and discussed below. The drink supply canister holder may be further alternatively constructed as illustrated in FIGS. 36A to 36C where each drink supply canister is individually held by a separate compartment as also further discussed below.

Figure 8:
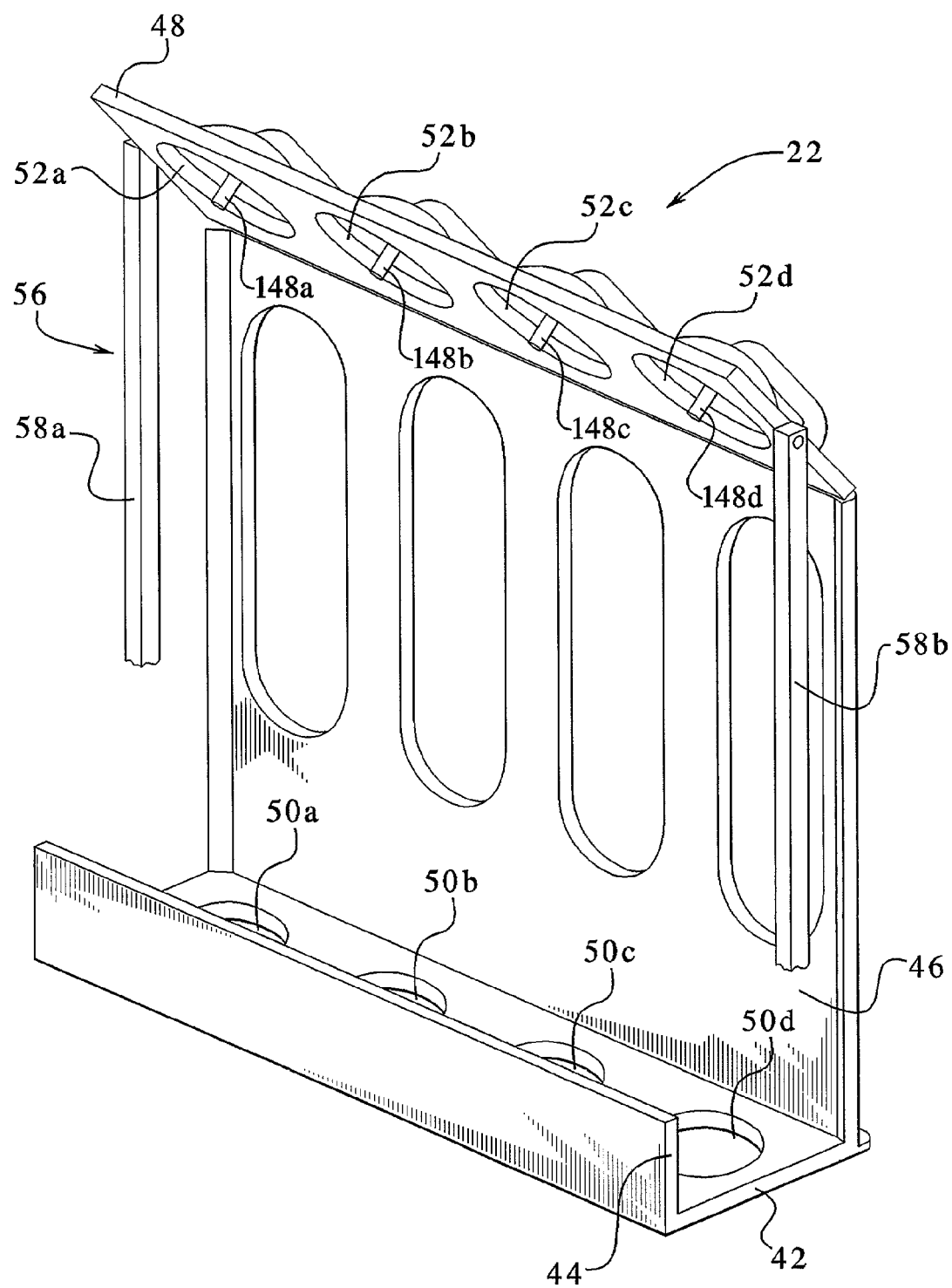
FIG. 8 is a fragmentary front perspective view of a drink supply canister holder of the embodiment of the dispensing apparatus of FIG. 1 shown removed from the refrigerator.
Figure 9:
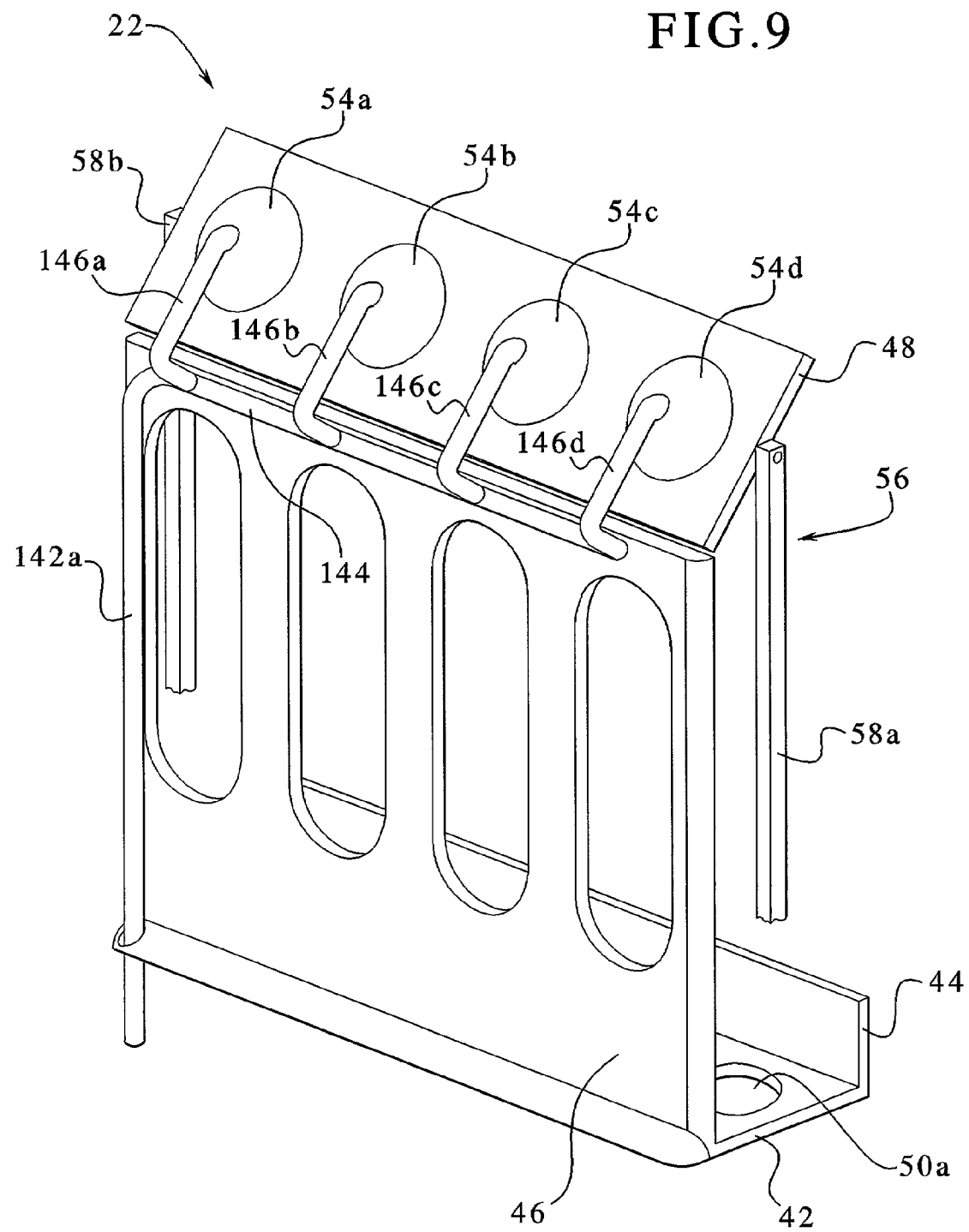
FIG. 9 is a fragmentary rear perspective view of a drink supply canister holder of the embodiment of the dispensing apparatus of FIG. 1 shown removed from the refrigerator.

As further illustrated in more detail in FIGS. 8 and 9, one embodiment of the drink supply canister holder 22 includes a drink supply canister support 42, a vertically extending exterior drink supply canister guide or member 44 connected to the drink supply canister support 42, a substantially vertically extending interior drink supply canister guide or member 46 connected to the drink supply canister support 42 and a drink supply canister securing member 48 pivotally connected to the interior member 46. In this illustrated embodiment, the drink supply canister support 42 includes drink supply canister receptacles or slots 50a, 50b, 50c and 50d, respectively, for receiving and holding the drink supply canisters. Likewise, securing member 48 includes drink supply canister receptacles or slots 52a, 52b, 52c and 52d for receiving, maintaining and securing the drink supply canisters in the holder 56. In the embodiment of the present invention illustrated in FIGS. 1, 2 and 4 through 9, the drink supply canister frame or holder 22 holds four drink supply canisters 24. It should be appreciated that the number of beverages provided by the beverage dispenser of the present invention could vary and that the number of drink supply canisters and drink supply canister receptacles will vary depending on the number of beverages which the manufacturer desires the refrigerator to dispense. In the illustrated embodiment, the canister securing member 48 includes a plurality of gas supplier valves 54a, 54b, 54c and 54d which are part of the gas supplier 28 and are generally illustrated in FIGS. 8 and 9 and described in more detail below. It should be appreciated that alternative embodiments of the gas supplier and gas supplier valves are further discussed in detail below.

In this embodiment, the drink supply canister access door 40 is connected to the securing member 48 in such a manner that: (a) the securing member 48 opens when the drink supply canister access door 40 opens; and (b) the securing member 48 closes when the drink supply canister access door 40 closes. When the securing member 48 and drink supply canister access door 40 are open, as shown in FIGS. 1, 4, 5, 8 and 9, a user can remove used or empty drink supply canisters and insert new or filled drink supply canisters into the drink supply canister holder 22. In this embodiment, the securing member 48 is directly attached to the drink supply canister access door 40 by a suitable mechanical link 56 (fragmentarily illustrated) between the drink supply canister access door 40 and the securing member 48. Link 56 includes two connecting bars 58a and 58b which pivotally connect (not shown) the drink supply canister access door 40 to the securing member 48. It should be appreciated that the simultaneous actuation of the drink supply canister access door 40 and securing member 48 may be accomplished using any suitable mechanical or electro-mechanical mechanism or linkage including, without limitation, electronic switches, motors or other electrical devices.

As illustrated in FIGS. 1, 2, 4 and 5, one embodiment of the present invention includes a drink supply canister holder 22 having a vertically sliding access door lock 60 which locks the securing member 48 in place and prevents the drink supply canister access door 40 from opening when in the locked position. It should be appreciated that the present invention can include any suitable locking device for keeping the drink supply canister access door closed and locked, and that the lock may be located on the interior of the refrigerator 12 for aesthetic reasons. The present invention further contemplates that the lock could also or alternatively lock the drink supply canister holder in the closed position. It should also be appreciated that the beverage requestors or other control device could be used to unlock, open or provide access to the drink supply canisters. It should further be appreciated that the lock may alternatively be electrically operated such as by a solenoid which is controlled by a user activator or indicator.

In the illustrated embodiment, when the securing member 48 closes, the canister receptacles 52a, 52b, 52c and 52d engage and fit over the drink supply canisters 24 to restrict their movement. Additionally, when the securing member 48 closes, the gas supplier valves 54a, 54b, 54c and 54d also depress the gas inlet valves (discussed below) in the drink supply canisters 24 to enable $CO_2$ gas (or another pressurized gas such as air) to flow into and pressurize the drink supply canisters 24 as discussed in more detail below. It should further be appreciated that a suitable alternative apparatus or method may be employed to pressurize the drink supply containers as discussed below. For instance, the gas supplier valves may include direct gas injectors as discussed below.

In one embodiment, the drink supply canister holder 22 and the drink supply canisters 24 include co-acting mating members (not shown) which ensure that suitable drink supply canisters are used in connection with the beverage dispenser 10. The present invention contemplates that one mating member may be disposed on each drink supply canister and the other mating member for each drink supply canister is disposed on the drink supply canister holder 22, such as in the drink supply canister support 42. The mating members enable the drink supply canister holder 22 to receive only predetermined drink supply canisters 24, thereby ensuring that users use only appropriate drink supply canisters in the beverage dispenser of the present invention. In one example embodiment, the canister receptacles 50a to 50d and/or canister receptacles 52a to 52d have a predetermined or predefined shape (such as an irregular shape). In such case, one or both ends of the drink supply canisters 24 have co-acting or mating predetermined shapes which enable the drink supply canisters 24 to fit into such receptacles. It should be appreciated that the present invention contemplates a suitable adapter or converter which enables a non-mating drink supply canister to mate with the canister receptacles or to otherwise be installed in the beverage dispensing apparatus and particularly the drink supply canister holder of the present invention. These embodiments protect the integrity of the drink supply used by the beverage dispenser. It should be appreciated that the co-acting mating members could also limit the types of drinks dispensed from certain slots. This could be employed such that only certain beverages can be dispensed from certain slots.

It should also be appreciated that the controller may be adapted to determine if a suitable drink supply canister is being used in the drink supply canister holder using sensors, switches or other suitable mechanisms which prevent the operation with incompatible drink supply canisters.

Drink Supply Containers

Referring now also to FIGS. 10, 11A to 11D, 12, 13, 14, 15, 16, 17, 17A, 18, 19, 20 and 21, in one embodiment of the present invention, as seen specifically in FIGS. 18 to 21, the drink supply container or canister 24 is a pressurizable, cylindrical shaped encasement which has a cylindrical wall or body 62 having top and bottom ends, a gas inlet valve 64 and a drink supply outlet valve 66. The drink supply canister 24 can be constructed of any suitable type of material, having any wall thickness which is suitable for safely retaining gas and fluid preferably within the pressure range of one (1) pound per square inch ("PSI") to one hundred (100) PSI. One preferred embodiment of the drink supply canister 24 is constructed from polyethelyneterathilate ("PET"), having a wall thickness of approximately 38G PRsform, length of 247.20 and diameter of 73 mm, and adapted to hold a 24 oz. volume of drink supply.

In one embodiment of the present invention, the technique for filling drink supply canisters can be substantially the same as the technique presently used when filling soft drink cans, bottles or containers. Specifically, the cylindrical wall 62 and one end of the canister can be integrally formed, filled with drink supply and then capped by the other end of the canister which is press fit or otherwise attached to the cylindrical wall 62.

In other embodiments of the present invention, the gas inlet valve 64 or the drink supply outlet valve 66 can be used for drink supply filling purposes. The drink supply canister 24 can be filled with drink supply by routing drink supply through either of these valves. For instance, part or all of the gas inlet valve may serve as a dual purpose device. The initial purpose is as a filling device during the production and packaging process at the bottling facility. The second purpose is for facilitating the flow of $CO_2$ or other pressurized gas into the drink supply canister to pressurize the canister. As discussed below, the $CO_2$ gas or pressurized air is communicated through the inlet to provide pressure to the drink supply canister to facilitate consistent drink supply delivery at desired pressure and flow rates to the drink supply outlet valve 66.

In one embodiment, the gas inlet valve 64 is attached to, connected to or otherwise suitably formed in one surface and in one embodiment the top surface of the drink supply canister 24. One embodiment of the gas inlet valve 64 is a spring activated valve which is predisposed to be normally closed to prevent the flow of gas into or out of the drink supply canister 24. When the gas inlet valve 64 is depressed or actuated, gas flows through the gas inlet valve 64 into the drink supply canister 24. The gas inlet valve 64 illustrated in FIGS. 18, 20 and 21 includes a spring or biasing member 68 and a sealing member 70. As further described below, in this embodiment, the closing of the drink supply canister securing member 48 causes gas inlet valve 64 to be depressed as specifically illustrated in FIGS. 20 and 21. It should be appreciated that any suitable gas inlet valve may be employed in the drink supply canister of the present invention as further discussed below. It should also be appreciated that the gas inlet valve may be removably connected to the body of the drink supply canister.

Figure 19:
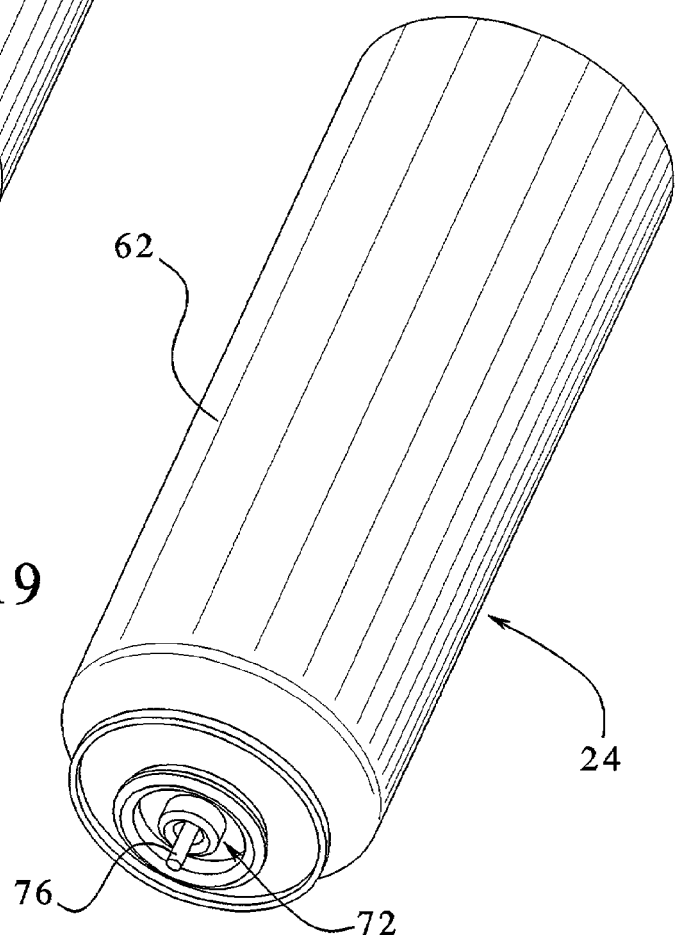
FIG. 19 is a bottom perspective view of the drink supply canister illustrating the drink supply outlet valve of the embodiment of the dispensing apparatus of FIG. 1.
Figure 20:
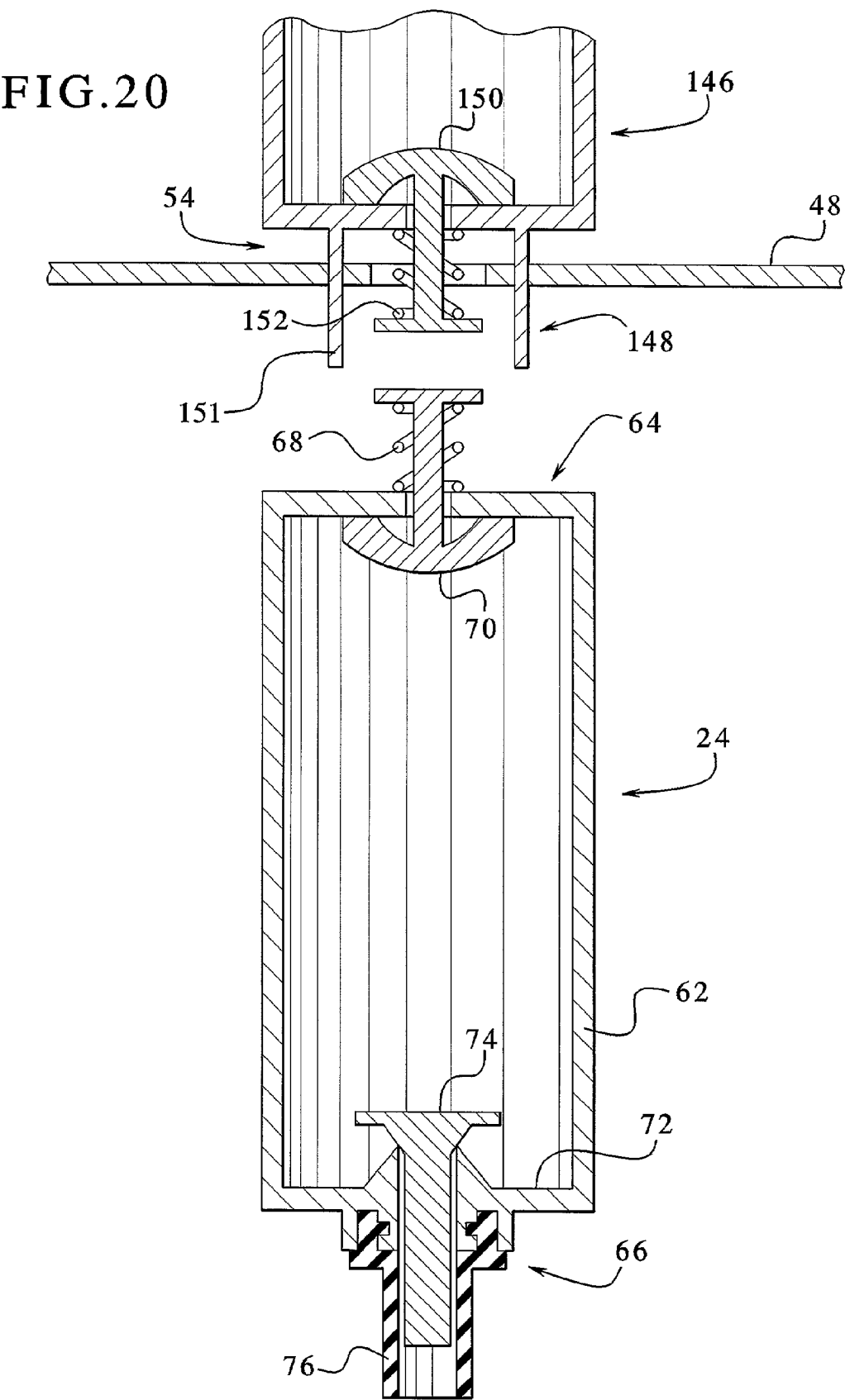
FIG. 20 is a fragmentary vertical cross-sectional view of the drink supply canister securing member of the drink supply canister holder in open position and the drink supply canister which illustrates one embodiment of the gas inlet valve actuator not engaging the gas inlet valve in the drink supply canister.
Figure 21:
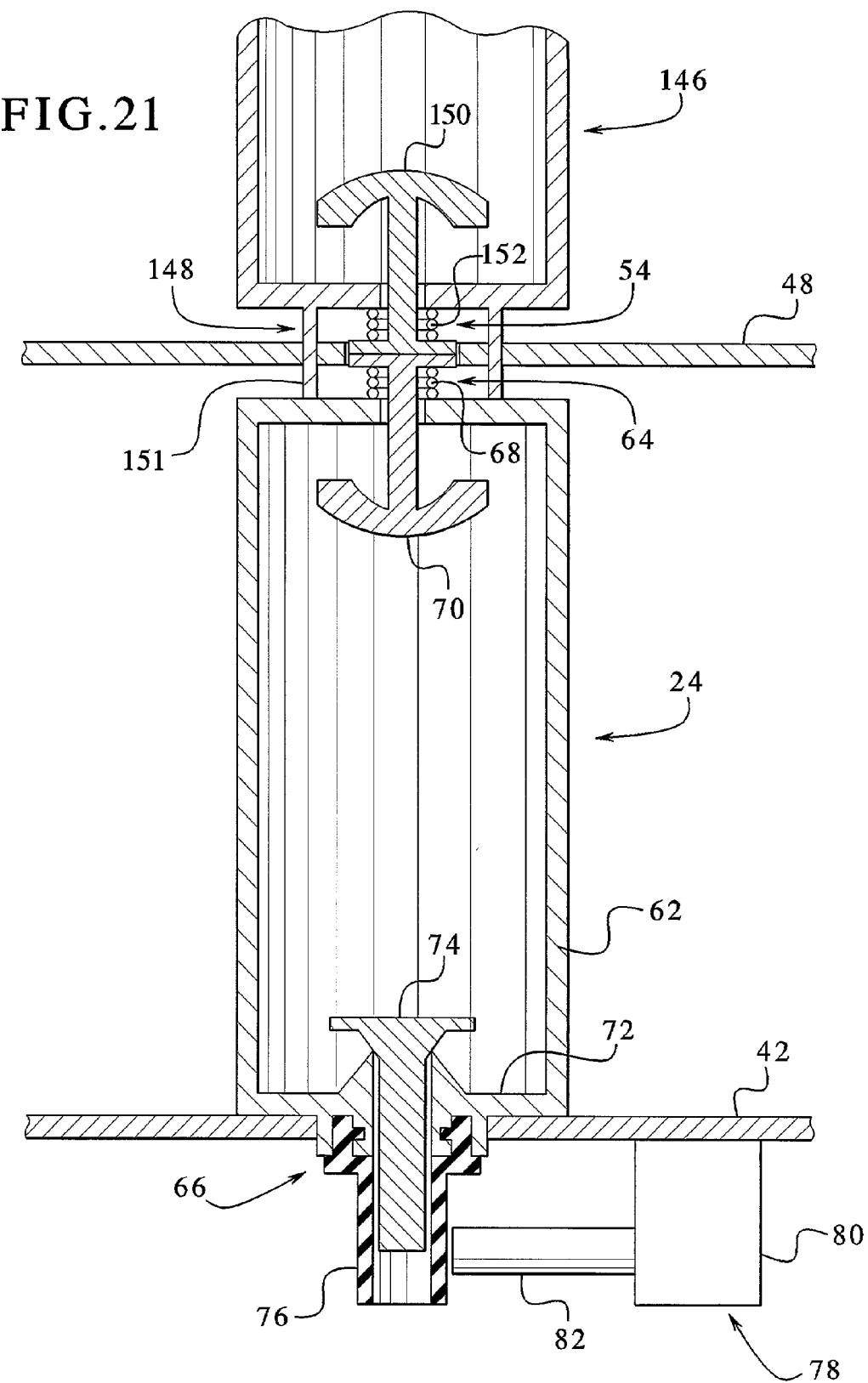
FIG. 21 is a fragmentary vertical cross-sectional view of the drink supply canister securing member of the drink supply canister holder in the closed position, the drink supply canister, the drink supply canister support and the drink supply outlet valve which illustrates the drink supply outlet valve actuator engaging the drink supply outlet valve in the drink supply canister and the gas inlet valve actuator engaging the gas inlet valve in the drink supply canister.

In one embodiment, the drink supply outlet valve 66 is attached to, connected to or otherwise suitably formed in one surface and preferably the bottom surface of the drink supply canister 24 as illustrated in FIGS. 19, 20 and 21. One embodiment of the drink outlet valve 66 includes a sealing member 74 which is positioned in the bottom wall or end 72 of the drink supply canister such that the sealing member 74 can be tilted or displaced horizontally. In this embodiment, a spout 76 is attached to the bottom wall 72 and surrounds the sealing member 74. Spout 76 is movably attached to the bottom wall 72 with suitable flexible snap fittings. Spout 76 is preferably cylindrical or conical in shape having opposing open ends. In this embodiment, the drink supply outlet valve 66 maintains a seal on the inside of the body of the drink supply canister 24 when the drink supply canister 24 is pressurized. In this embodiment, the drink supply canisters 24 are filled with drink supply and a sufficient volume of $CO_2$ gas or other pressurized gas or air to provide an internal pressure sufficient to enable the drink supply outlet valve 66 to maintain such a seal during shipment and prior to use. The pressure and temperature conditions suitable for the drink supply outlet valve to maintain such seal will vary depending on the size and shape of the drink supply canister. In one preferred embodiment, the pressure maintained in the drink supply canister is approximately ten (10) PSI during shipment and approximately fifteen (15) PSI when inserted into the drink supply canister holder to maintain a consistent flow of beverage through the drink supply outlet valve. In this embodiment, when the spout 76 is displaced in a horizontal or substantially horizontal fashion as described below, the sealing member 74 unseats, and drink supply outlet valve 72 opens and enables the pressurized drink supply to flow through the spout 76. It should be appreciated that other suitable actuatable drink supply outlet valves may be employed in the drink supply canisters of the present invention as further discussed below. It should also be appreciated that the drink supply outlet valve can be removably attached to the body of the drink supply canister.

In this embodiment of the drink outlet valve 66, one or more drink supply outlet valve actuators 78 are suitably mounted to the bottom of or adjacent to the drink canister support 42 to co-act with the drink supply outlet valves. The drink supply outlet valve actuators 78 can include any suitable mechanical or electromechanical actuating device, such as a solenoid 80 connected to an extension piston, pin or rod or other valve engager or engagement member 82. In the illustrated embodiment, when a user activates a beverage requester 36, the controller 38 (described below) causes the appropriate drink supply outlet valve actuator 78 to engage and displace spout 76 for a predetermined period of time, which in turn causes the drink supply to flow from the drink supply canister 24 as specifically illustrated in FIGS. 7, 11B and 17 and discussed below. After the predetermined time period elapses, the drink supply outlet valve actuator 78 disengages spout 76, stopping the flow of the drink supply from the drink supply canister 24.

Fluid Director

Figure 28:
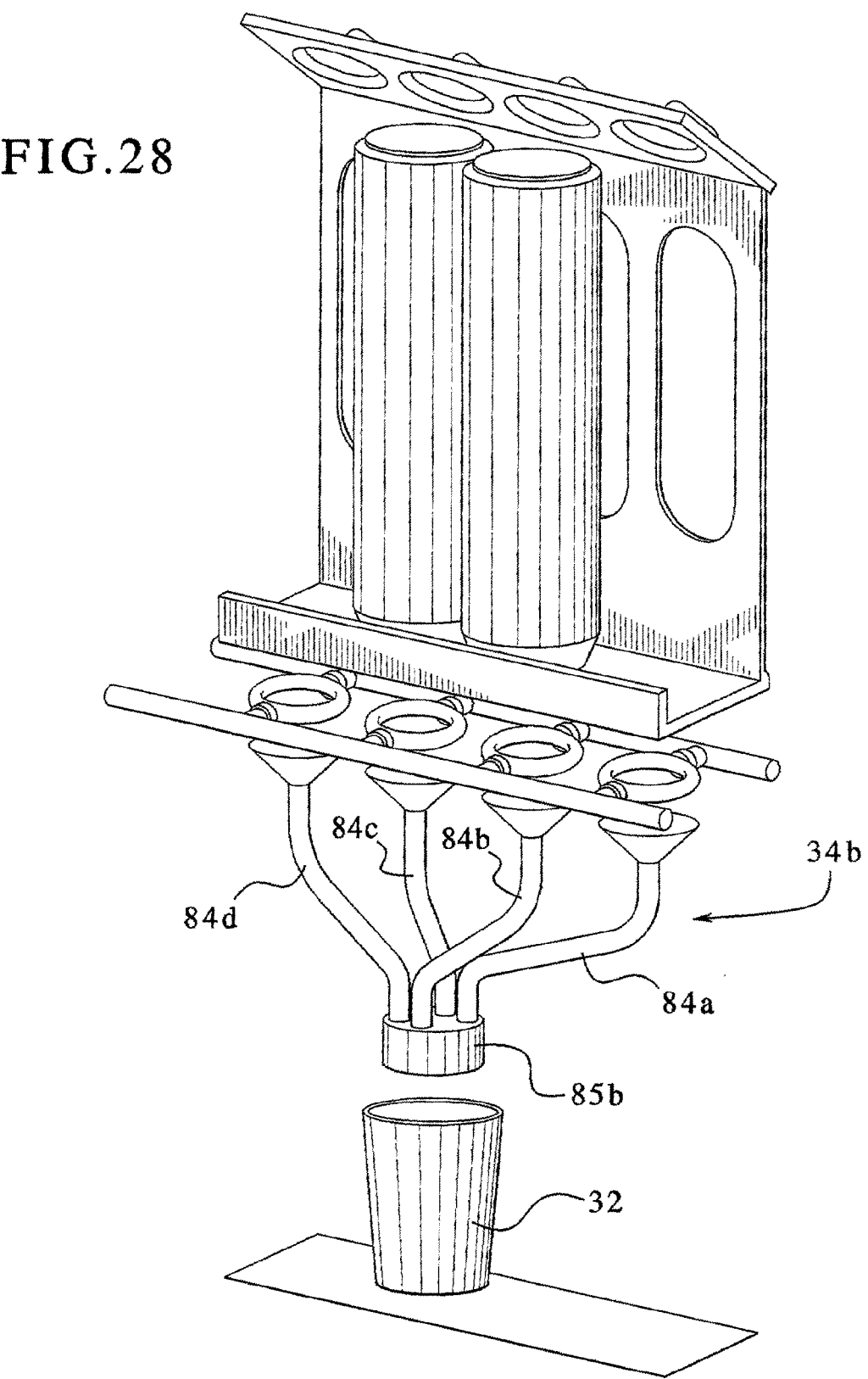
FIG. 28 is a perspective view of a further alternative embodiment of the beverage dispenser having an alternative embodiment of the fluid director of the present invention.

One embodiment of the beverage dispenser of the present invention, as seen in FIG. 2, includes a fluid director such as the fluid director 34 of the beverage dispenser 10. The fluid director 34 is adapted to simultaneously receive the flow of drink supply from the drink supply canisters 24 and also carbonated or non-carbonated water from the water supplier 26. The fluid director 34 is made from a suitable plastic or polymer such as food grade plastic materials, such as by injection molding, although it could be made from other suitable materials and formed in suitable other manners. The fluid director 34 includes at least one, and in the embodiment illustrated in FIGS. 10, 11A, 11B, 12, 13, 14, 15 and 16 a plurality of walls 92, which define and separate the channels 84. The separate channels 84 in the fluid director 34 separate the different drink supplies from one another to prevent cross-contamination which occurs when different types of beverages mix. Preferably, at any one time, when a user operates the dispensing apparatus 10, only one channel 84 of the fluid director 34 is used. In operation, the drink supply mixes with the carbonated or non-carbonated water in one of the channels 84 in the fluid director 34, and the fluid director 34 directs the mixture into the beverage container or collector 32 in the beverage container compartment 30 (see FIGS. 1, 4, 5, 6 and 7). The fluid director 34 illustrated in FIGS. 1, 2, 3, 4, 5, 6, 7, 10, 11A, 11B, 12, 13, 14, 15 and 16 includes four chambers or channels 84. In one embodiment, each channel 84 acts as a Venturi tube or passageway which includes a channel entrance 86, throat 88 and a channel exit 90, as specifically illustrated in FIG. 16. In one embodiment, the area of the channel entrance 86 is generally larger than the area of the channel exit 90. The channels are sufficiently sized to enable the drink supply and the water to sufficiently mix to form the beverage. The fluid director 34 is thus constructed with predetermined dimensions and a predetermined shape to enable the typical beverage supply to mix sufficiently with the water and to facilitate control of the beverage brix ratios by suitably adjusting the pressure and flow rate of drink supply and water. It should be appreciated that the fluid director could alternatively include a plurality of separate or non-integral chambers, funnels, passageways or fluid communication lines as illustrated in FIG. 28 and further discussed below.

Figure 5:
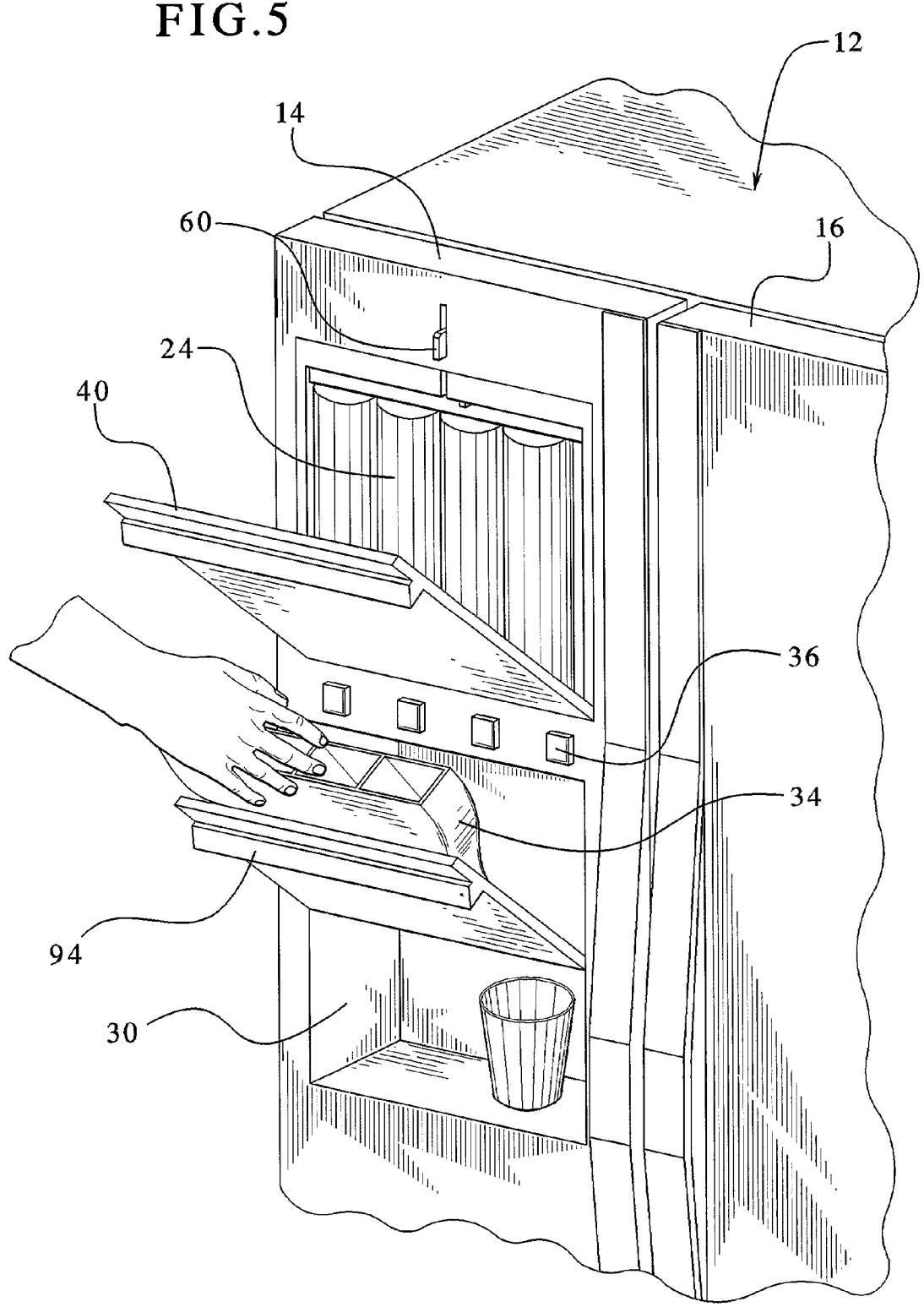
FIG. 5 is an enlarged fragmentary perspective view of the exterior of the refrigerator of FIG. 1 illustrating a person inserting the fluid director into the refrigerator.
Figure 6:
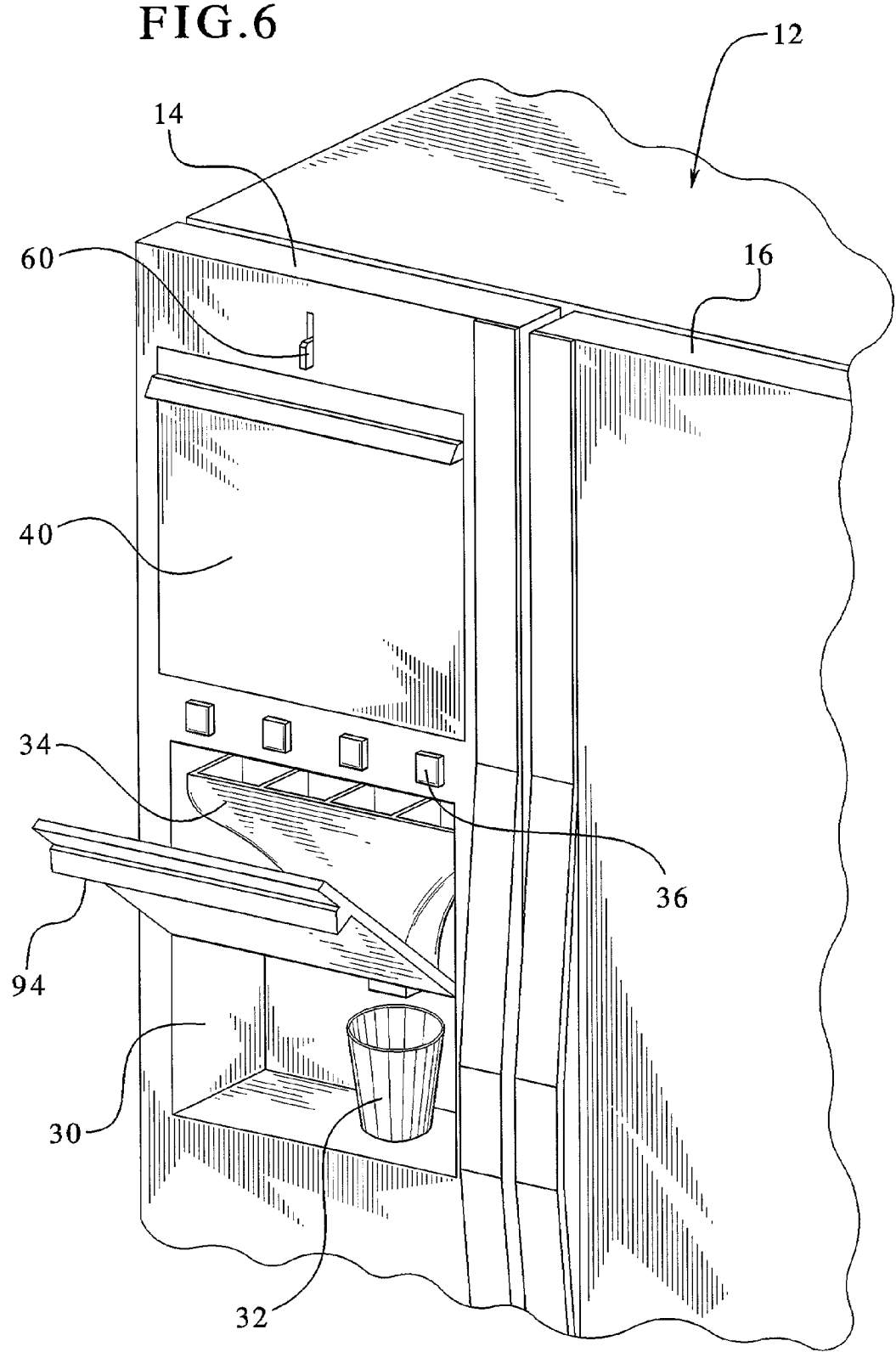
FIG. 6 is an enlarged fragmentary perspective view of the exterior of the refrigerator of FIG. 1 shown with the drink supply canister access door and locking member in a closed position.

In one embodiment, the fluid director 34 is adapted to be removed from the refrigerator primarily to enable a user to clean the fluid director. In one embodiment of the present invention, the beverage dispenser 10 includes a fluid director access door 94 pivotally or otherwise movably connected to the exterior of freezer compartment door as generally illustrated in FIGS. 1, 4, 5, 6 and 7. When the fluid director access door 94 is opened, a user can remove the fluid director 34 as illustrated in FIG. 5. The fluid director can be cleaned by hand or automatically, such as in a household dishwasher. The fluid director 34 is secured within the refrigerator through the use of one or more slots (not shown). Alternatively, the beverage dispenser may include one or more locks for securing the fluid director and fluid director access door. In one alternative embodiment, the fluid director includes alignment or mating features such as an edge with a grooved surface which is adapted to line up with grooved slots in the refrigerator to create a secure snap fit connection. It should be appreciated that the fluid director access door may be on the interior of the freezer compartment. It should further be appreciated that the beverage dispenser including the fluid director may also be in the refrigerator door.

Water Supplier

The water supplier 26 provides carbonated and non-carbonated water for producing the beverages. In one embodiment, part of the water supplier is located in the lower portion of the refrigerator 12 as illustrated in FIG. 2. In one embodiment, as schematically illustrated in FIG. 3, the water supplier 26 generally includes a water filter 96, a water pump 98, a two-way water valve 100, a water pressure regulator 102, a suitable water storage or holding tank 104, a carbonation tank 106, a cold transfer device 108, a carbonated fluid communication water line or conduit 110 and a non-carbonated fluid communication or water line or conduit 112. The water supplier 26 is preferably connected to a drinkable water source, such as a conventional cold water source available in residential kitchens.

In operation, the water passes through the water filter 96 into the water pump 98. The water filter 96 preferably removes chlorine and moderate particles from the water to enhance and establish a consistent flavor of the water which is important for maintaining consistency in the dispensed beverages. It should be appreciated that other suitable water filter, filtration or purification systems may be used in conjunction with the present invention to provide a consistent taste to the beverages. The water pump 98 may be any suitable water pump such as a commercially available 115V AC pump which preferably regulates the water pressure to approximately ninety-five (95) pounds PSI. The water pump 98 pumps the water to the two-way water valve 100. The two-way water valve 100 directs the water to the holding tank 104 and the carbonation tank 106. The water pressure regulator 102 preferably decreases the water pressure in the holding tank 104 to a manageable water pressure of approximately fifty (50) PSI. The water pressure regulator may be any suitable regulator such as a commercially available 50 PSI regulator. It should be appreciated that the water pump may be connected to the water lines by suitable quick disconnect connections as illustrated in FIG. 24D discussed below.

The holding tank 104 preferably stores a sufficient supply of non-carbonated water. The refrigerator 12 maintains this reserve water supply at a relatively low temperature and preferably about forty-five (45) degrees Fahrenheit or less (but not less than thirty-eight (38) degrees Fahrenheit). In this embodiment, the water supply from the holding tank 104 is used if a user requests the dispensing apparatus to dispense non-carbonated water alone or if the dispensing apparatus 10 requires substantial amounts of non-carbonated water.

As illustrated in FIG. 3, the carbonation tank 106 is, in one embodiment, connected to the gas supplier 28. The carbonation tank 106 uses $CO_2$ gas obtained from the gas supplier 28 to carbonate the water. The carbonation tank 106 can include any suitable tank or encasement adapted to withstand the pressure of the $CO_2$ gas provided by the gas supplier 28 and the carbonated water. The carbonation tank 106 preferably includes a conventional safety valve (not shown) which exhausts the necessary amount of pressure in the carbonation tank 106 when the pressure inside carbonation tank 106 exceeds a predetermined pressure. The safety valve closes when the pressure inside the carbonation tank 106 is below or reaches a predetermined pressure. The carbonation tank 106 also preferably includes a conventional back flow preventer (not shown) which prevents the carbonated water from flowing backward to the water source.

The non-carbonated water from the holding tank 104 and the carbonated water from the carbonation tank 106 preferably pass through a cold transfer device 108 (or alternatively receive chilled water via the refrigerator reserve water supply (not shown), preferably chilled at thirty-eight (38) to forty-five (45) degrees Fahrenheit in separate fluid communication lines or conduits). The cold transfer device 108 decreases the temperature of the water so that the resulting mixture of the drink supply and carbonated water (i.e., the beverage) maintains a relatively high level of carbonation for optimal drinking enjoyment. In one embodiment, the cold transfer device 108 is a conventional device which includes one or more tubes or lines (not shown) which are routed through a conventional cooling device (not shown). Preferably, the tubes are constructed of aluminum or steel. The cold transfer device 108 may be constructed of any suitable size or shape, such as eight (8) inches by twelve (12) inches by two (2) inches.

In one embodiment, the carbonated water supply line 110 and the non-carbonated water supply line 112 are each separately mounted at least partially above the fluid director 34 and below the drink supply canister 22 holder as illustrated in FIGS. 2, 10, 11A, 11B, 12, 13, and 24A to 24C. In one embodiment, the water supplier 26 includes a plurality of separate or individual carbonated water valves 114 and non-carbonated water valves 116. The carbonated water valves 114 are connected to the carbonated water line 110, and the non-carbonated water valves 116 are connected to the non-carbonated water line 112. In one alternative embodiment, which is illustrated in FIGS. 10, 11A, 11B, 12 and 13, a suitable water valve actuator 118 is connected to or mounted adjacent to each carbonated water valve 114 and each non-carbonated water valve 116. In one embodiment, the water valve actuator 118 include a conventional mechanical actuator (not shown) coupled to a conventional electrical activator (not shown).

In this embodiment, one carbonated water line and associated water valve and one non-carbonated water line and associated water valve is associated with each drink supply canister held by the drink supply canister holder. It should be appreciated that, at any one time only carbonated water or only non-carbonated water may be distributed to one or more designated slots for drink supply canisters because such containers are designated to produce only carbonated drinks or non-carbonated drinks, respectively.

When a user activates a beverage requester 36, the controller 38 sends a signal to the appropriate water valve actuator 118 to cause the appropriate carbonated water valve 114 or the appropriate non-carbonated water valve 116 associated with the desired drink supply canister to open. The water valve actuator 118 keeps the valve open for a predetermined time period, preferably simultaneous with the opening of the drink supply outlet valve in the drink supply canister as described herein. After such time period elapses, the actuator 118 causes or allows the appropriate valve 114 or 116 to close. As mentioned above, it should be appreciated that the beverage dispenser of the present invention could be adapted to open the drink supply outlet valve and the carbonated water valve or the non-carbonated water valve beginning simultaneously at the time the user activates the beverage requester and continuing until the user releases or deactivates the beverage dispenser. This embodiment enables the user to determine the amount of beverage, dispensed instead of predetermined or fixed amounts being dispensed.

Figure 14:
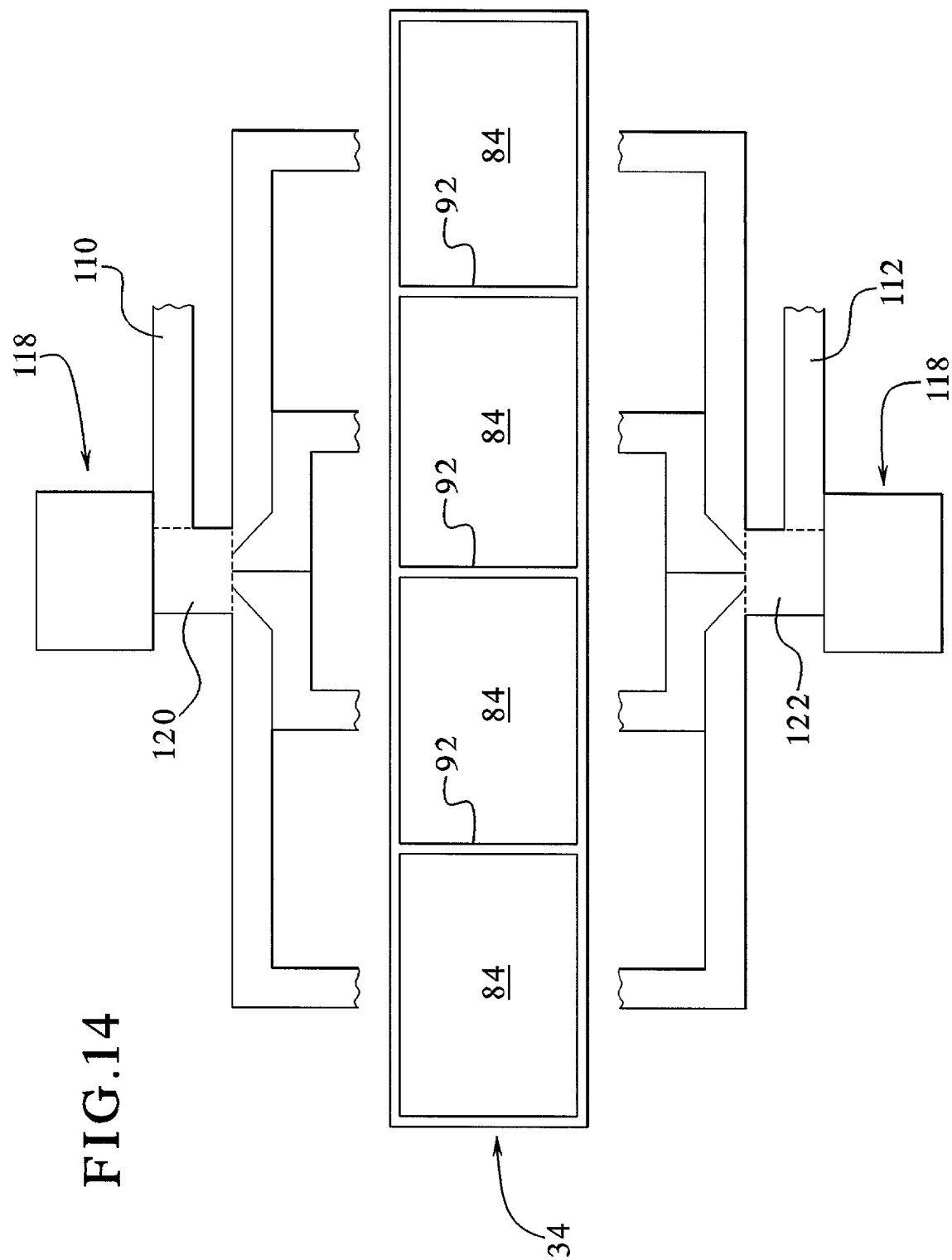
FIG. 14 is a schematic diagram of a water supplier illustrating water supply lines, a multi-way carbonated water valve, a multi-way non-carbonated water valve, valve actuators and a fluid director of an alternative embodiment of the present invention.
Figure 15:
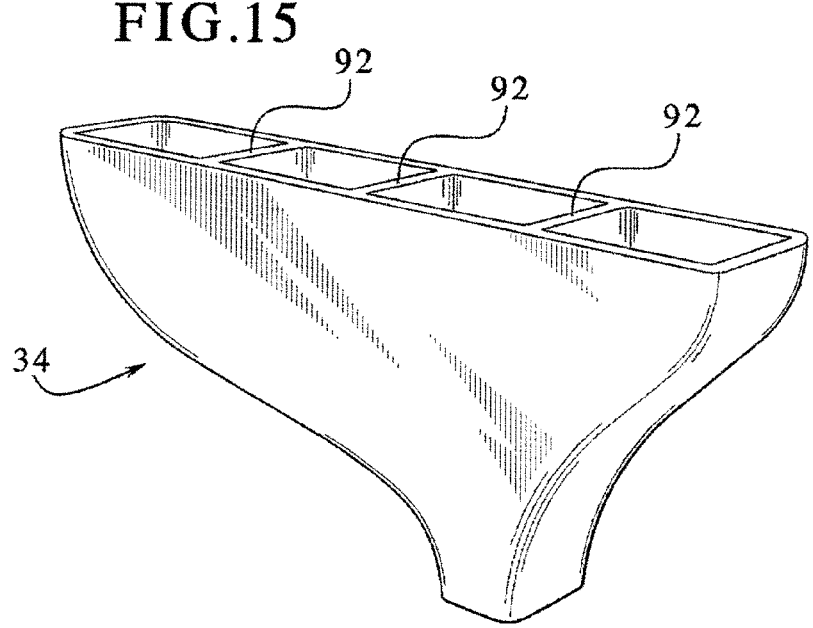
FIG. 15 is a perspective view of the fluid director of the embodiment of the dispensing apparatus of FIG. 1.
Figure 16:
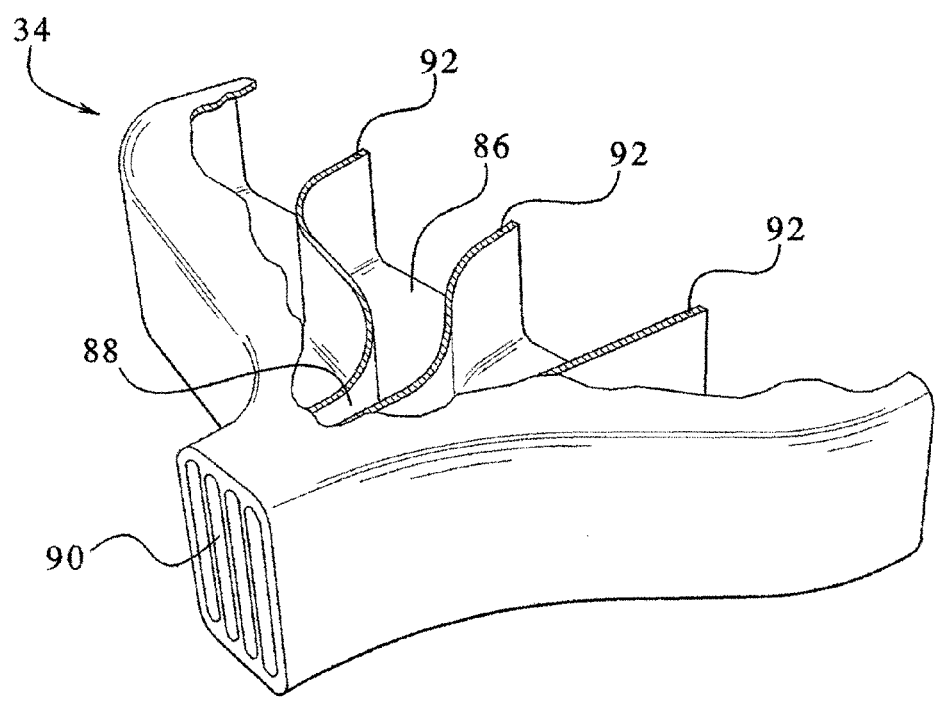
FIG. 16 is a bottom perspective view of the fluid director of the embodiment of the dispensing apparatus of FIG. 1 shown partially broken away to illustrate the channels in the fluid director.

In one alternative embodiment illustrated in FIG. 14, the carbonated water line 110 is connected to a single multi-way carbonated water valve 120, and the non-carbonated water line 112 is connected to a single multi-way non-carbonated water valve 122. When a user activates a beverage requester 36, the actuator 118 causes one of the multi-way valves to open and direct water to one of a plurality of channels 84 of the fluid director for a predetermined time period. It should be appreciated that any suitable device may alternatively be employed to appropriately direct the water and that the multiway valves may be employed in conjunction with the embodiments described herein which do not include a fluid director.

Water Dispenser of the Water Supplier

One embodiment of the present invention includes at least one and preferably a plurality of water dispensers for dispensing carbonated and non-carbonated water. The water dispensers facilitate and enhance the mixing process of the drink supply and the water, and particularly the consistency and quality of the water-drink supply mixture.

Figure 13:
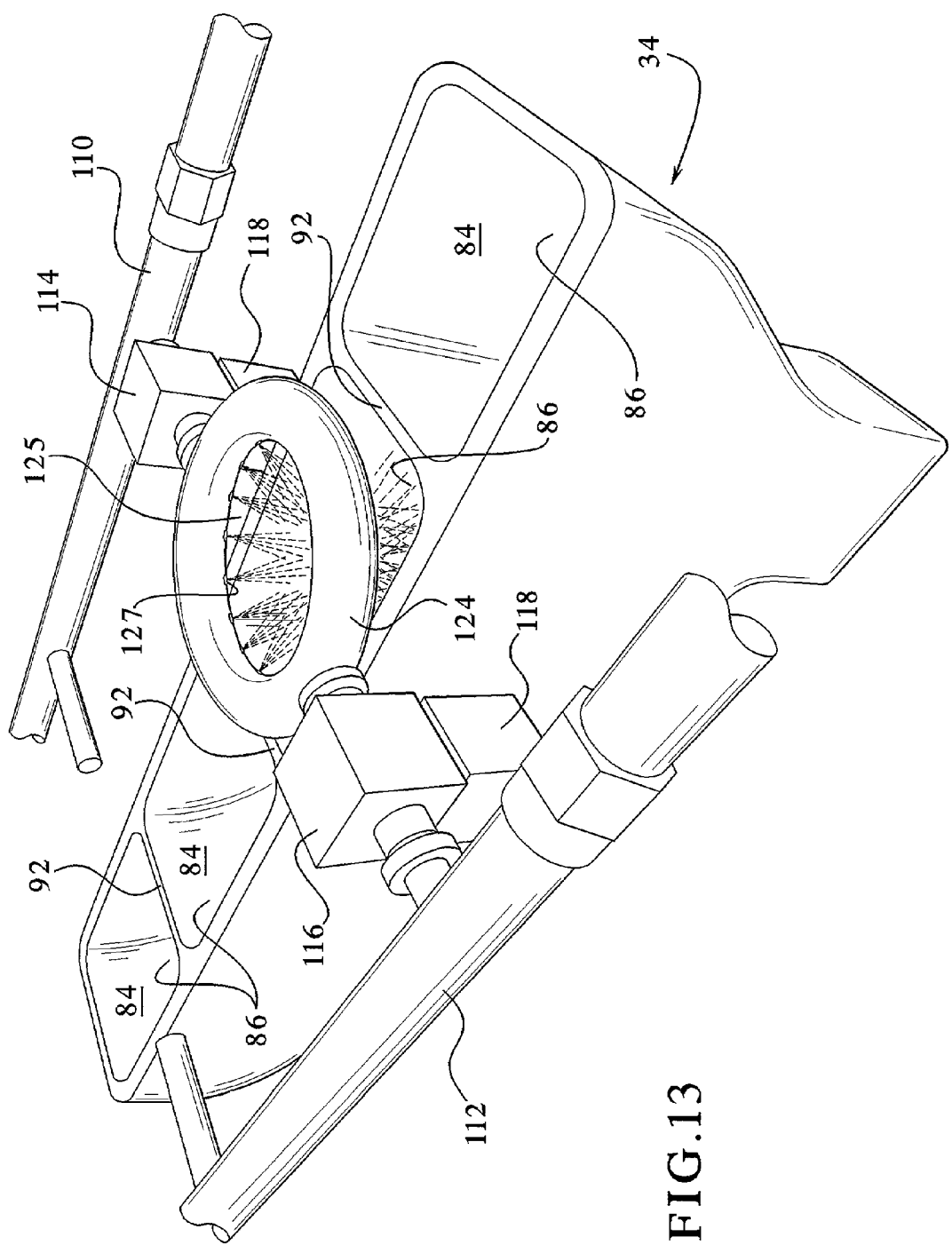
FIG. 13 is an enlarged fragmentary perspective view of part of the water supplier including the water dispenser or water ring directing water into the fluid director of the embodiment of the dispensing apparatus of FIG. 1.

As illustrated in FIG. 10, in one embodiment, each water dispenser is in the form of a water tube or water ring 124 disposed between and connected to the carbonated water line 110 and the non-carbonated water line 112. In one embodiment including the fluid director, the water rings 124 are positioned over each channel entrance 86 of the fluid director 34 as generally illustrated in FIGS. 10, 11A, 1B, 12 and 13 (all illustrating one of the water rings positioned above each channel). Depending on the request by the user (using the beverage dispenser) and the type of beverage to be dispensed, either the non-carbonated water valve 116 or the carbonated water valve 114 will be opened to cause non-carbonated water or carbonated water to flow into the appropriate water ring 124. The water ring 124 directs the water into the appropriate channel 84 of the fluid director 34 in the embodiment having the fluid director. In one embodiment, the water ring 124 is a substantially cylindrical tubular member (preferably made from polyvinylchloride ("PVC")) which defines a central aperture 125. In the embodiment having the fluid director, the drink supply from the appropriate drink supply canister is directed into the channel 84 of the fluid director 34 through the aperture 125, as illustrated in FIGS. 11B and 13. In the embodiment without the fluid director, as seen in FIG. 29, the drink supply from the appropriate drink supply canister 24 is directed directly into the beverage container through the aperture 125.

In the embodiment of FIGS. 11B and 13, the water ring 124 includes a plurality of relatively small openings or orifices 127 along its bottom or inner circumference. The orifices are preferably located on the inner diameter of the center of the water ring 124 preferably at a seventy (70) degree angle from the horizontal plane defined by the water ring. When water flows into the water ring from the water line 110 or 112, the water is directed through the orifices 127, forming a relatively evenly distributed circular spray of water. This circular spray completely surrounds the stream of drink supply which flows through the central aperture 125. The drink supply stream which in one embodiment is substantially cylindrical in shape, including a substantially cylindrical stream wall. The spray of the water streams from the water ring strikes and interacts with or penetrates this stream wall at a plurality of positions along the circumference of the drink supply stream wall. In this embodiment, there are a plurality of such positions which are approximately uniformly spaced about the entire circumference of the drink supply stream wall. In one alternative embodiment, there are at least four of such positions separated from one another by approximately ninety (90) degrees to provide sufficient penetration and mixture. It should be appreciated that other positions or arrangements may be employed in accordance with the present invention.

In a further embodiment, as discussed below in relation to FIG. 29, the water ring 124a includes a plurality of water injectors 125a for directing the carbonated or non-carbonated water into the drink supply stream. The water injectors 125a determine the approximate positions along the drink supply stream wall which will receive a flow or injection of water. The water injectors 125a also determine or control the angle at which the water will flow out of the water ring 124a. The specific water pressure, canister pressure, shape and dimension of the water ring and water injectors and the angular orientation of the water injectors all affect the water-drink supply mixing process. These factors or variables can be determined so as to establish a relatively high quality and reliable mixing process.

Figure 11A:
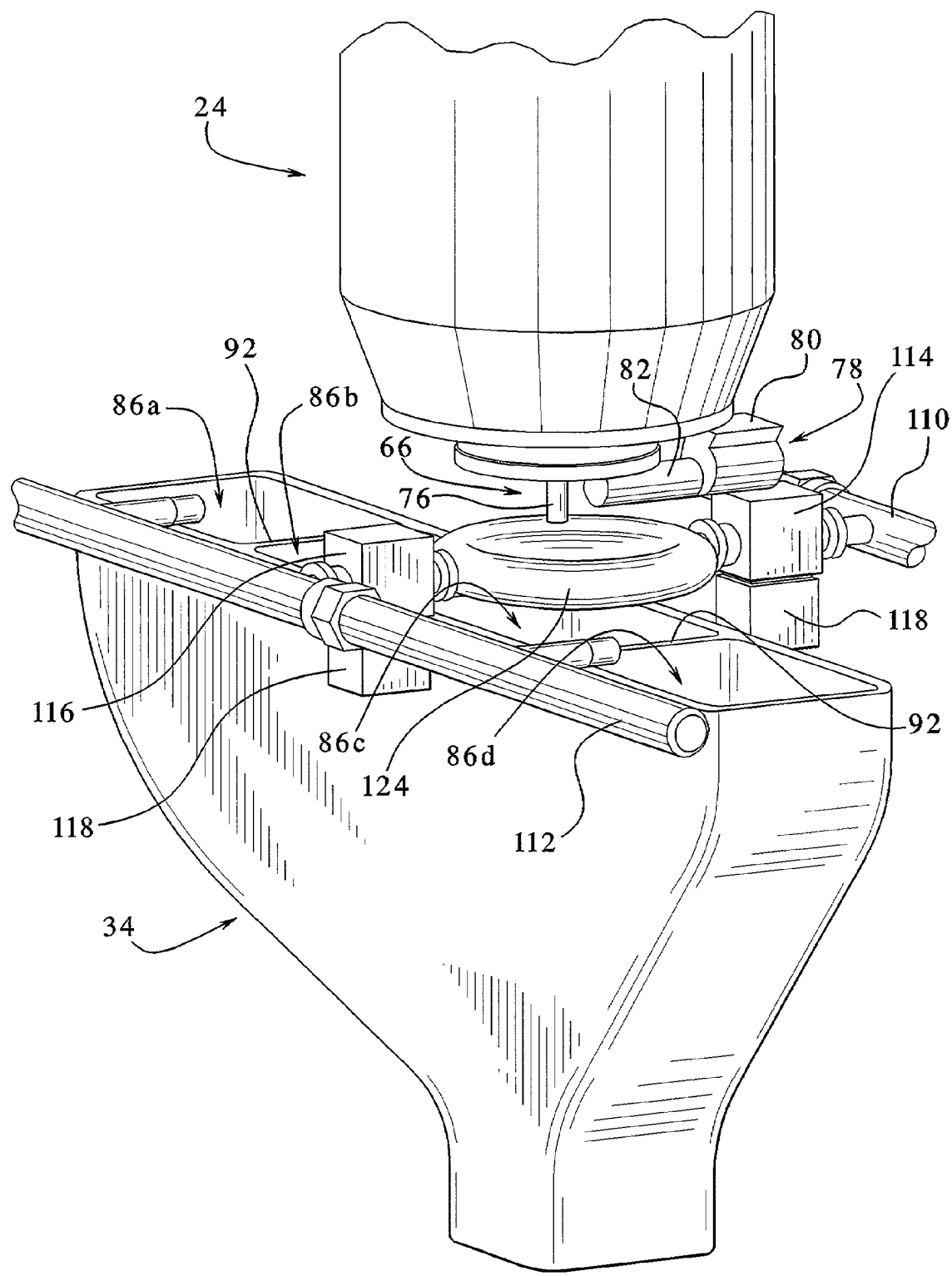
FIG. 11A is an enlarged fragmentary front perspective view of a drink supply canister, part of the water supplier including the water valves and value actuators and the fluid director of the embodiment of the dispensing apparatus of FIG. 1.
Figure 11B:
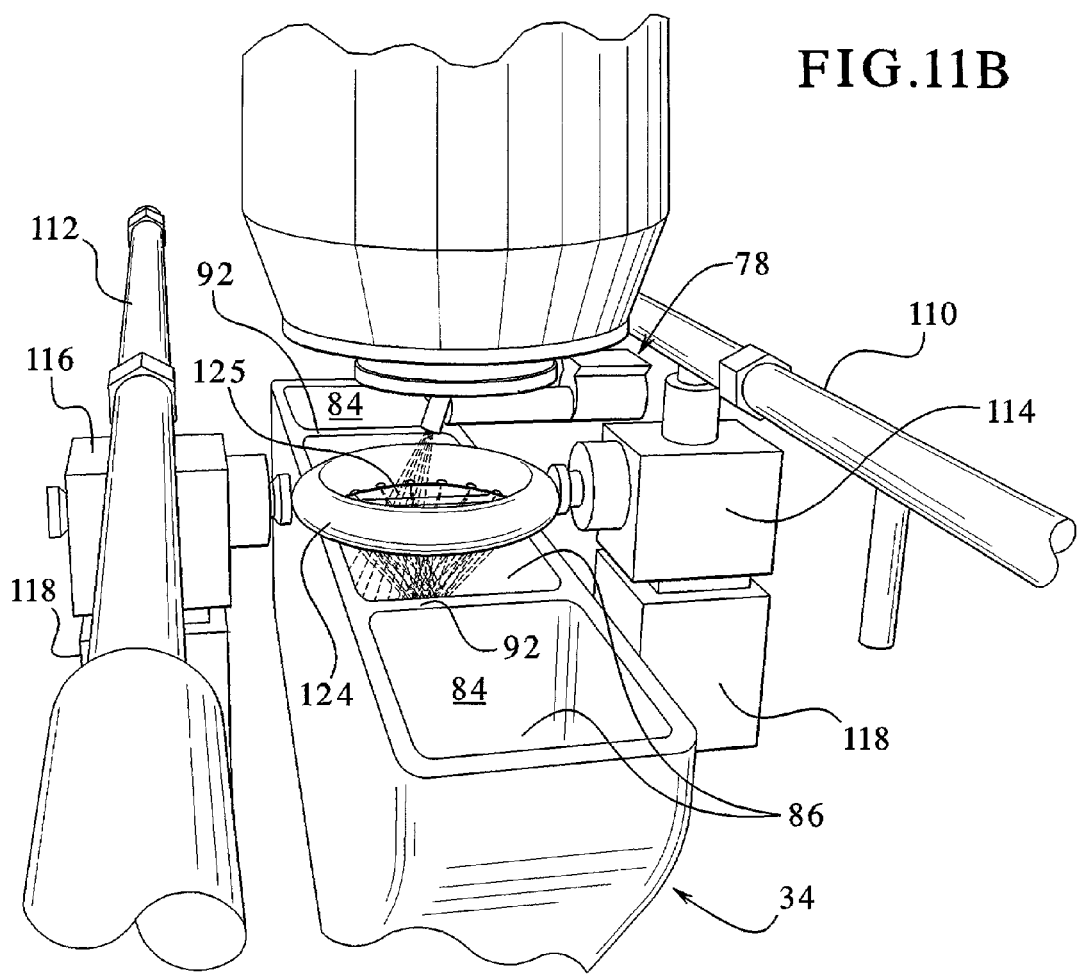
FIG. 11B is an enlarged fragmentary side perspective view of a drink supply canister, part of the water supplier including the water rings, the water valves and valve actuators and the fluid director of the embodiment of the dispensing apparatus of FIG. 1.
Figure 12:
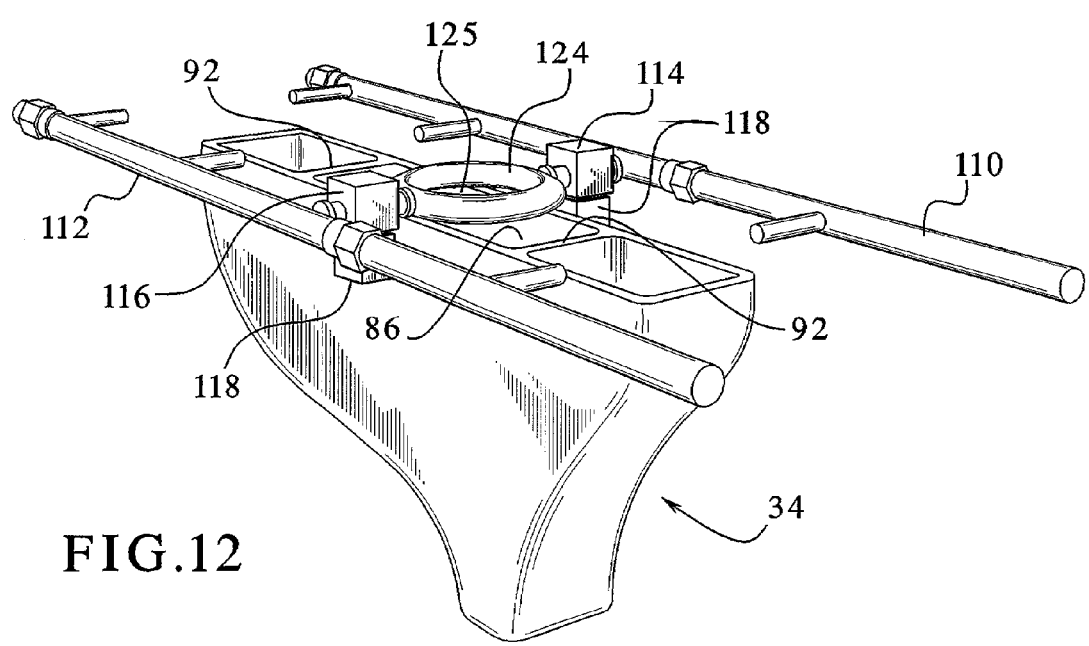
FIG. 12 is a perspective view of part of the water supplier including the water dispenser or water ring, and the fluid director of embodiment of the dispensing apparatus of FIG. 1.

As specifically illustrated in FIGS. 11A and 11B, the drink supply outlet valve 66 of the drink supply canister 24 is positioned above the central aperture of the water ring 124 to direct the drink supply into the channel 84 through the central aperture 125 in the water ring 124. In an alternative embodiment illustrated in FIG. 29, the drink supply canister is positioned offset from the water ring 124a (see FIG. 29). When the drink supply outlet valve actuator 78 engages the drink supply outlet valve 66, the drink supply is directed through the central aperture of the water ring (as illustrated in phantom in FIG. 29).

In one alternative embodiment, the carbonated water lines and valves are connected to a single water dispenser (not shown). The water dispenser includes internal walls which form separate sections for each carbonated water valve. The non-carbonated water line and valves are also connected to a single water dispenser (not shown). This water dispenser includes internal walls which form separate sections for each non-carbonated water valve. In a further alternative embodiment, a plurality of water rings (not shown) are connected or joined, forming a single member which distributes water in the same manner as if the water rings were separated. In a further alternative embodiment, the water dispenser includes opposing water injectors connected to the valves which direct carbonated and non-carbonated water in the appropriate direction to mix with the drink supply from the drink supply canisters.

Figure 11C:
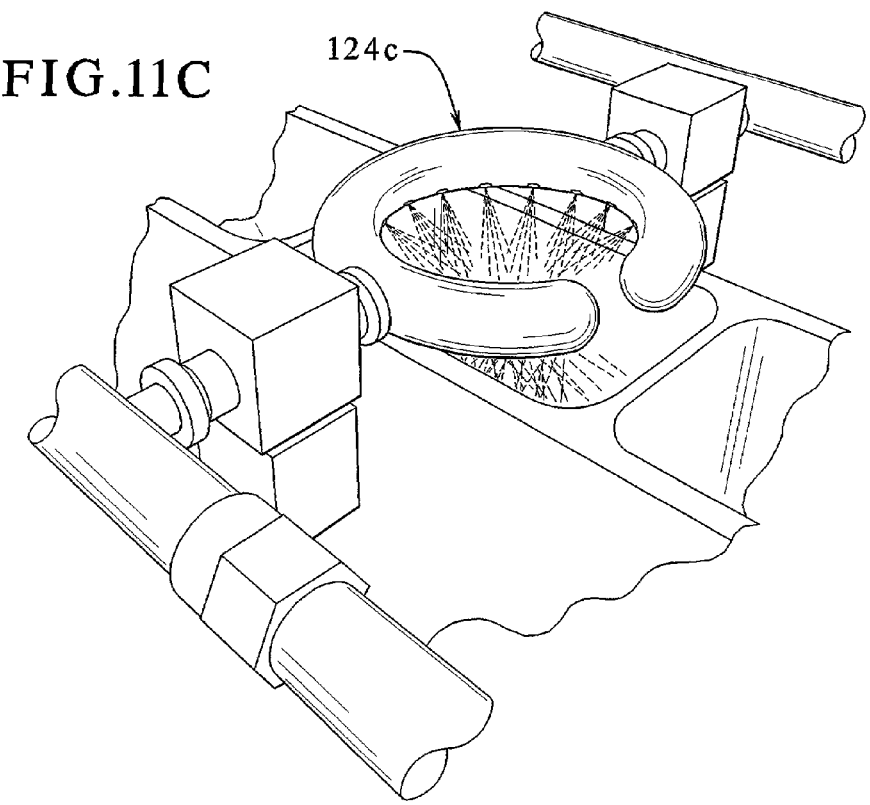
FIG. 11C is an enlarged fragmentary perspective view of part of the water supplier including an alternative embodiment of the water ring of the present invention.
Figure 11D:
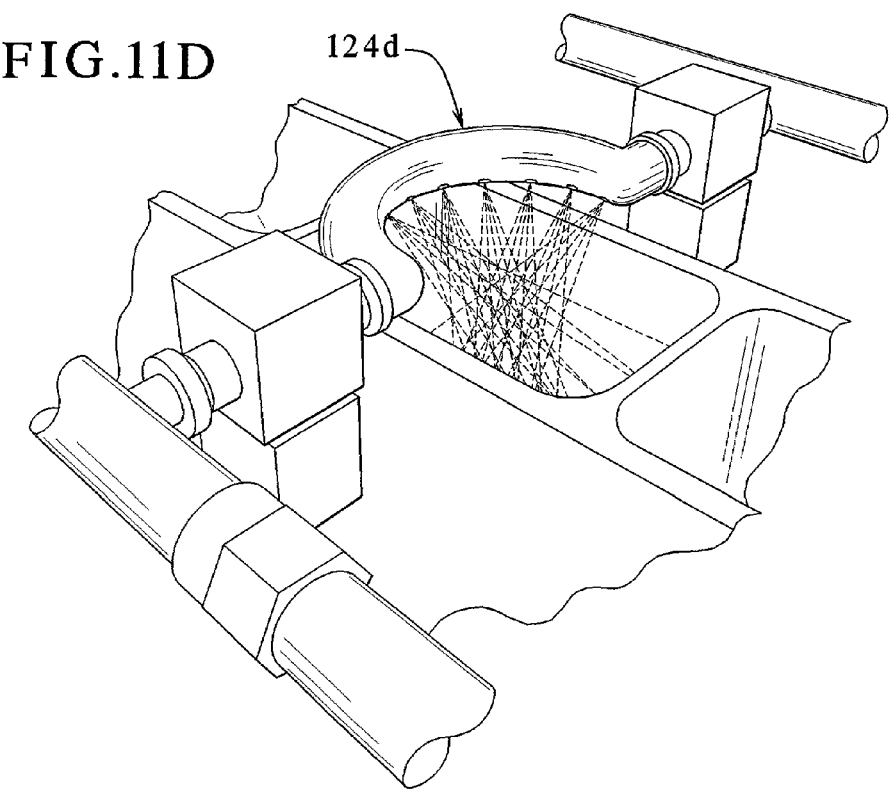
FIG. 11D is an enlarged fragmentary perspective view of a further alternative embodiment of the water supplier including an alternative embodiment of the water tube of the present invention.

It should be appreciated that the water dispenser or water tube of the present invention does not have to be circular, cylindrical or substantially cylindrical. The water tube of the present invention may be any suitable shape. For instance, the water tube 124c may not be completely circular as illustrated in FIG. 11C. The water tube 124d may also, for instance, be semi-circular as illustrated in FIG. 11D. Preferably, the water tube does not include sharp turns which tend to cause turbulence in the water tube and unequal dispensing of the water.

Gas Supplier

The gas supplier, in one embodiment of the beverage dispenser, facilitates the steady and consistent dispensing of the drink supply from the drink supply canister. As dispensing occurs, the gas supplier ensures that the drink supply flow rate out of the drink supply canister does not substantially change even though the volume of drink supply in the drink supply canister is steadily decreasing. The gas supplier applies a pressure to the inside of the drink supply canisters which is controlled by one or more regulators which adjust the gas pressure as necessary to produce this steady drink supply flow rate. The control over the flow rate enables the beverage dispenser of the present invention to control the brix or ratio of drink supply and carbonated or non-carbonated water.

One embodiment of the gas supplier 28 of the beverage dispenser 10 includes one or more, and preferably a plurality of gas supply canisters 126 which contain $CO_2$ gas, as generally illustrated in FIGS. 2, 3, 22 and 23. In one embodiment, the gas supply canisters 126 are cylindrical in shape, although the gas supply canisters may be any suitable shape. The gas supply canisters may be constructed from any suitable material having a wall thickness suitable for the storage of gas in the approximate pressure range of eight hundred (800) to one thousand (1000) PSI. The gas supply canisters preferably include a suitable gas canister valve (not shown) for allowing the release of the $CO_2$ gas from the gas supply canister.

In one embodiment, the gas supply canisters 126 hold one hundred (100) grams or less, and preferably seventy-eight (78) grams or less of $CO_2$ gas. Certain shipping regulations allow a plurality of $CO_2$ supply canisters, each holding seventy-eight (78) grams or less of $CO_2$, to be shipped in the same box or package. Thus, in this embodiment, several $CO_2$ gas supply canisters can be shipped to a user in a single package. It should be appreciated that the gas supply canister size, shape and material can vary to accommodate various shipping regulations and manufacturing and distribution methods.

Figure 22:
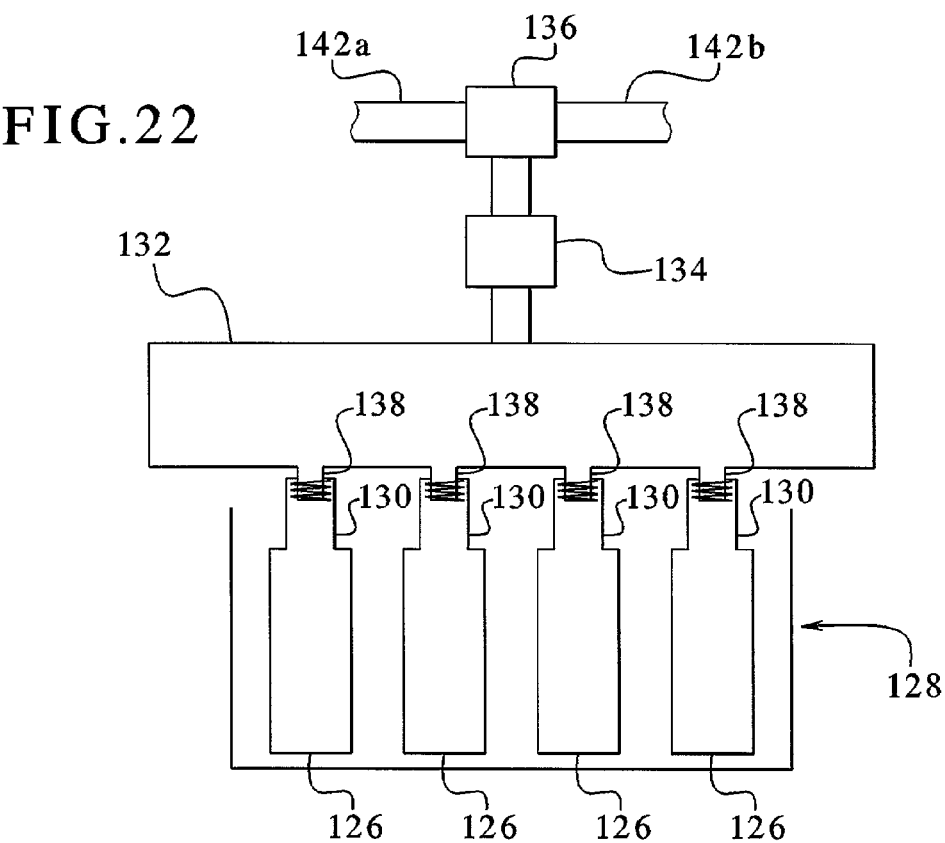
FIG. 22 is a schematic diagram of the gas supply canister holder, gas supply canisters, gas manifold, gas pressure regulator and two-way gas valve of an alternative embodiment of the present invention.

In the embodiment of the present invention illustrated in FIG. 22, the gas supplier includes a gas supply canister holder or frame 128 which is preferably attached to or mounted in the interior in a secure lockable location out of children's reach and adapted to hold the gas supply canisters 126. Each gas supply canister 126 includes a gas canister valve 130 as also illustrated in FIG. 3 for facilitating release of the $CO_2$ gas from the gas supply canisters. The gas supplier 28 includes a gas manifold 132 connected to the gas supply canister holder or frame 128 and adapted to direct the gas to a gas pressure regulator 134 and a two-way gas valve 136. The gas manifold 132 can be any suitable encasement or reservoir, preferably adapted to hold $CO_2$ gas at a maximum pressure of one thousand (1000) PSI, and preferably at least eight hundred (800) PSI. When a gas supply canister is connected to the gas manifold, the gas manifolds equalizes or substantially equalizes the pressurized gas provided by each gas supply canister and provides a single stream of gas.

In the embodiment illustrated in FIG. 22, the gas manifold 132 includes a plurality of gas manifold valves 138. Each gas supply canister 126 is adapted to be connected to one of the gas manifold valves 138 in any suitable manner such as by a threaded connection. The gas manifold 132 is intended to provide a sufficient quantity or volume of carbon-dioxide gas to the carbonation tank 106. In this embodiment, the $CO_2$ gas is transferred via flexible braided tubing (not shown) providing a consistent inescapable supply of $CO_2$ gas to both the carbonation tank 106 as well as the drink supply canisters 24. The gas manifold 132 connected to the gas supply canisters is preferably a conventional safe transfer device that provides consistent low pressure flow to the drink supply canisters.

Figure 23:
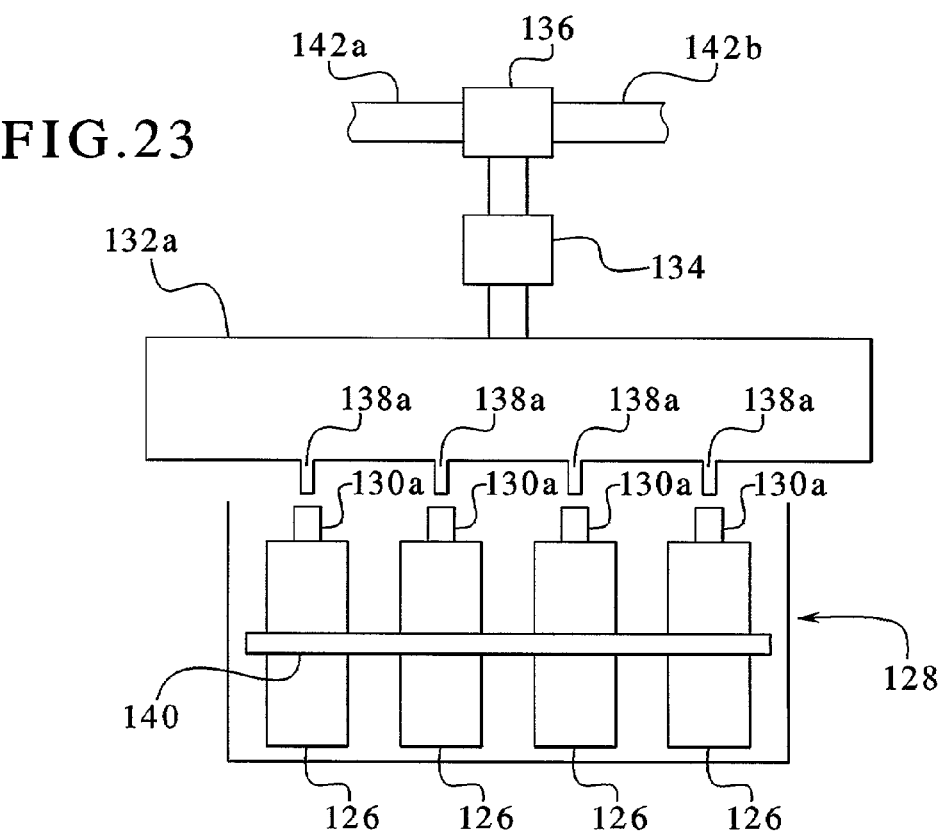
FIG. 23 is a schematic diagram of the gas supply canister holder, gas supply canisters, gas supply canister binder, gas manifold, gas pressure regulator and two-way gas valve of an alternative embodiment of the present invention.

In another embodiment illustrated in FIG. 23, a gas supply canister binder 140 is adapted to join, bind or connect a plurality of gas supply canisters 126. The gas supply canister binder 140 can include a plastic or polymer-based template adapted to snap-fit on the plurality of gas supply canisters 126. It should be appreciated that the gas supply canister binder 140 could alternatively include any device which suitably joins or connects two or more gas supply canisters 126. Gas supply canister binder 140 maintains a pre-determined distance between each gas supply canister and also enables a user to conveniently install a plurality of gas supply canisters 126 as a single unit. In the embodiment illustrated in FIG. 23, the connected gas supply canisters 126 are connected to the manifold by a sliding, slotted or snap mechanism.

In one step, by inserting the pack of connected gas supply canisters 126 into the gas supply canister holder 128, the user opens all of the gas supply canister valves 130a and gas manifold valves 138a. After the pack is connected to the manifold 132a, the gas flows from the gas supply canisters 126 into the gas manifold 132a.

In one embodiment, the gas pressure regulator 134 is a conventional regulator adapted to reduce $CO_2$ gas pressure to levels in the approximate pressure range between ten (10) and eighty (80) PSI. The two-way gas valve 136 is connected to gas lines 142a and 142b. Gas line 142a communicates gas to the drink supply canisters 24, and gas line 142b communicates gas to the water supplier 26.

Referring back to FIGS. 8 and 9, gas line 142a is connected to a gas conduit 144. In this embodiment, the gas conduit 144 is connected to one or more, and preferably a plurality of gas feed lines 146a to 146d. Each gas feed line is connected to one of the tubular gas injectors 148a to 148d which extend through the drink supply canister securing member 48. When the drink supply canister securing member 48 is closed, gas injectors 148a to 148d engage drink supply canisters 24 and communicate gas to the drink supply canisters through the gas inlet valves of the canisters.

In one embodiment further illustrated in FIGS. 20 and 21, the gas supplier valve 54 includes a tubular guide member 151 which is adapted to engage the drink supply canister to prevent gas from escaping, and gas supplier valves 54a to 54d are housed within these guide members and connected to the gas feed lines 146a to 146d. Each gas supplier valve in this embodiment includes a sealing member 150 and a spring 152.

To enable the drink supply canister securing member 48 to open and close, gas feed lines 146a, 146b, 146c and 146d are preferably any suitable flexible communication line such as a rubber, polymer or coiled aluminum connector or hose. Alternatively, the connection between gas line 142a and gas conduits 146a to 146d can be any suitable rotatable or movable connection. It should also be appreciated that the drink supply canister holder may be alternatively constructed such that the gas feed lines are stationary and the drink supply canisters are positioned to engage the feed lines.

As illustrated in FIGS. 22 and 23, the gas supply canisters 126 of the gas supplier 28 are filled with gas in any suitable manner. In one embodiment, the gas supply canisters 126 are filled with gas by directing gas through the gas canister valves 130. In another embodiment, a valve is constructed within a wall of the gas supply canister for gas filling purposes. This valve may have only a one-time use or it may be used repeatedly for the purpose of refilling used gas supply canisters. It should be appreciated that, instead of obtaining gas from gas supply canisters for pressurizing the drink supply canisters 24, an air or gas compressor or generator (not shown) can be connected to the gas line 142a to provide pressurized air or gas for the pressurization of the drink supply canisters 24.

As mentioned above, gas line 142b is connected to the carbonation tank 106, to direct $CO_2$ gas to produce carbonated water. As described above, the interaction of the $CO_2$ gas and non-carbonated water creates carbonated water in a conventional manner.

In the alternative embodiment illustrated in FIGS. 24A, 24B, 24C and 24D, the gas supplier 28a includes a gas supply canister 126 which is mounted directly to gas line 142a and positioned adjacent to the drink supply canister holder 22. The gas supply canister 126 is connected to a gas pressure regulator 134, a gas manifold 132 and a two-way gas valve 136. The two-way gas valve 136 is connected to gas line 142a and gas line 142b. As indicated above, gas line 142a directs $CO_2$ gas to gas conduit 144 (see FIGS. 9 and 24A), gas feed lines 146a, 146b, 146c and 146d and ultimately to the drink supply canisters 24. As indicated above, gas line 142b directs gas to the carbonation tank 106 for the production of carbonated water. In this embodiment, a user can access the gas supply canister 126 by opening drink supply canister access door 40 (see FIGS. 1, 4 and 5). It should be appreciated that other suitable mechanisms may be employed to enable a user to access the gas supply canister(s).

It should further be appreciated from FIGS. 24A, 24B, 24C and 24D that the water is supplied from a water source which travels through a water filter 96 and a water pump 98 to the carbonation tank 106 as described above. The carbonation tank 106 mixes the water and the $CO_2$ gas to form carbonated water which is supplied via the carbonated water fluid communication line 110 to the water dispensers. It should also be appreciated that the water source provides non-carbonated water through the non-carbonated fluid communication line 112 to the water dispensers as described above.

Figure 24A:
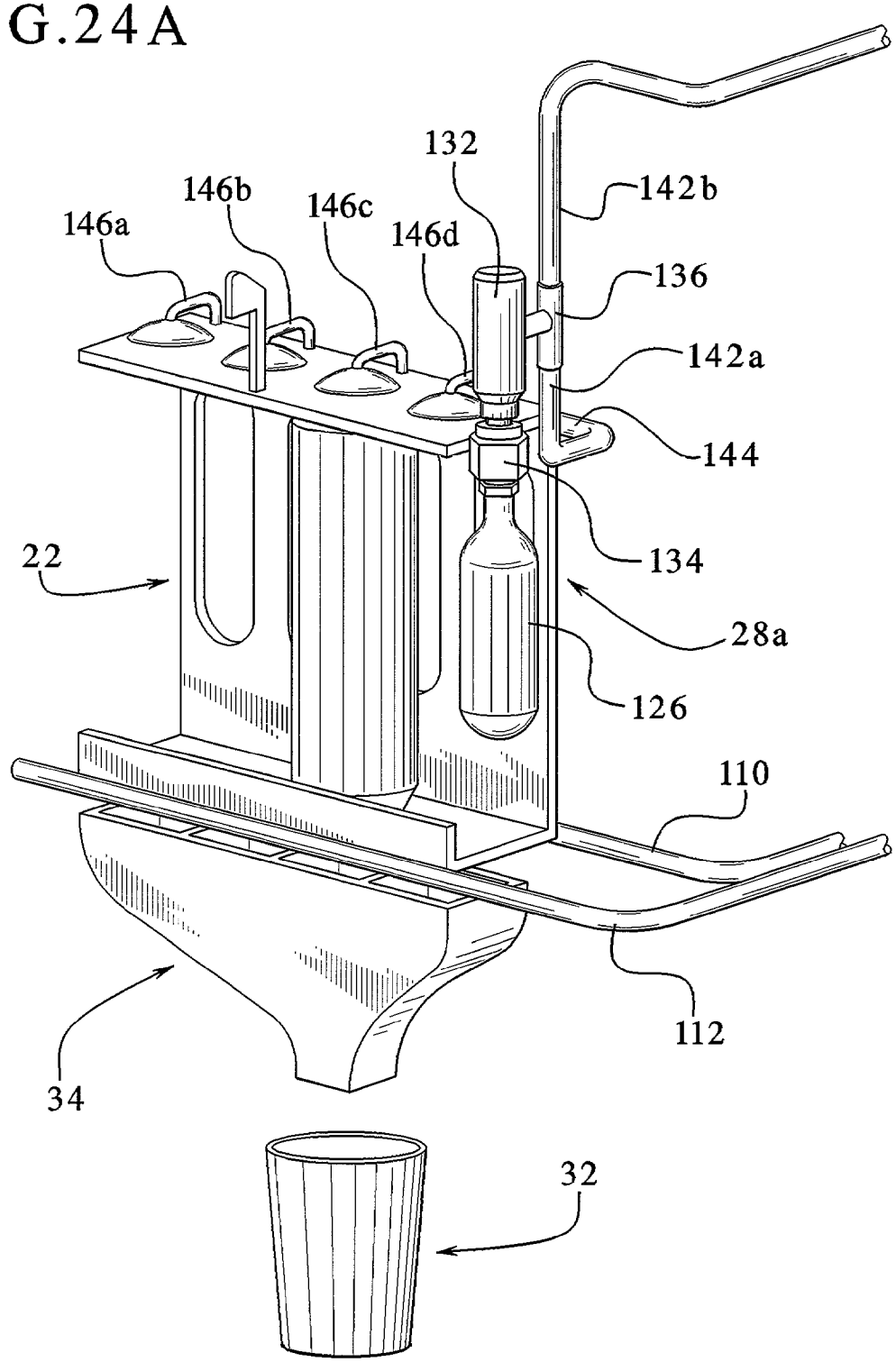
FIG. 24A is a fragmentary perspective view of an alternative embodiment of the present invention shown removed from the refrigerator and including the drink supply canister holder, a drink supply canister, a fluid director and a gas supplier.
Figure 24B:
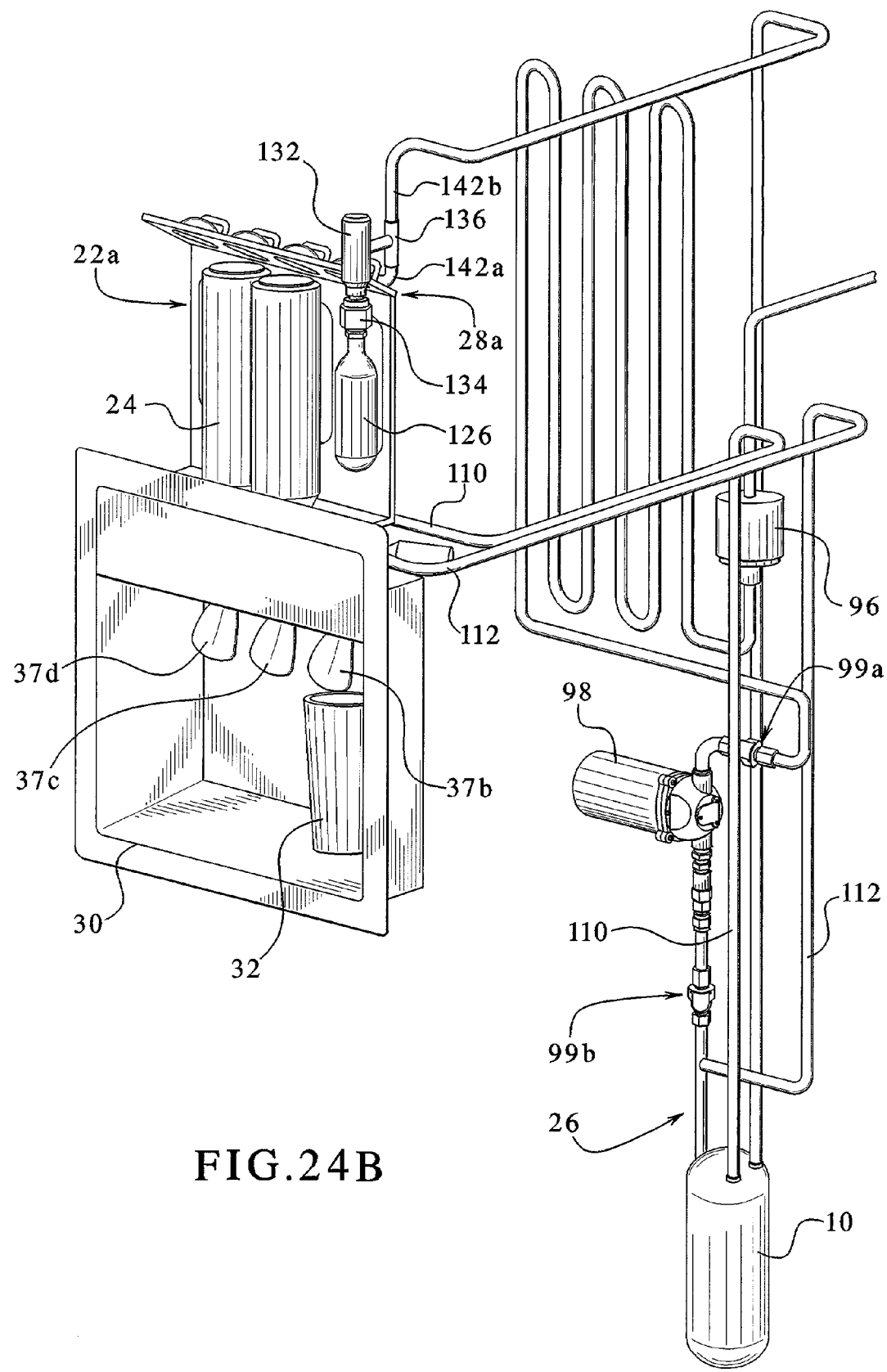
FIGS. 24B, 24C and 24D are fragmentary perspective views of an alternative embodiment of the present invention shown removed from the refrigerator and including the beverage requesters, drink supplier, water supplier and gas supplier.
Figure 24C:
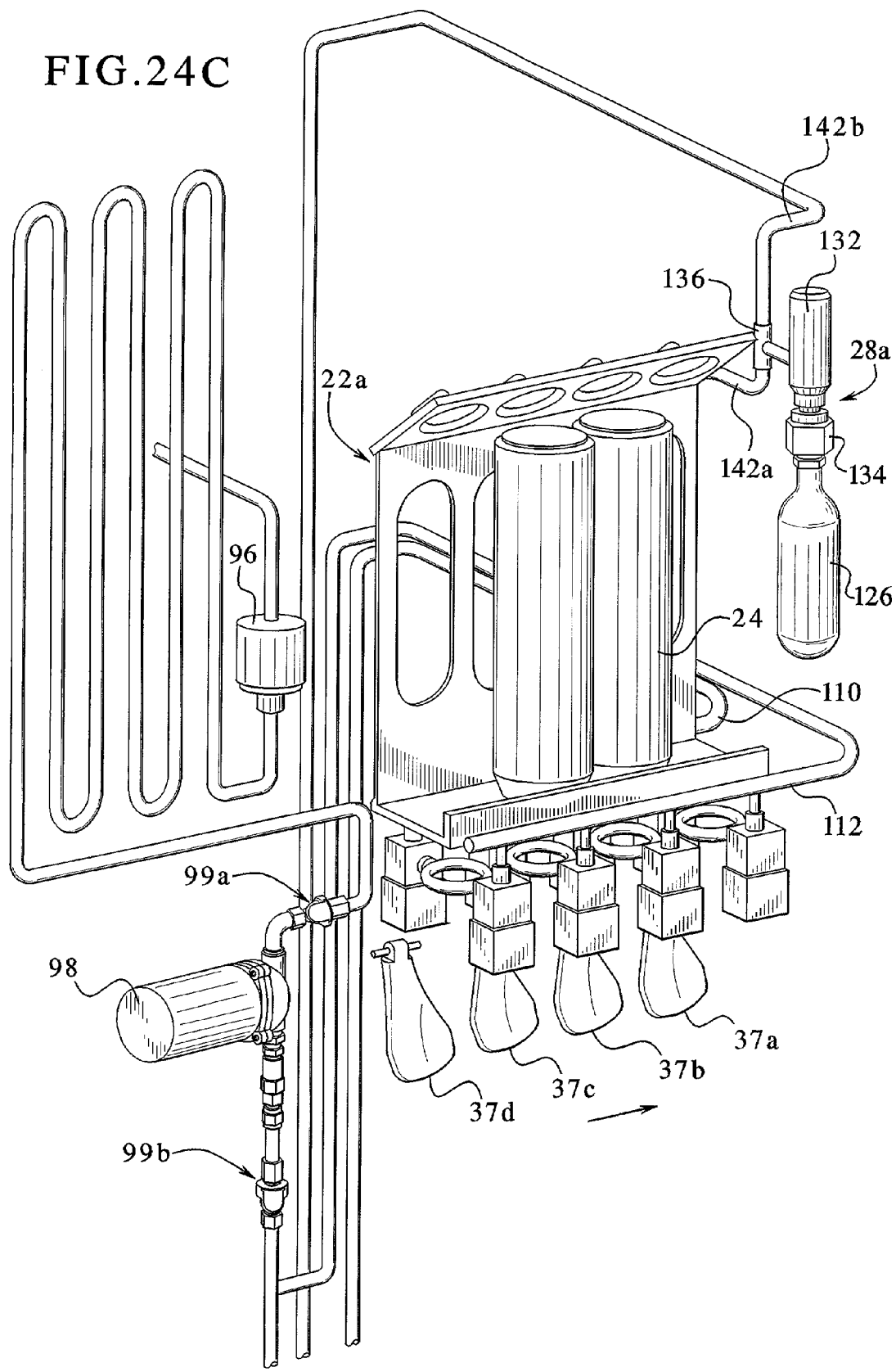
Figure 24D:
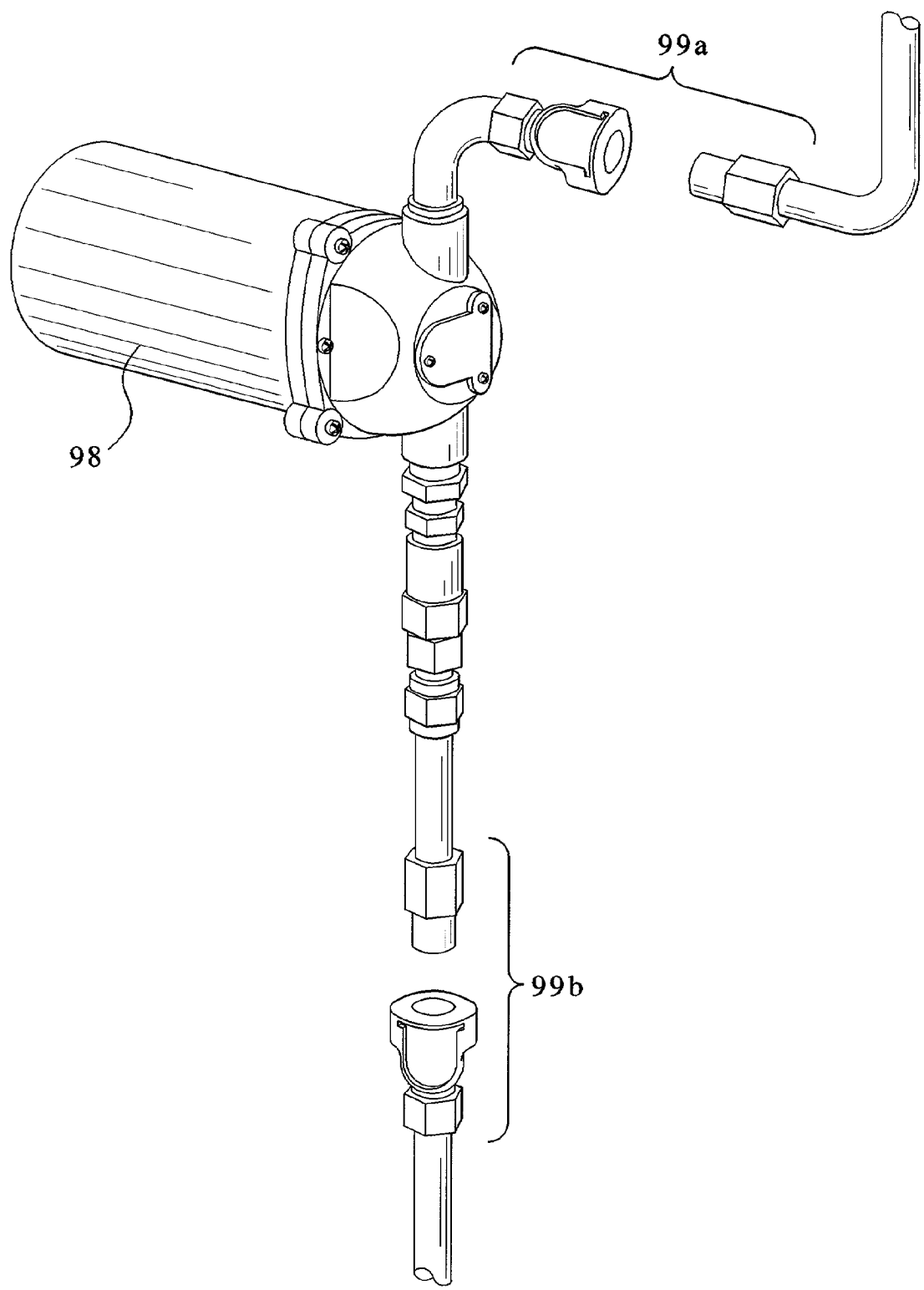

As illustrated in FIGS. 24B, 24C and 24D, in one preferred embodiment of the present invention, the water pump 98 is connected to the system by conventional quick disconnect connections 99a and 99b. These connections facilitate the assembly of the water supplier and any repair or replacement necessary of the water pump. It should further be appreciated that quick disconnect connections may also be employed for the water filter and one or more other components of the beverage dispenser.

In an alternative embodiment, a gas supply canister (not shown) is directly connected to each drink supply canister. The gas supply canister can be connected to the drink supply canister in any suitable fashion, such as a press fit, threadable engagement or a suitable connection. In addition, the connection can involve suitable valves constructed within the drink supply canister and the gas supply canister. In this embodiment, a separate supply of gas can be used for producing the carbonated water. This gas supply can be connected directly to the carbonation tank.

Valves And Valve Actuators

As illustrated in FIG. 11A and as described above, one embodiment of the dispensing apparatus 10 includes a plurality of valves and valve actuators, including the drink supply outlet valves 66, carbonated water valves 114 and non-carbonated water valves 116. In one embodiment, each valve is adapted to be activated by a valve actuator. In one embodiment, drink supply outlet valve actuators 78 are used to activate the drink supply outlet valves 66, and the water valve actuators 118 are used to activate the carbonated water valves 114 and the non-carbonated valves 116.

Figure 17:
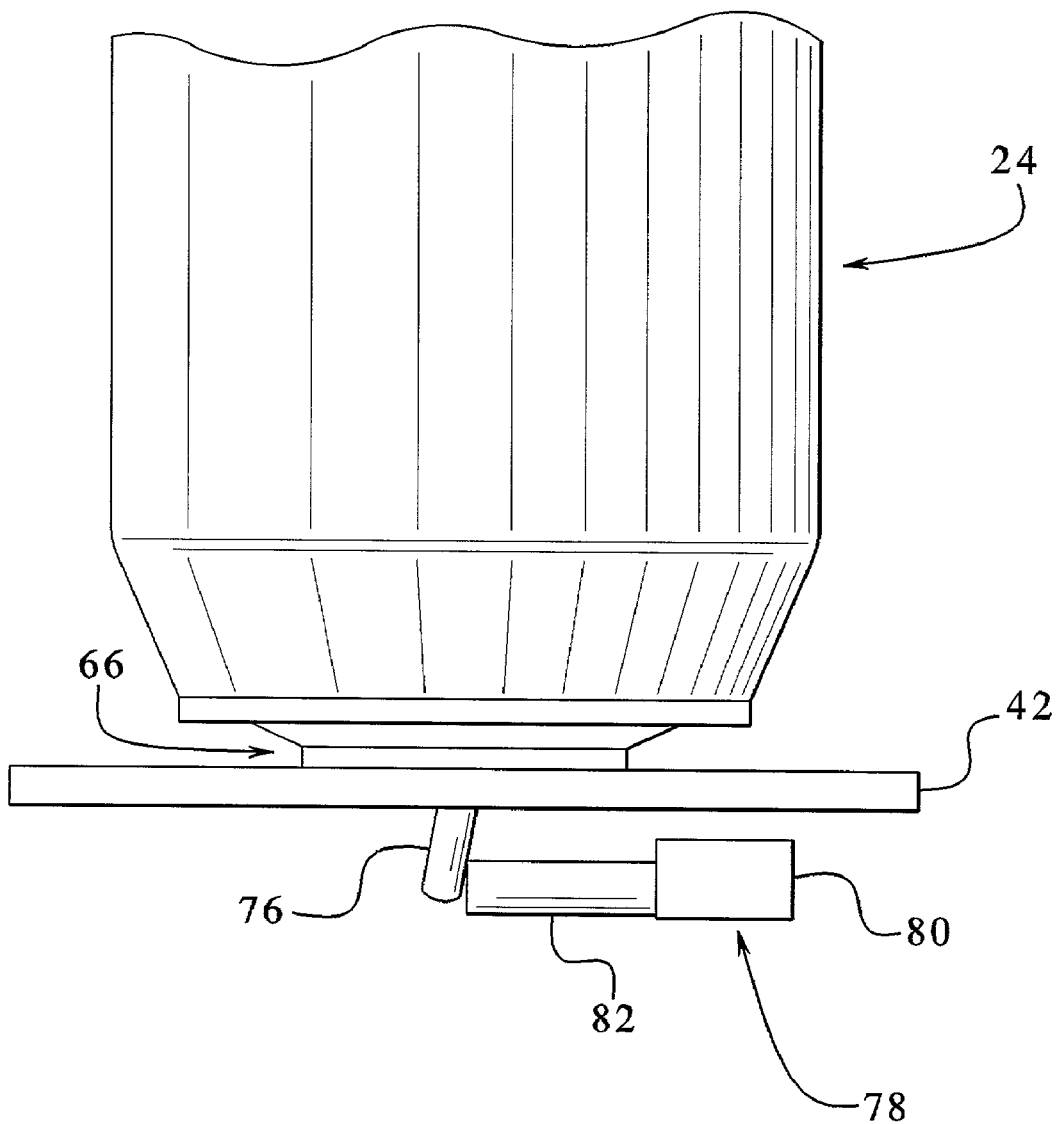
FIG. 17 is an enlarged fragmentary perspective view of the drink supply canister relative to the drink supply canister holder and the drink supply valve actuator for the drink supply outlet valve in the embodiment of the dispensing apparatus of FIG. 1.
Figure 17A:
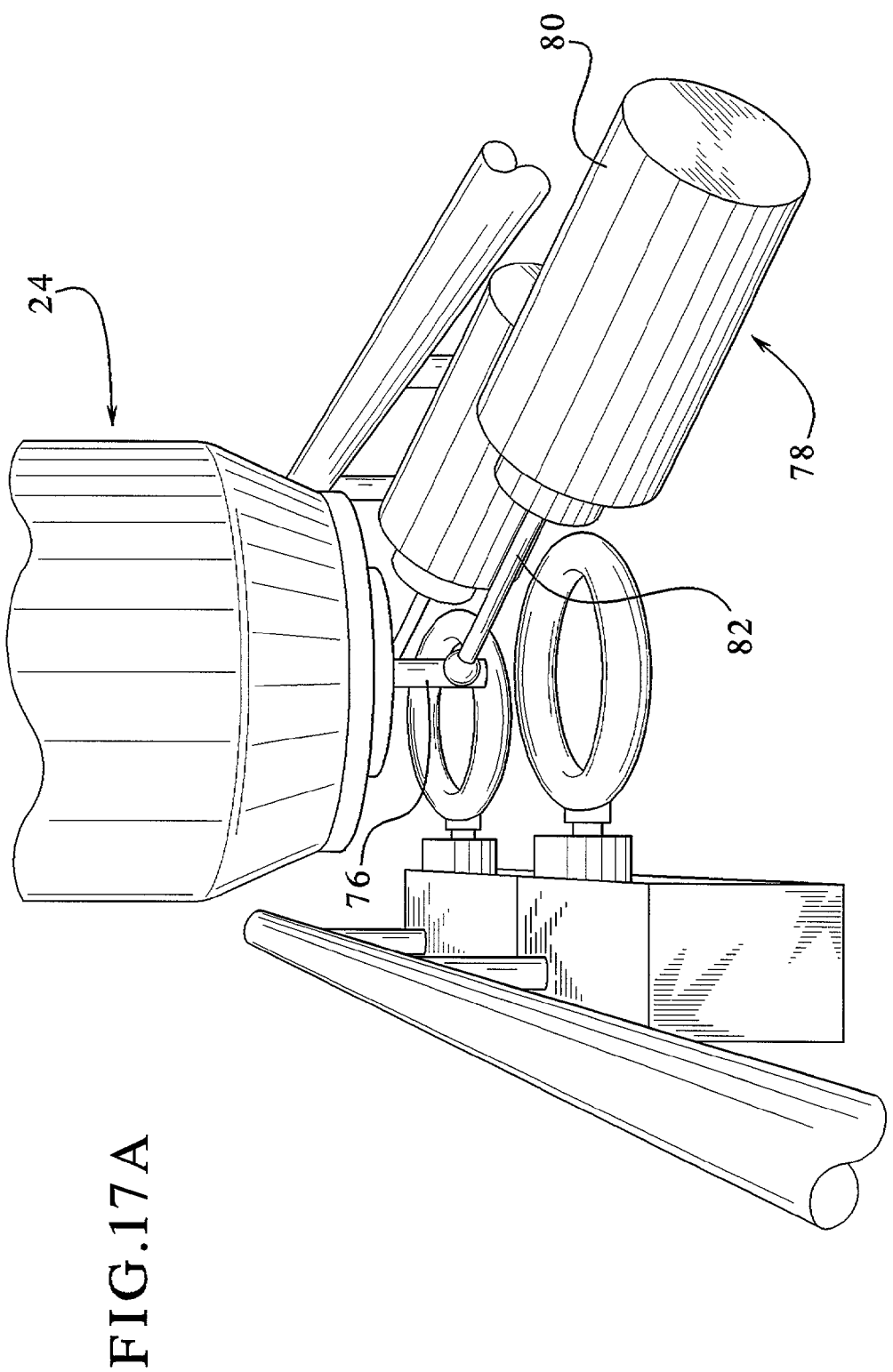
FIG. 17A is an enlarged fragmentary perspective view of the drink supply canister and an alternative embodiment of the drink supply valve actuator.
Figure 18:
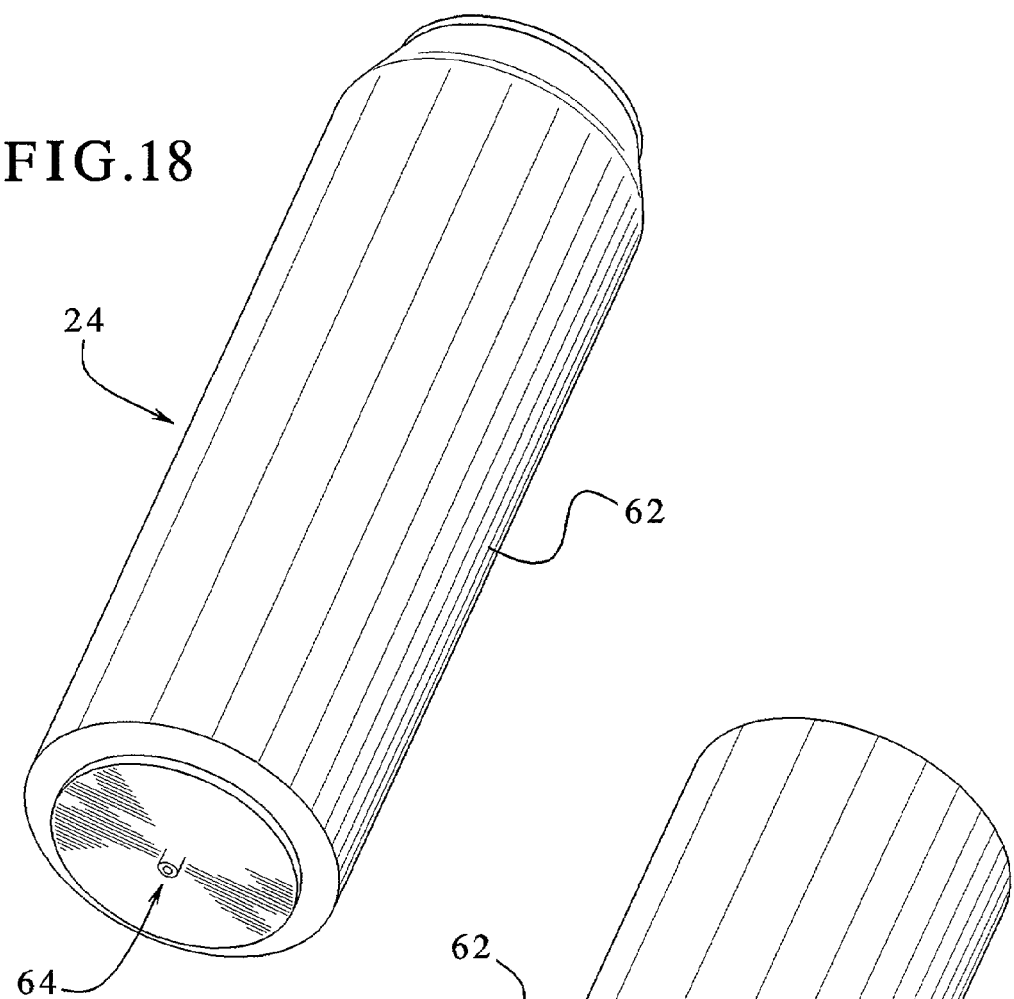
FIG. 18 is a perspective view of the top end of the drink supply canister having the gas inlet valve in the embodiment of the dispensing apparatus of FIG. 1.

In one embodiment, the drink supply outlet valve actuator 78 includes an extension rod 82 extending from a solenoid adapted to engage the spout 76 to cause the sealing member 74 to unseat as indicated above and illustrated in FIGS. 11B and 17. When the spout 76 is engaged by the actuator 78, the pressurized drink supply is released through the drink supply outlet valve 66 of the drink supply canister 24 and is directed through the central aperture 125 in the water ring 124 into the appropriate channel 84 of the fluid director 34 (in the embodiment having the fluid director). Simultaneously, the appropriate actuator 118 is activated to cause the carbonated water valve 114 or the non-carbonated water valve 116 to open. Carbonated or non-carbonated water is directed into the same channel 84 of the fluid director 34 (in the embodiment having the fluid director) as described above and specifically illustrated in FIGS. 11B and 13.

The drink supply outlet valve and the drink supply outlet valve actuator co-act to cause the appropriate amount of drink supply to be dispensed. It should be appreciated that alternative embodiments of the drink supply outlet valve and the drink supply outlet valve actuator may be employed in the beverage dispenser in accordance with the present invention. One such alternative embodiment is illustrated in FIGS. 37A to 37F and discussed below.

Controller

One embodiment of the present invention includes a controller 38 including a computer and electronic components and connections as illustrated in FIG. 3. The computer includes at least one processor 156 and one or more memory devices 158. Preferably, the controller 38 is housed within the refrigerator 12, however it should be appreciated that it can be located outside the refrigerator 12. In such case, electrical communication lines or wire communication are preferably used to facilitate communication between the controller 38, the actuators and other components housed within the refrigerator 12. Alternatively, wireless communication may be employed.

In one embodiment, the memory devices 158 are adapted to store data and at least one actuator program. The actuator program provides the processor 158 with instructions for controlling the operation of the valve actuators. The actuator program enables the processor to synchronize the operation of the actuators which controls the opening and closing of the valves in response to inputs. An input could be, for example, a signal generated when a user activates or pushes one of the beverage requesters 36. The actuator program also provides the processor with instructions for controlling the duration during which various valves remain open.

It should be appreciated that the dispensing apparatus of the present invention can be adapted to receive and store data associated with predetermined drink supplies or beverages. The processor 156 can use this data in conjunction with the actuator program to produce beverages in accordance with predetermined specifications. For example, certain beverages may require different percentages of drink supply and carbonated water, certain beverages may require different percentages of drink supply and non-carbonated water, and certain beverages may require different percentages of drink supply and carbonated and non-carbonated water (to vary the level of carbonation). This information or data can be loaded and stored in the memory device for the production of specific beverages.

In the embodiment where the beverage dispenser includes an input device such as a touch screen, the beverage dispensing system of the present invention may enable a user to input the type of drink supply and the position of the drink supply such that the controller knows or can determine the appropriate brix ratio. It should be appreciated that the present invention can alternatively include at least one reader or sensor (not shown) for determining the type of drink supply from a label or other readable device on the drink supply canister In one further embodiment of the present invention, the beverage dispenser includes an optical sensor or any other suitable type of sensor (not shown). The sensor is connected to the controller. The sensor detects when a cup or beverage container is in the beverage container compartment. If the beverage container is at a position in the compartment, the controller will enable the valve actuators to function. This prevents the valve actuators from causing the drink supply and the water to be dispensed when a beverage cup or beverage container is not present in the beverage dispensing compartment or in the correct position in the beverage dispensing compartment. Referring back to the embodiment illustrated in FIGS. 24B and 24C, the user must place the beverage container beneath the desired beverage requester 37a to 37d in order to obtain a desired beverage. The beverage dispenser may include a plurality of optical sensors, one associated with each beverage requester. These sensors can detect if a beverage container is properly located beneath the particular beverage requester pushed by a user. Such sensors are designed to prevent beverage waste.

Further Alternative Embodiments

In one alternative embodiment of the present invention, illustrated in FIG. 25, beverage dispenser 10a includes a drink supply canister holder 22a which is pivotally mounted within the refrigerator 12a. The drink canister access door 40a is rigidly connected to the drink supply canister holder 22a, and functions as a handle for accessing the drink supply canister holder 22a. A user can tilt or rotate the drink supply canister holder 22a by pulling on the upper portion of the drink canister access door 40a. It should be appreciated that the drink supply canister securing member (not shown) of the canister holder 22a is preferably separated from the canister holder 22a. The securing member (not shown) is mounted within the refrigerator in such a manner that when the canister holder 22a is tilted outwardly, the securing member (not shown) disengages the canister holder 22a. When a user pivots canister holder 22a back to a vertical position, the securing member (not shown) automatically engages the canister holder 22a as well as the drink supply canisters 24 therein. As the securing member engages the drink supply canisters, $CO_2$ gas or pressurized air flows into the canister for the purpose of delivering pressure for the dispensing of the drink supply as described above. It should be appreciated that the drink supply canister holder of the present invention may be removably mounted in the freezer or refrigerator compartment.

In another embodiment illustrated in FIG. 26, the beverage dispenser 10b includes a drink supply canister access door 40b which is slidably mounted to the exterior of or in the freezer compartment door 14b. A user can open the drink supply canister access door 40b by sliding it upwardly to an open position as illustrated in FIG. 26. Through the use of one or more conventional springs or other suitable mechanisms, the door will remain in the open position until a user closes it. It should also be appreciated that the drink supply canister holder may alternatively be constructed as a slidable draw mechanism to facilitate access to the drink container.

Similarly, it should be appreciated that the fluid director access door may be alternatively constructed for the embodiment including the fluid director. For instance, the fluid director access door may be connected to a drawer member (not shown). The drawer member may be horizontally and slidably mounted within the refrigerator. The fluid director is supported by the drawer member and fits within one or more slots included in the drawer member. When a user pulls out the drawer member, the fluid director becomes accessible to a user. A user can remove the fluid director from the drawer member, clean it and replace it.

Figure 27:
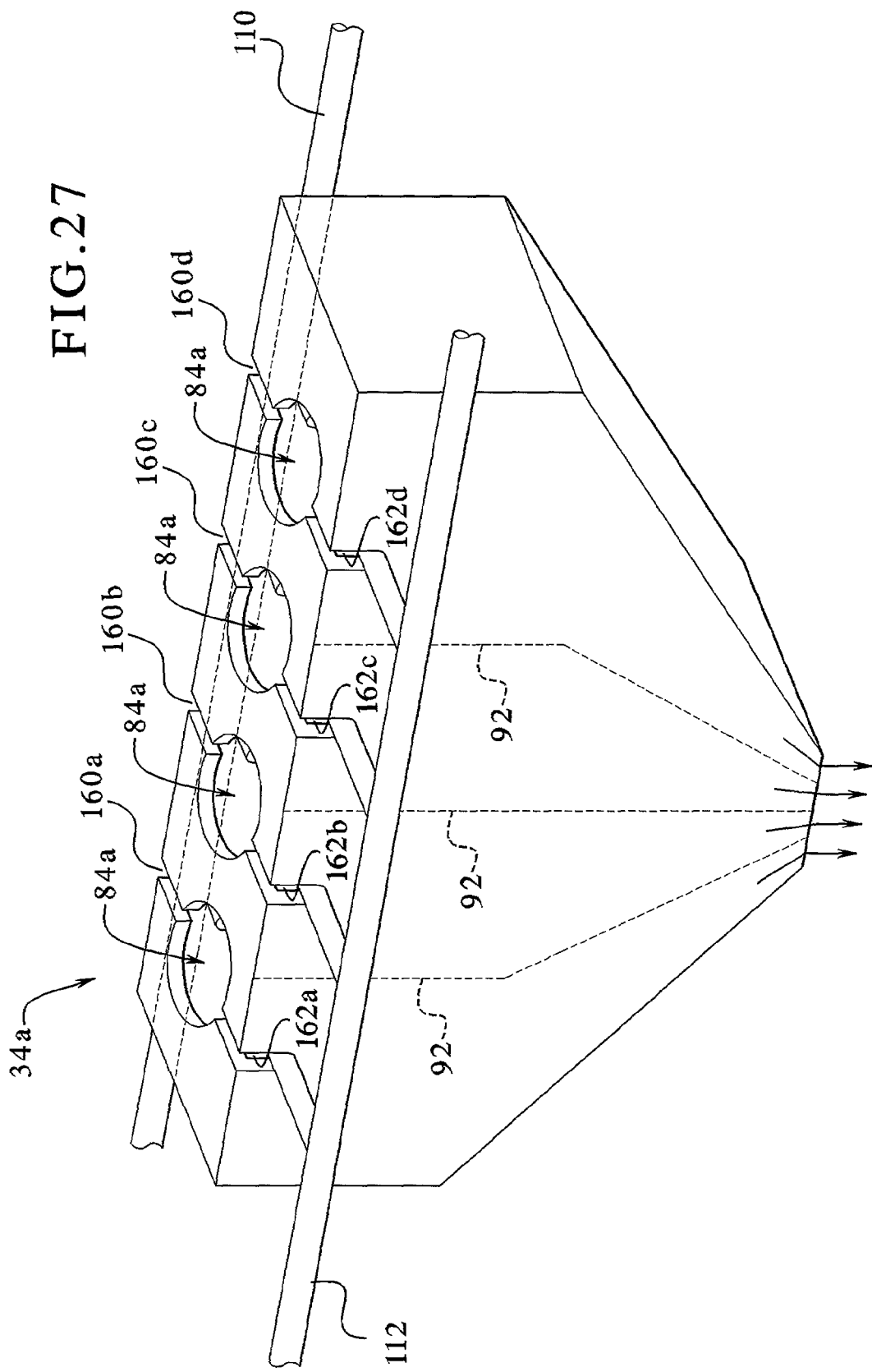
FIG. 27 is a perspective view of a further alternative embodiment of a fluid director of the present invention including carbonated water inlets and non-carbonated water inlets.

It should also be appreciated that the fluid director may take alternative forms. In one example alternative embodiment illustrated in FIG. 27, the fluid director 34a has a plurality of channels 84a which each include a carbonated water inlet 160a to 160d and a non-carbonated water inlet 162a to 162d, respectively. The channels 84a, separated by walls 92, are adapted to receive drink supply, carbonated water, non-carbonated water and other fluids in the channel entrance to enable the incoming fluids to mix or interact as they travel through the throat and then flow through channel exit area into a collector or container.

In another alternative embodiment illustrated in FIG. 28, the fluid director 34b has a plurality of individual channels 84a, 84b, 84c and 84d. Each individual channel is connected to an outlet 85b which directs the beverage into a container 32. It should be appreciated that each of the separate or individual beverage channels 84a, 84b, 84c and 84d may be separately removed for cleaning, repair and replacement purposes.

Gas Injector

Figure 30A:
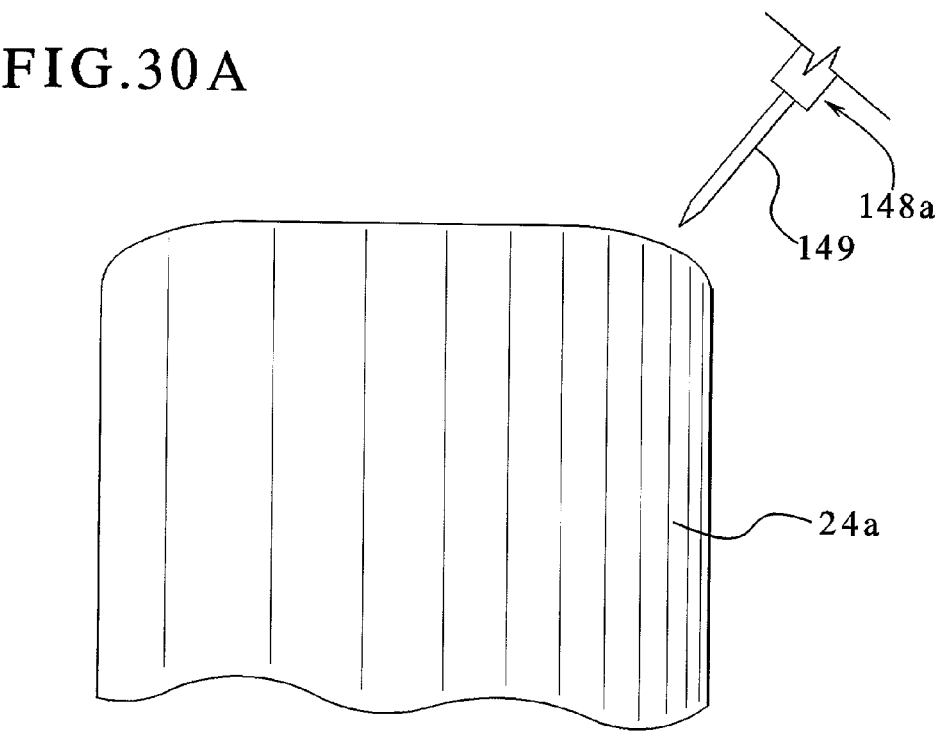
FIGS. 30A and 30B are fragmentary perspective views of alternative embodiments of the drink supply canister of the present invention and a gas injector adapted to engage the drink supply canister.
Figure 30B:
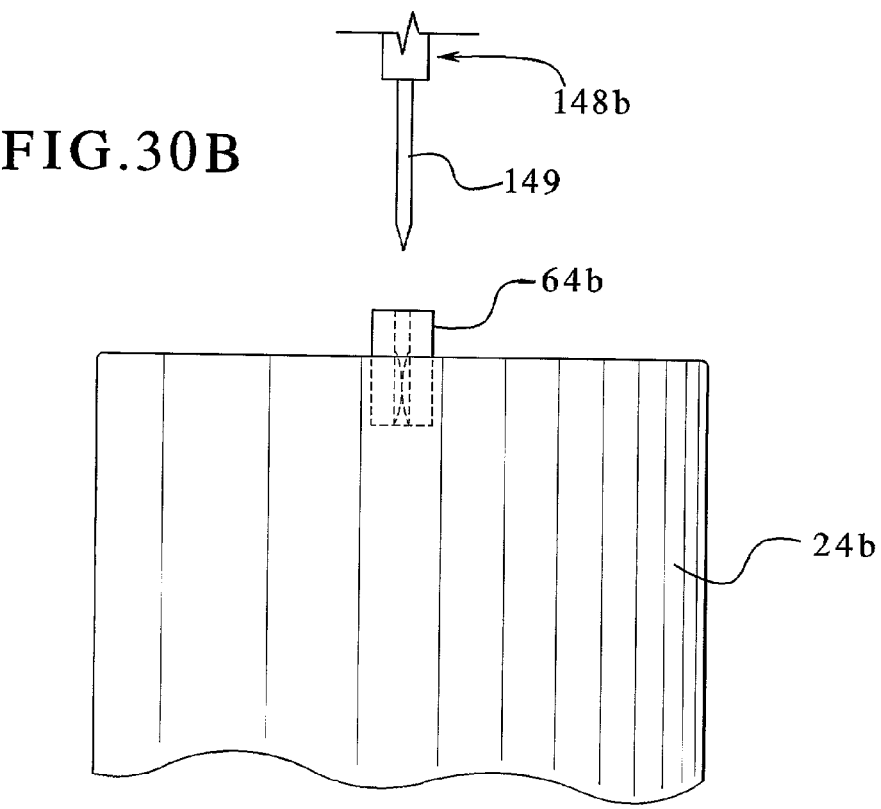
Figure 31:
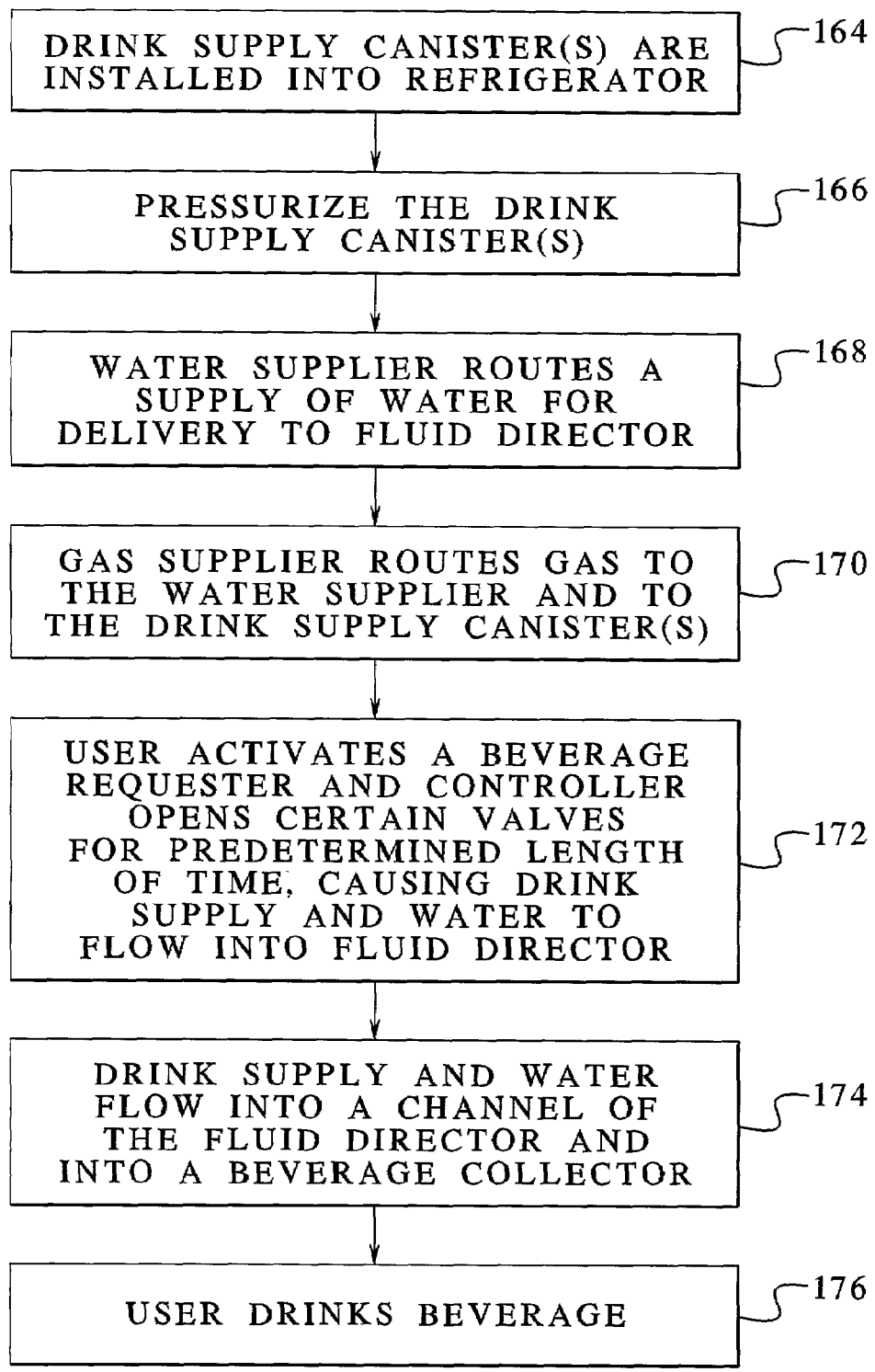
FIG. 31 is a flow diagram of the operation of one embodiment of the dispensing apparatus of the present invention.

One alternative embodiment of the present invention includes a gas injector adapted to directly inject the $CO_2$ gas or other suitable gas into the drink supply canisters to adequately pressurize the drink supply canisters as generally illustrated in FIGS. 30A and 30B.

In one embodiment illustrated in FIG. 30A, the gas supplier includes a gas injector 148a which includes a gas injection pin 149 which is adapted to pierce a surface of the drink supply canister 24a to inject gas into the drink supply canister 24a. The portion of the drink supply canister 24a which is pierced functions as the gas inlet valve of the drink supply canister 24a. This engagement prevents gas from escaping the drink supply canister. In a further embodiment illustrated in FIG. 30B, the drink supply canister 24b includes a grommet or other suitable gas inlet valve 64b which is adapted to receive a gas injection pin 149 of a gas injector 148b. This functions to pressurize the drink supply container 24b.

Operation

Referring now to FIGS. 1, 2, 11B and 31, to operate the embodiment of the beverage dispensing apparatus of the present invention which includes a fluid director (as described above), a user installs at least one drink supply canister 24 into the refrigerator 12, by opening the drink supply canister access door or compartment 40 and placing the drink supply canister 24 into drink supply canister holder 22 as indicated by block 164. The gas supplier pressurizes the drink supply in the drink supply canisters 24 as indicated by block 166 using the gas supplied by the gas supplier as indicated in block 170. The water supplier 26 provides a supply of water (preferably including both carbonated and non-carbonated water), available for delivery to the fluid director 34 as indicated by block 168. The gas supplier 28 routes gas to the carbonation tank 106 of the water supplier 26 and preferably routes gas to the drink supply canisters containers 24, as indicated by block 170.

When a user provides an input, for example, by pushing one of the beverage requestors 36, the controller sends a signal to the appropriate valve actuators for causing the appropriate valves to open for predetermined periods of time, causing the drink supply and water to flow into at least one channel 84 of the fluid director 34, as indicated by block 172. The drink supply-water mixture flows through channel 84 and into a beverage container 32, as indicated by block 174. A user can then drink and enjoy the desired beverage, as indicated by block 176. It should be appreciated that the same general process will apply to the embodiments without the fluid director, wherein the drink supply and carbonated or non-carbonated water are mixed on the fly and directed into the beverage container.

It should also be appreciated that the beverage requesters could alternatively enable the user to control the volume of beverage dispensed by the amount of time the user activates the beverage dispenser (such by pushing a mechanical beverage requester button) or by inputting a volume amount (such as selecting one of a four (4) ounce beverage container indicator, eight (8) ounce beverage container indicator, twenty (20) ounce beverage container indicator, or twenty-four (24) ounce beverage container indicator on a beverage requester in the form of an input screen or touch screen.

Alternative Embodiment Without Fluid Director

As mentioned above and as generally illustrated in FIGS. 24B, 24C and 29, one preferred alternative embodiment of the beverage dispenser of the present invention, generally indicated by numeral 10a, does not employ a fluid director. The beverage dispenser 10a of this embodiment directly dispenses the drink supply and the carbonated or non-carbonated water into the beverage containers or collectors 32. The beverage dispenser 10a is adapted to be mounted in a housing and preferably in a refrigerator as described above with respect to beverage dispenser 10.

Generally, the beverage dispenser or beverage dispensing apparatus 10a of this embodiment of the present invention includes: (a) a drink supplier including a drink supply canister holder or frame 22a for holding or maintaining at least one and preferably a plurality of drink supply canisters 24 and drink supply valve actuators 78 for causing the drink supply to be selectively released from the drink supply canisters 24; (b) a water supplier 26 for selectively supplying carbonated water and non-carbonated water for mixing or making the beverages; (c) a gas supplier 28a for supplying $CO_2$ gas to carbonate the carbonated water provided by the water supplier 26, and for supplying $CO_2$ gas or other pressurized air for pressurizing the drink supply canisters 24; (d) a beverage container compartment 30 for holding one or more beverage collectors or containers 32 (such as a glass, cup or pitcher); (e) a controller (not shown) for controlling and tracking the dispensing of drink supply and carbonated or non-carbonated water; and (f) one or more suitable beverage requesters (not shown). In the embodiment illustrated in FIGS. 24B and 24C, the beverage requestors are conventional levers 37a, 37b, 37c and 37d mounted in the beverage container compartment 30 and are preferably in electronic communication with the controller (not shown). It should be appreciated that the beverage requestors could alternatively be directly in communication with the valve actuators. Also, in other embodiments the beverage requesters can be levers which are preferably spring-activated. When a user pushes a lever, the beverage dispenser dispenses beverage into the user's beverage container.

Generally, in operation, after the user installs the drink supply canisters 24, the gas inlet valve 64 associated with each drink supply canister 24 causes the $CO_2$ gas to flow from the gas supplier 28a into the drink supply canisters 24. This pressurizes the drink supply canisters 24. When a user desires to obtain a beverage, the user makes the user's request through the appropriate beverage requester 37a, 37b, 37c or 37d which is connected to or in communication with the controller. Upon receiving a beverage dispense signal, the controller causes the drink supply outlet valve actuator (not shown) to cause the drink supply outlet valve (not shown) associated with the appropriate drink supply canister 24 to open to dispense the appropriate amount of drink supply from that drink supply canister 24. This drink supply stream is directed downward into the beverage container 32. Simultaneously, the controller causes the water supplier 26 to direct the appropriate amount of carbonated or non-carbonated water through the appropriate water dispenser into the stream of the drink supply and into the same beverage container 32 as specifically illustrated in phantom in FIG. 29. The drink supply stream and the carbonated or non-carbonated water stream mix on the fly while directed into the beverage container 32. In one preferred embodiment, the beverage dispenser of the present invention includes a water dispenser or water ring associated with each canister and associated carbonated and non-carbonated water lines connected to each water ring as discussed above.

In one embodiment, as seen in FIG. 29, the beverage collector 32 is positioned with respect to the drink supply outlet valve 66 and water dispenser 124a in such a manner that the water streams 131 from injectors 125a contact the drink supply stream 129 at a location inside the collector 32. The collision of the fluid streams occurring below the top of the collector 32 minimizing the spilling, loss and splashing of fluids. In this embodiment, it should be appreciated that the water streams 131 interact and mix with the drink supply stream 129, preferably in mid-air as well as within the collector 32 as the beverage rises to the top of the collector 32.

Alternative Embodiments of Drink Supply Canister Holder or Frame

Figure 32:
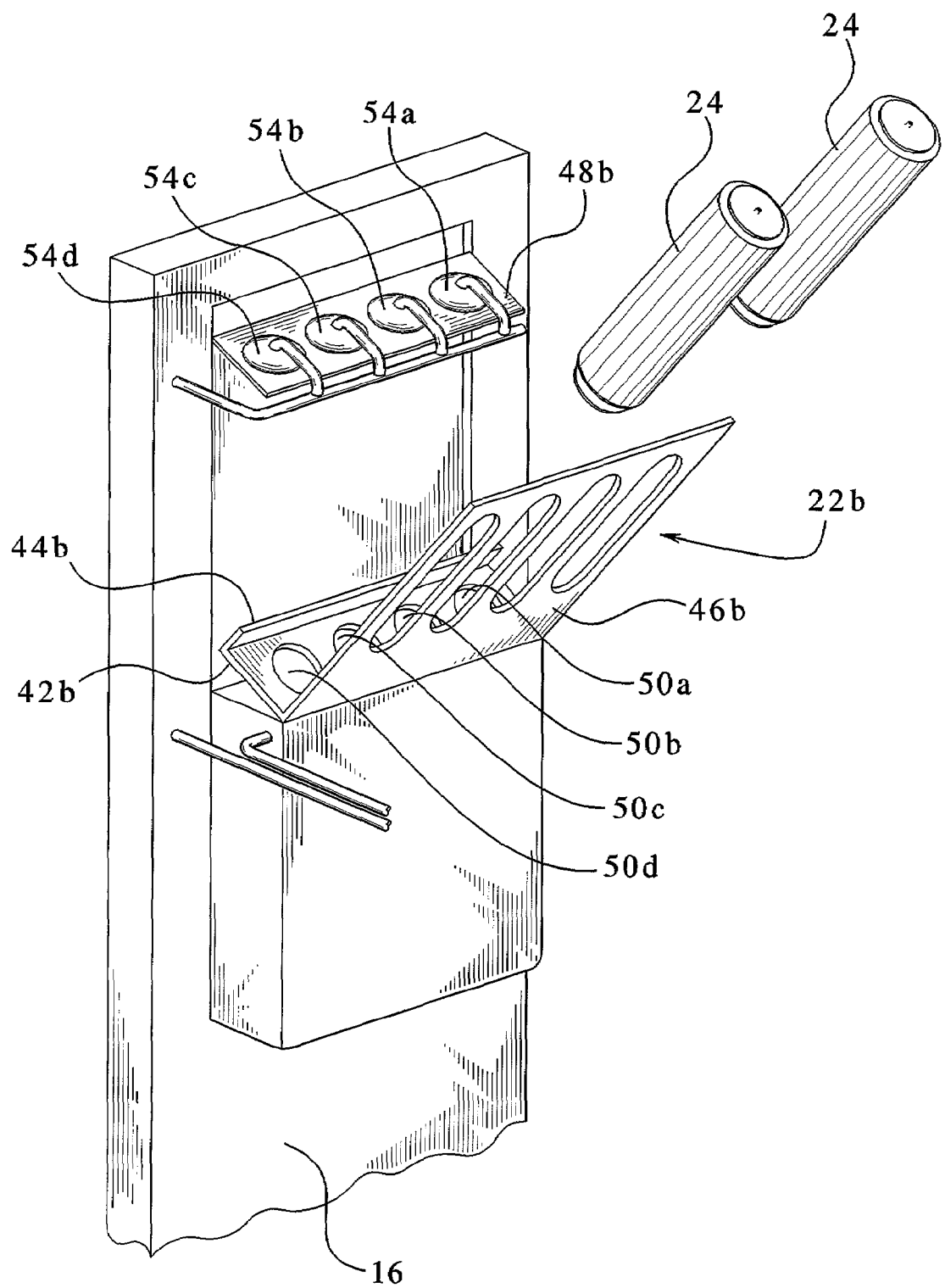
Figure 33:
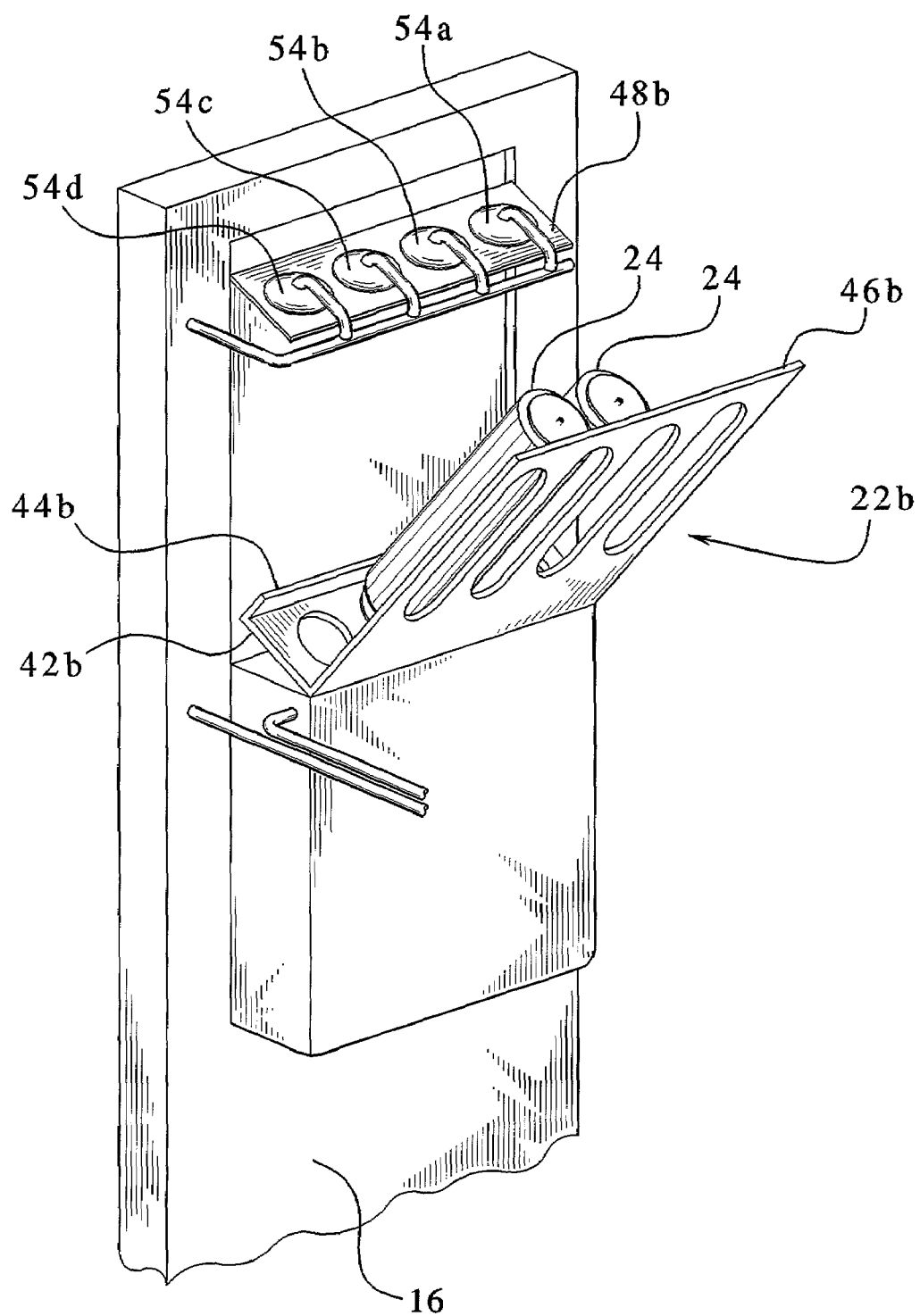

It should be appreciated that the drink supply canister holder can be constructed in several alternative manners. In one alternative embodiment generally illustrated in FIGS. 32, 33, 34 and 35, the drink canister holder or frame 22b is built into or constructed within the refrigerator compartment door 16, although it should be appreciated that the drink canister holder or frame 22b could be built into the freezer compartment door or another part of the refrigerator or freezer compartments as discussed above. In this alternative embodiment, the drink supply canisters are accessible from the interior of the refrigerator compartment door 16 to enable the users to replace the drink supply canisters by opening the refrigerator door. In this embodiment, the drink supply canister holder pivots inwardly to enable a user to replace the drink supply containers as generally illustrated in FIGS. 32 and 33.

In the embodiment of the drink supply canister holder 22b illustrated in FIGS. 32, 33, 34 and 35, the drink supply canister holder 22b includes a drink canister support 42b, an exterior drink supply canister guide 44b connected to the drink supply canister support 42b, an interior drink supply canister guide 46b connected to the drink supply canister support 42b and a drink supply canister securing member 48b. The drink supply canister support 42b is pivotally connected to the refrigerator door to facilitate the placement and removal of drink supply canisters from the holder 22b. The drink supply canister support 42b includes drink canister slots 50a, 50b, 50c and 50d, respectively, for receiving the drink supply canisters 24. Likewise, securing member 48b includes a plurality of gas supplier valves 54a, 54b, 54c and 54d which are part of the gas supplier 28. With respect to replacing drinks supply containers, this embodiment functions similar to the embodiments described above. When the securing member 48b closes, the canister slots fit over the drink supply canisters 24 and restrict their movement and the gas supplier valves 54a, 54b, 54c and 54d also engage the gas inlet valves in the drink supply canisters to enable $CO_2$ gas or other pressurized gas to flow into and pressurize the drink supply canisters 24 as discussed above. This embodiment may also include co-acting mating members (not shown) which ensure that suitable drink supply canisters are used in connection with the beverage dispenser.

A further alternative embodiment of the drink supply canister holder or frame is illustrated in FIGS. 36A to 36C. In this embodiment, the frame 22c includes a support member 178 for a plurality of independently pivoting drink supply canister compartments 180, an exterior guide wall 182 connected to the support member 178, opposing side guide walls 184a and 184b connected to the exterior guide wall 182 and support member 178 and two spaced-apart opposing legs 186a and 186b connected to the support member 178. Each canister compartment 180 is adapted to receive a drink supply canister 24. Each canister compartment 180 includes a canister support 188 connected to two sets of spaced apart opposing compartment walls 190. The canister support 188 includes an opening or aperture 190 which receives the drink supply outlet valve 66 of the drink supply canister 24. The canister compartment 180 is sized to slidably receive the drink supply canisters 24. In the illustrated embodiment, a hinge 190 is employed to pivotally connect the canister compartment 180 to the support member 178. It should be appreciated that other suitable connections may be employed to facilitate easy access to the compartments. Each canister compartment 180 is adapted to independently pivot from an open or accessible position to a closed or usable position. The open position enables a user to easily remove an empty drink supply canister 24 and insert a new filled drink supply canister 24. In the closed position, the drink supply canister 24 is in a useable position which enables the beverage dispenser of the present invention to cause the drink supply canister 24 to dispense the drink supply. In this embodiment, the drink supply canisters 24 can be pre-pressurized, or the canister holder 22c can include any device for suitably connecting a gas line (not shown) to the drink supply canisters 24 in order to pressurize the drink supply in the canisters 24 to facilitate the steady and consistent dispensing of the drink supply from the drink supply canister as the volume of the drink supply in the drink supply canister decreases.

Figure 37A:
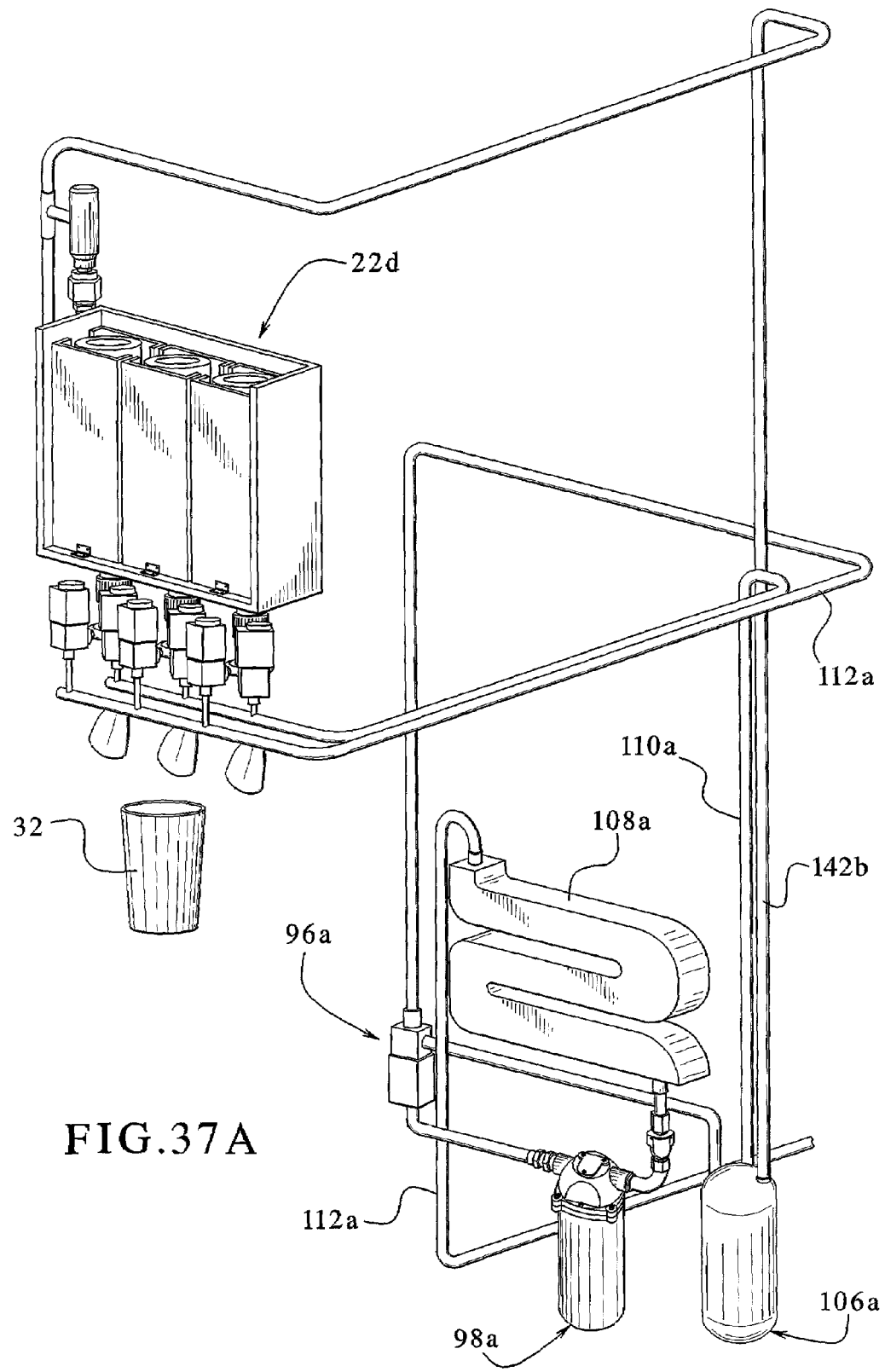
Figure 37B:
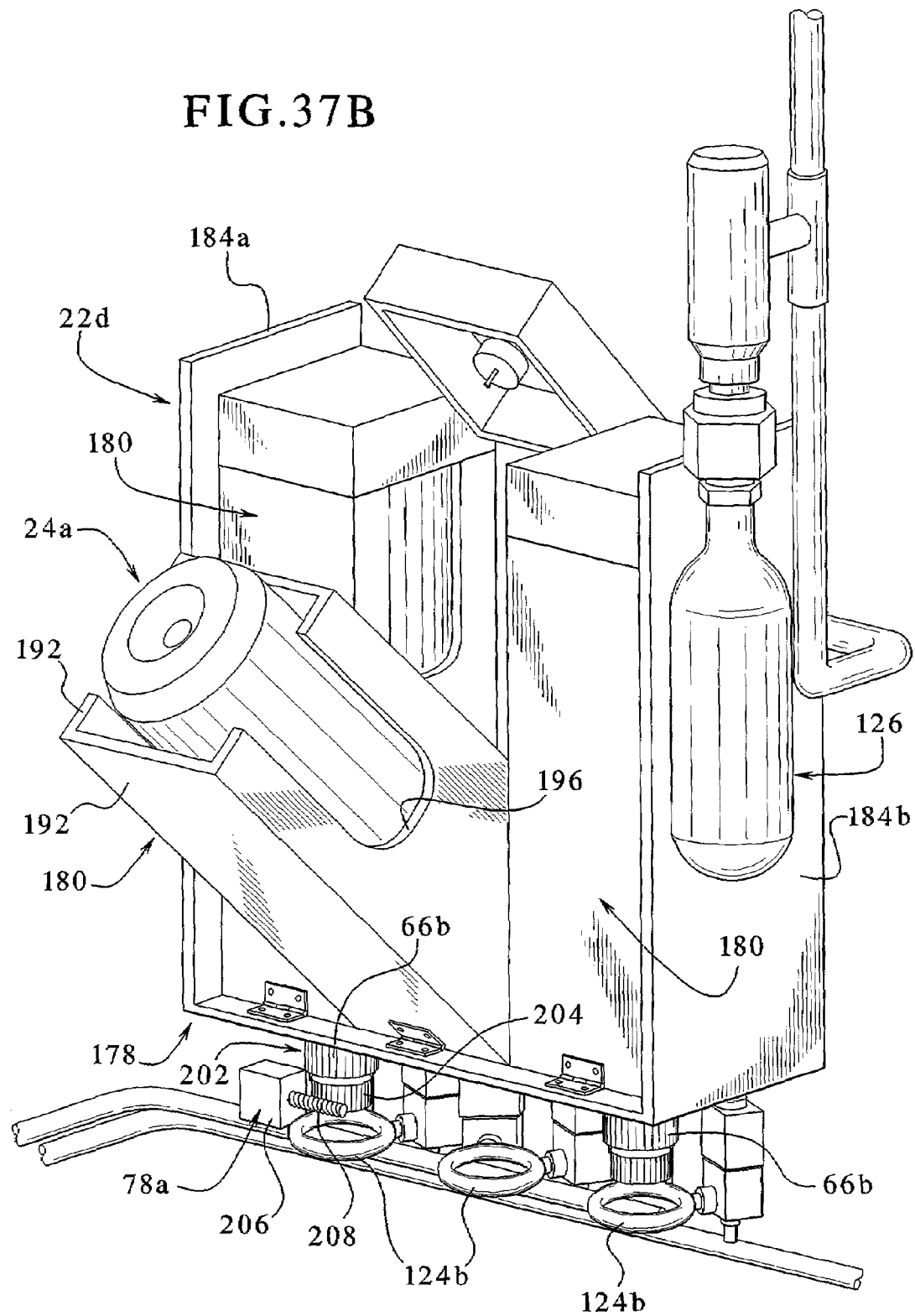

A further alternative embodiment of the drink supply canister holder or frame is illustrated in FIG. 37B. This embodiment, which is similar to the embodiment illustrated in FIGS. 36A to 36C, includes a drink supply canister holder 22d having a slot 196 formed in the opposing walls 192 of each canister compartment 180 to facilitate the removal of the drink supply canister 24a from the drink supply canister holder 22d. Additionally, drink supply canister holder 22d includes a gas supply and securing members 198 hingedly connected to the exterior guide wall (not shown) of the drink supply canister holder 22d. Each gas supply and securing member 198 is separately associated with a canister compartment 180 is adapted to secure the drink supply canister compartment and is adapted to provide a supply of gas to the drink supply canister 24a housed in such canister compartment 180 to pressurize the drink supply canister. In one embodiment, the gas supply and securing member 198 is a cover which, when closed, covers the upper end of the canister compartment 180. This gas supply and securing member 198 includes a gas injector 148a which is adapted to engage the gas inlet valve 64c of the canister 24a. In operation, a user opens the gas supply and securing member 198, outwardly tilts the drink supply canister compartment and removes an empty drink supply canister 24a from the drink supply canister compartment 180. The user may then insert a full drink supply canister 24a into the drink supply canister compartment 180 and inwardly rotate the drink supply canister compartment to the closed position. When the user closes the gas supply and securing member 198, the beverage dispenser of the present invention pressurizes the drink supply in the canister 24a for the consistent dispensing of drink supply at a predetermined rate.

Water Supplier of the Alternative Embodiment

As described above, the water supplier provides carbonated and non-carbonated water for mixing the beverages. In one embodiment illustrated in FIGS. 37A to 37F, the water supplier 26a generally includes a water filter 96a, a water pump 98a, a cold transfer device 108a, a carbonation tank 106a, a carbonated water line 110a and a non-carbonated water line 112a. The water supplier 26a is connected to a drinkable water source (not shown), such as a conventional cold water source available in residential kitchens. In operation, the water passes through the cold transfer device 108a to reduce the temperature of the water into the water pump 98a. The water pump 98a pumps the water to the water filter 96a. The water filter 96a or a two-way connection attached thereto routes the cooled water to the non-carbonated water line 112a and to the carbonation tank 106a. The carbonation tank 106a is suitably connected to the gas supplier through gas line 142b. The carbonation tank 106a uses $CO_2$ gas obtained from the gas supplier to carbonate the water.

As described earlier, the carbonated water line 110a and non-carbonated water line 112a can be connected to water rings in such a manner that the water rings are positioned between carbonated water line 110a and non-carbonated water line 112a. In this embodiment, however, the water ring 124 includes two connections for the water lines which are separated by less than one hundred eighty (180) degrees along the circumference of the water ring 124, and preferably less than ninety (90) degrees. Accordingly, the water lines 110a and 112a can be positioned adjacent to one side of the water rings 124b with relatively little space separating the carbonated water line 110a and the non-carbonated water line 112a as illustrated in FIGS. 37A, 37B, 37C, 37D and 37E.

Figure 37C:
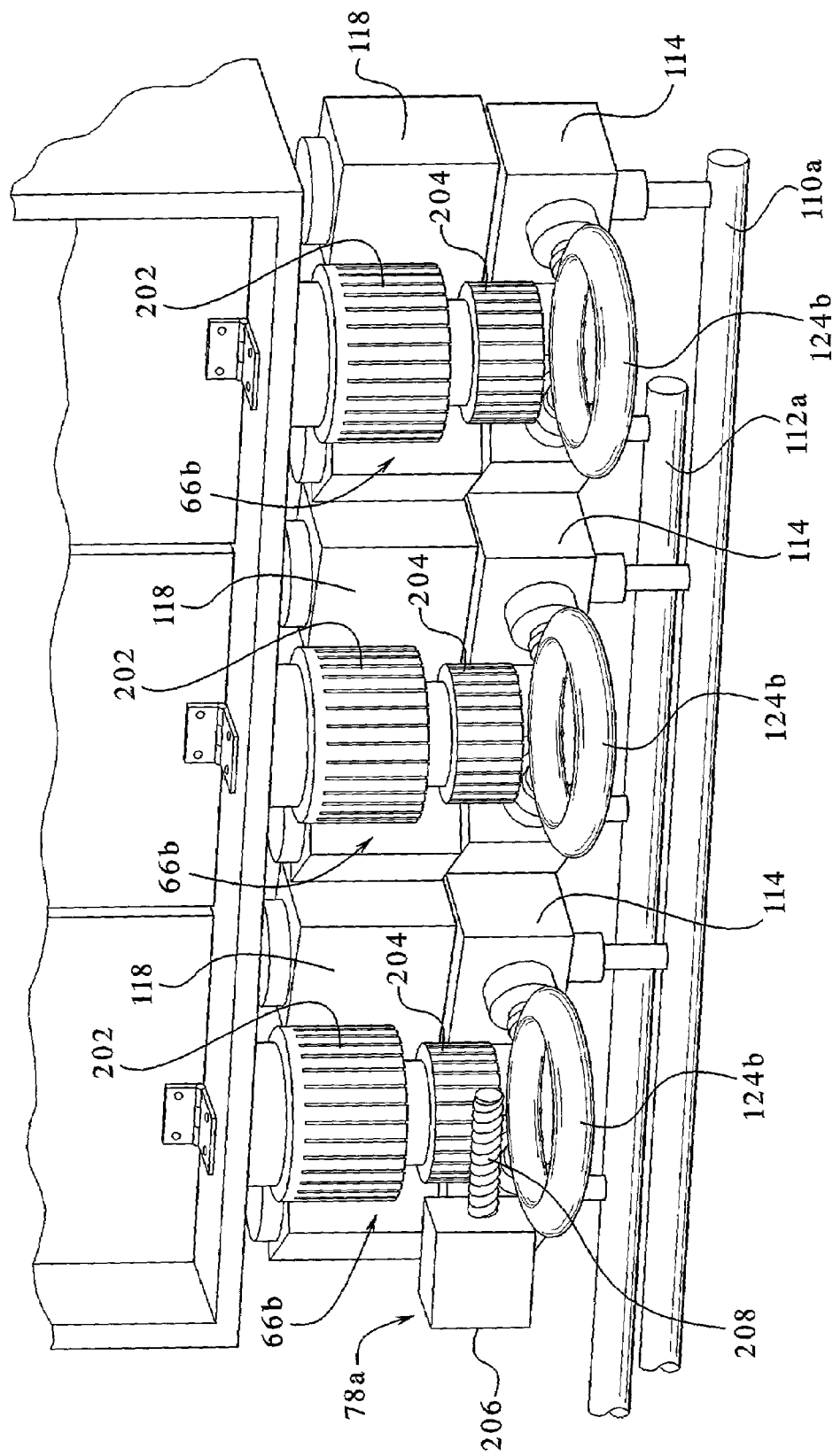
Figure 37D:
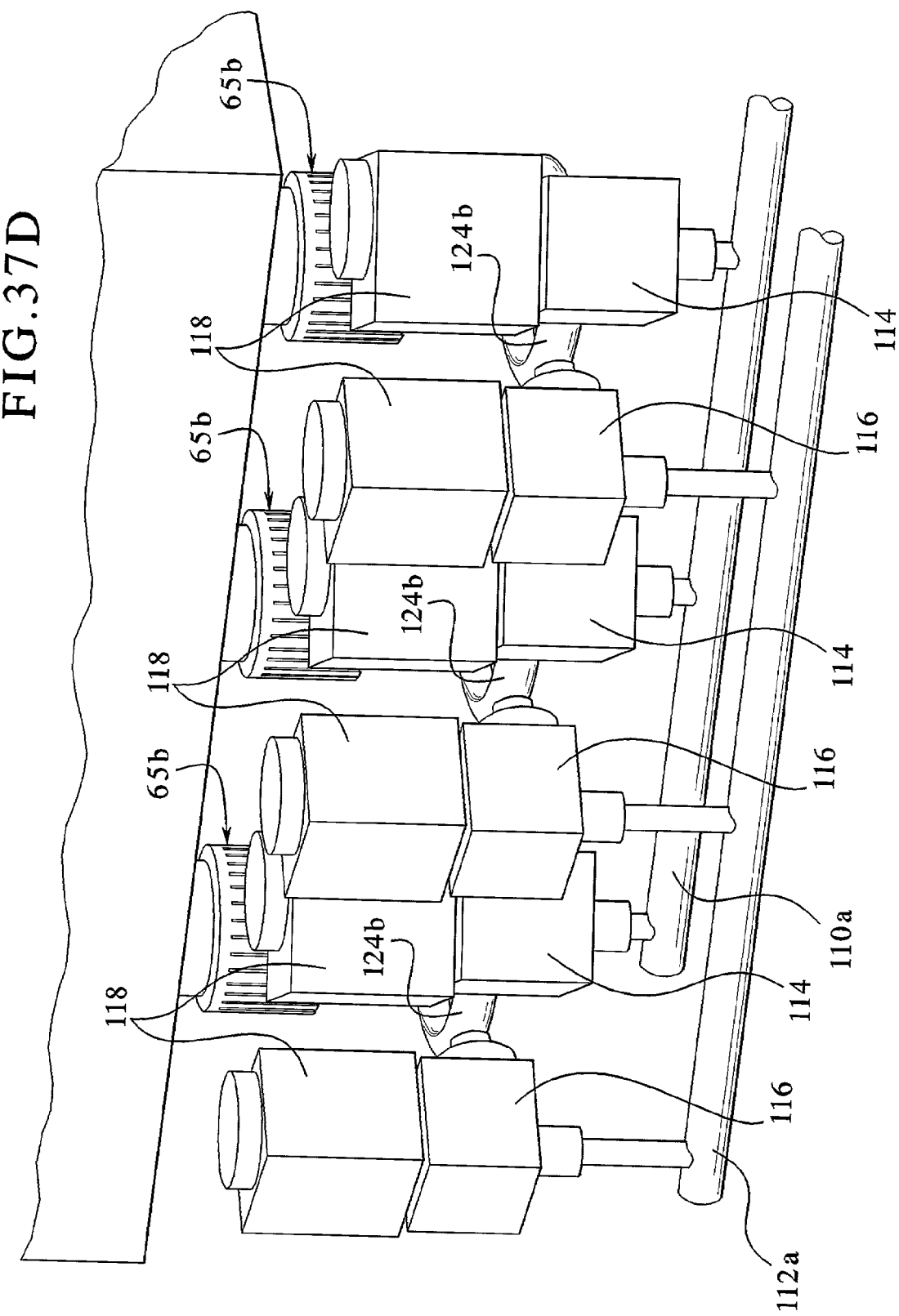

As best illustrated in FIGS. 37C and 37D, the carbonated water line 110a is connected to a plurality of carbonated water valves 114 which are respectively connected to and controlled by water valve actuators 118. Similarly, the non-carbonated water line 112a is connected to a plurality of non-carbonated water valves 116 which are respectively connected to and controlled by water valve actuators 118. This water supplier embodiment provides the present invention with a more efficient spacing arrangement for the internal parts of the beverage dispenser of the present invention. Also, this water supplier embodiment provides a relatively simple construction for mixing drink supply with water while providing a substantial amount of space for the actuation of the drink supply outlet vales.

Alternative Embodiment of Drink Supply Outlet Valve and Drink Supply Outlet Valve Actuator In one alternative embodiment of the present invention best illustrated in FIGS. 37B to 37E, each drink supply canister 24a has a rotatable drink supply outlet valve 66b. The drink supply outlet valve 66b includes a connection member 202 which is connected to a rotatable member 204. The connection member 202 preferably threadably connects the drink supply outlet valve 202 to the drink supply canister 24a. In the illustrated embodiment, rotatable member 204 preferably includes gear teeth.

Figure 37E:
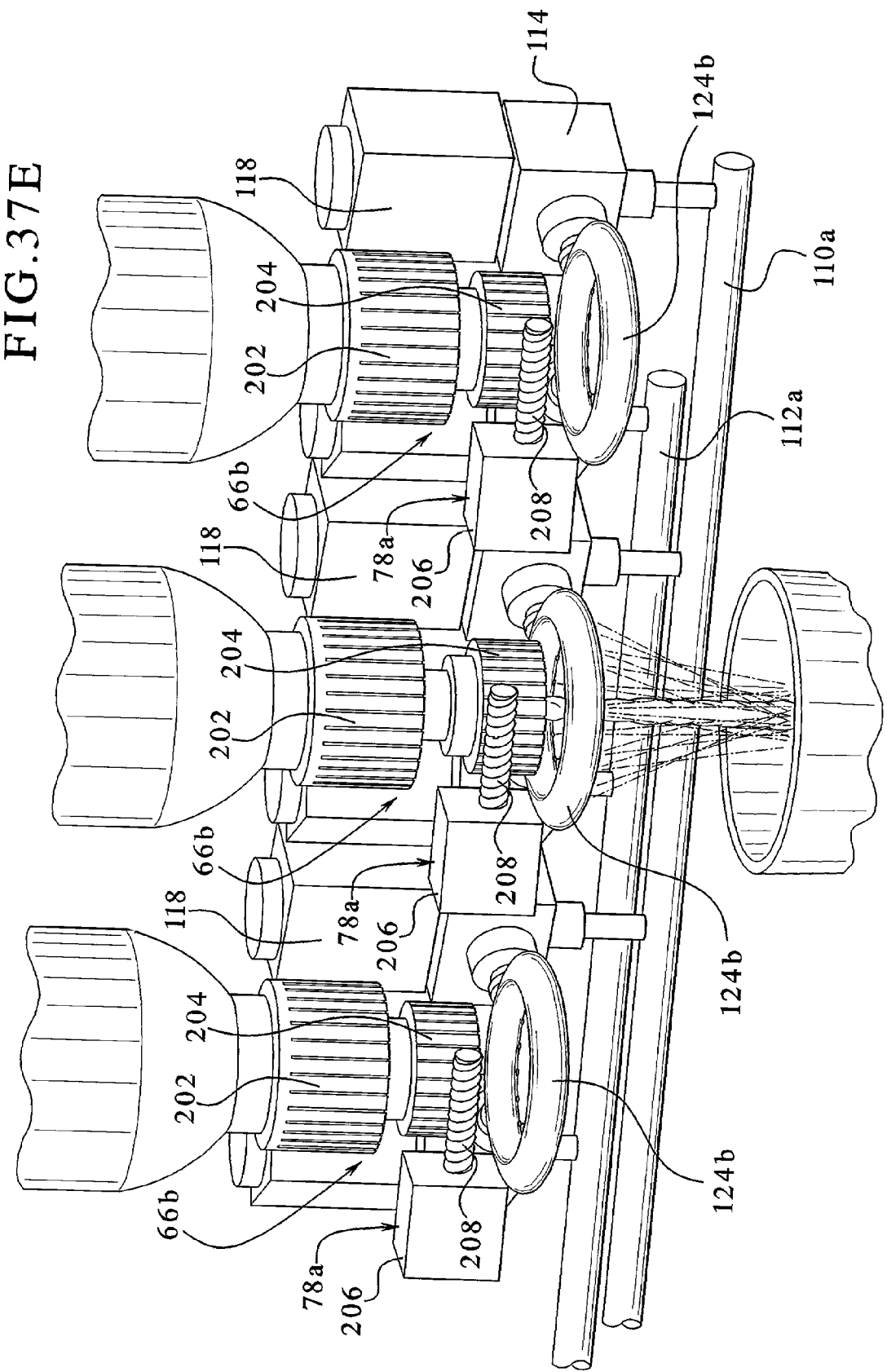
Figure 38:
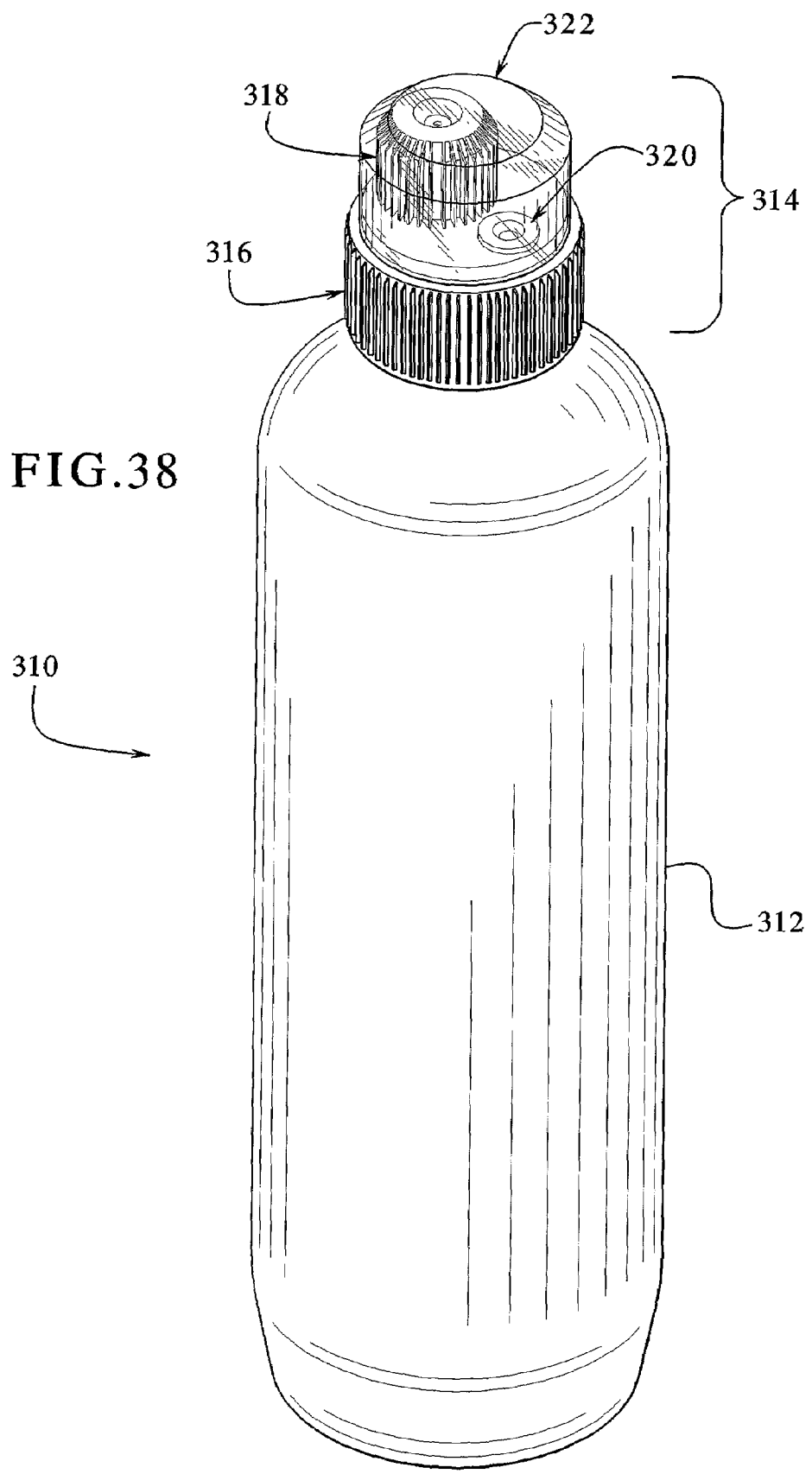
FIG. 38 is a perspective view of a drink supply canister of one alternative embodiment of the beverage dispenser of the present invention.
Figure 39A:
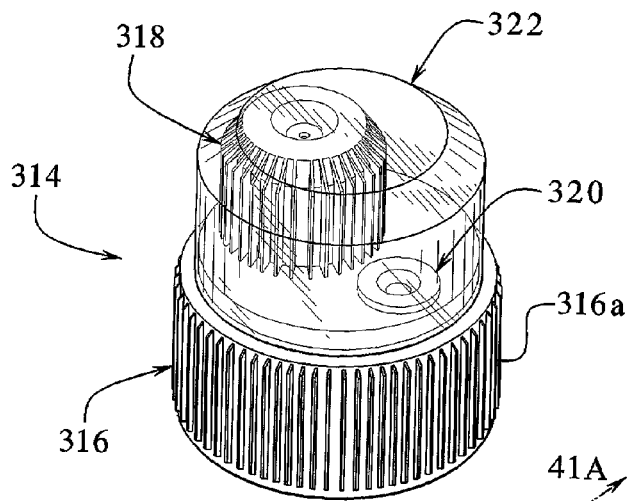
FIGS. 39A and 39B are perspective views of the valve assembly member of the drink supply canister of FIG. 38.
Figure 39B:
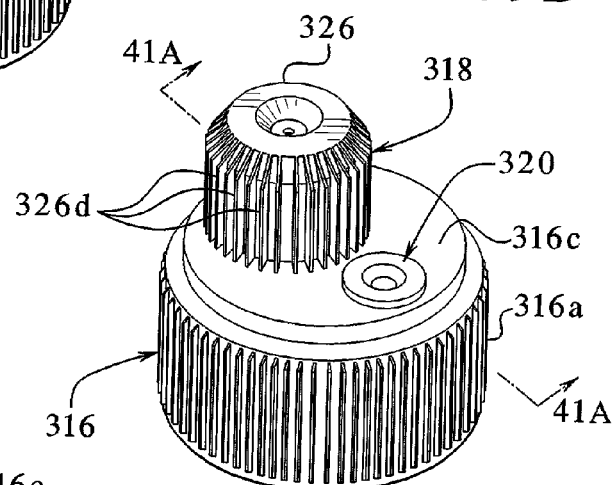
Figure 39C:
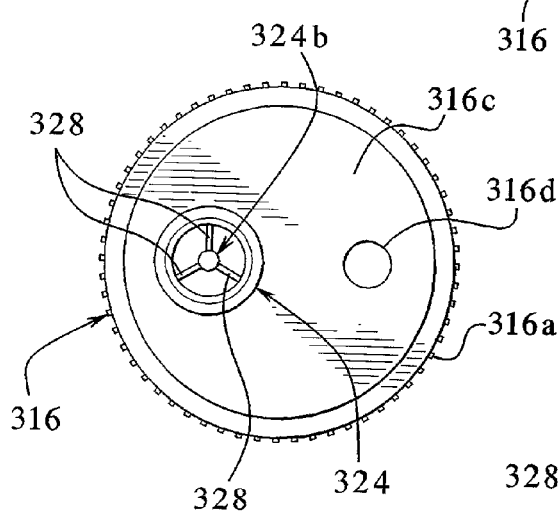
FIG. 39C is a top view of the valve assembly member (without the drink supply outlet valve and gas inlet valve) of the drink supply canister of FIG. 38.
Figure 39D:
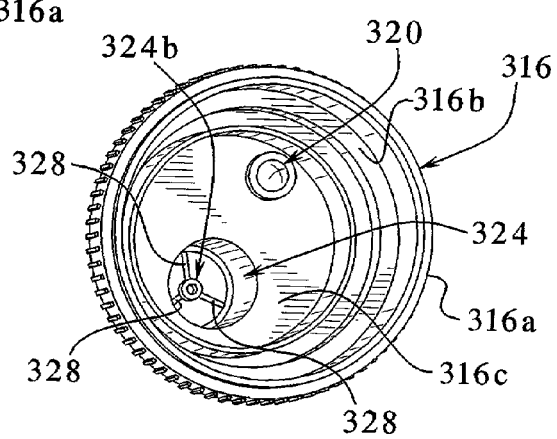
FIG. 39D is a bottom perspective view of the valve assembly member of the drink supply canister of FIG. 38.

In the illustrated embodiment, the drink supply outlet valve actuator 78a includes a motor 206 and a worm gear 208 attached to the motor 206. In operation, when the controller sends an "open" or "on" signal to the drink supply outlet valve actuator 78a, the motor 206 in turn causes the worm gear 208 to rotate. The worm gear 208 which engages the rotatable member 204 in turn causes the rotatable member to rotate to the open position. As the rotatable member 204 rotates, the rotatable valve 66b opens, and pressurized drink supply flows out of the drink supply canister 24a for a predetermined period of time. When this time period elapses, the controller sends a "Close" or "Off" signal to the actuator 78a, and the motor 206 causes the worm gear 208 to rotate in the opposite direction to close the rotatable valve 66b, stopping the flow of the pressurized drink supply. Though only one actuator 78a is illustrated in FIGS. 37B and 37C, it should be appreciated that this embodiment includes a plurality of drink supply valve actuators 78a, and preferably one for each drink supply canister 24a, as illustrated in FIG. 37E. It should also be appreciated that other suitable actuator or drive mechanisms may be employed to actuate such type of drink supply outlet valves.

It should be appreciated that the dispensing apparatus of the present invention, and particularly the controller of the beverage dispensing apparatus can be adapted to communicate electronically with any suitable computer distribution system or electronic network. In one embodiment, the controller electronically communicates with an order processing system through communication channels such as telephone lines, cable lines, wireless communications and the Internet. The order processing system is capable of receiving and processing orders which the controller transmits to the order processing system. Such orders relate, for instance, to supplies of drink supply canisters or gas supply canisters, needed repairs and related delivery and distribution information. Other services may also be provided or facilitated by the controller.

The beverage dispenser of the present invention accordingly enables users to conveniently dispense carbonated and non-carbonated beverages from residential refrigerators. This beverage dispenser has a high degree of reliability and convenience because of its use of pressurable drink supply canisters and computer-controlled valve actuators. Users can conveniently install drink supply canisters and gas supply containers into the dispensing apparatus. The embodiment including the fluid director enables the users to conveniently maintain and clean the dispensing apparatus by providing a removable fluid director which can be cleaned in a dishwasher. The embodiment in which the drink supply container directly dispenses drink supply, preferably through the water dispenser or water ring, provides a beverage dispenser which does not need to be regularly cleaned because the dispensed liquids (i.e., water and drink supply) are directly dispensed into the drink containers. Furthermore, such embodiment not only eliminates cleaning activities but does so without compromising the quality of the water-drink supply mixing process. This embodiment includes a water dispenser which facilitates effective fluid mixing on the fly. It should be appreciated that the present invention may be implemented in other appliances, in counter top beverage dispensing apparatus and in commercial refrigerator and beverage dispensing apparatus.

Alternative Embodiment of Drink Supply Canister and Drink Supply Canister Holder An alternative embodiment of the drink supply canister is illustrated in FIGS. 38 to 43B. Though illustrated in an upright position, the drink supply canister 310 is preferably adapted to be mounted in the beverage dispensing apparatus in an inverted position as described below. Inverting the drink supply canister 310 avoids the need to connect the valve assembly member, described below, to the base of the drink supply canister.

This drink supply canister 310 includes a body 312, an opening (not shown) in the body and a valve assembly member 314 removably connected to the body 312 at the opening. The valve assembly member 314 includes a body or multi-valve support 316, a drink supply outlet valve 318 connected to the multi-valve support 316 and a gas inlet valve 320 connected to the multi-valve support 316. The valve assembly member 314 also includes a cover 322 connected to the multi-valve support 316, preferably through a snap-fit connection.

The multi-valve support 316 includes a wall 316a having an inner threaded surface 316b which co-acts with a threaded surface at the opening of the body 312 to facilitate the removable connection of the valve assembly member 314 to the body 312. Multi-valve support 316 also includes a valve support member 316c, such as a wall, which supports the drink supply outlet valve 318 and the gas inlet valve 320 and secures such valves to the multi-valve support 316. The valve support member 316c includes a wall 316d which defines an opening for receiving the gas inlet valve 320. It should be appreciated that the valve assembly member 314 can be permanently connected to the body 312. In such embodiment, the multi-valve support 316, and specifically wall 316a, is preferably molded as an integral part of the body 312, functioning as a permanent drop band or neck of the drink supply canister 310.

Figure 41A:
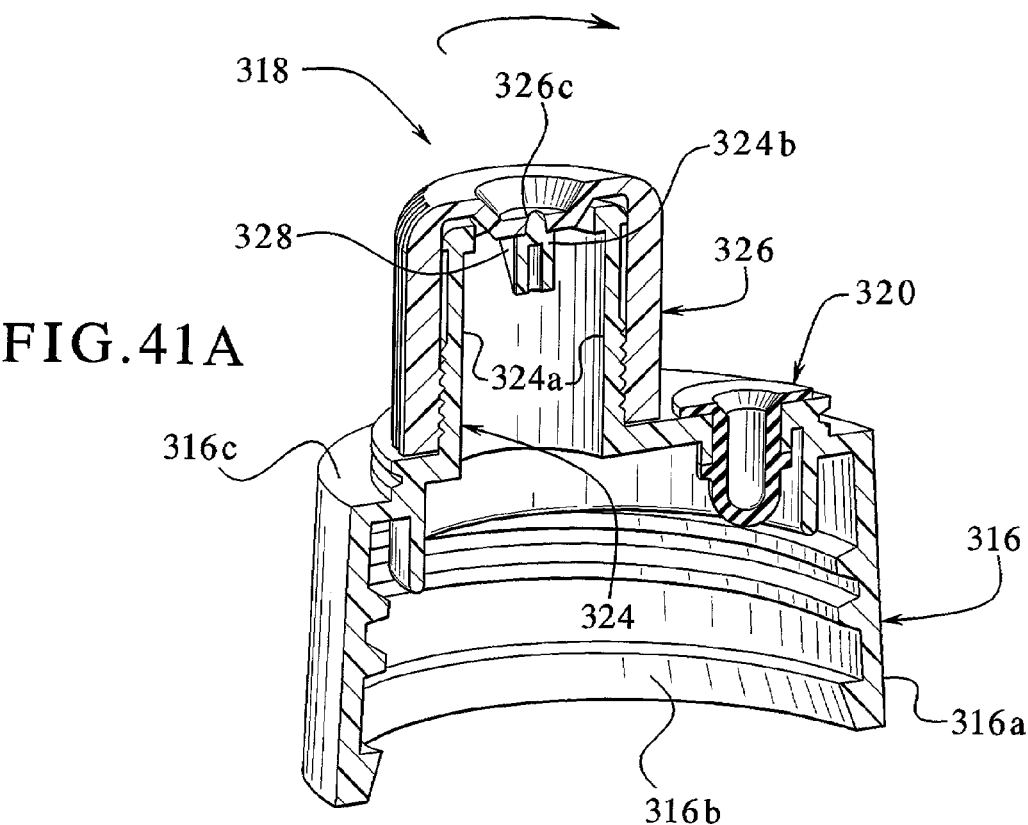
FIG. 41A is a fragmentary cross-sectional view of the valve assembly member in a closed position of the drink supply canister of FIG. 38, taken substantially along line 41A—41A of FIG. 39B.
Figure 41B:
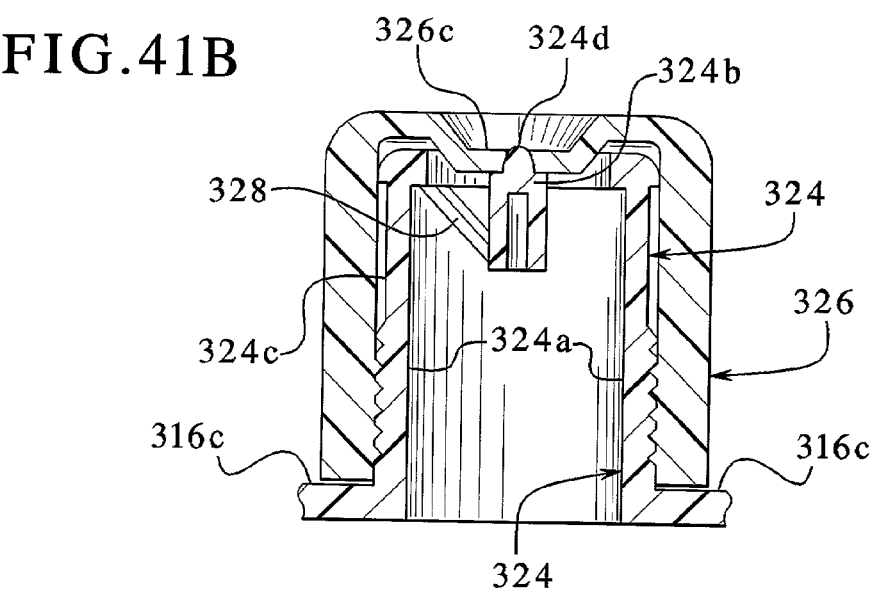
FIG. 41B is an enlarged cross-sectional view of the drink supply outlet valve of FIG. 41A.
Figure 41C:
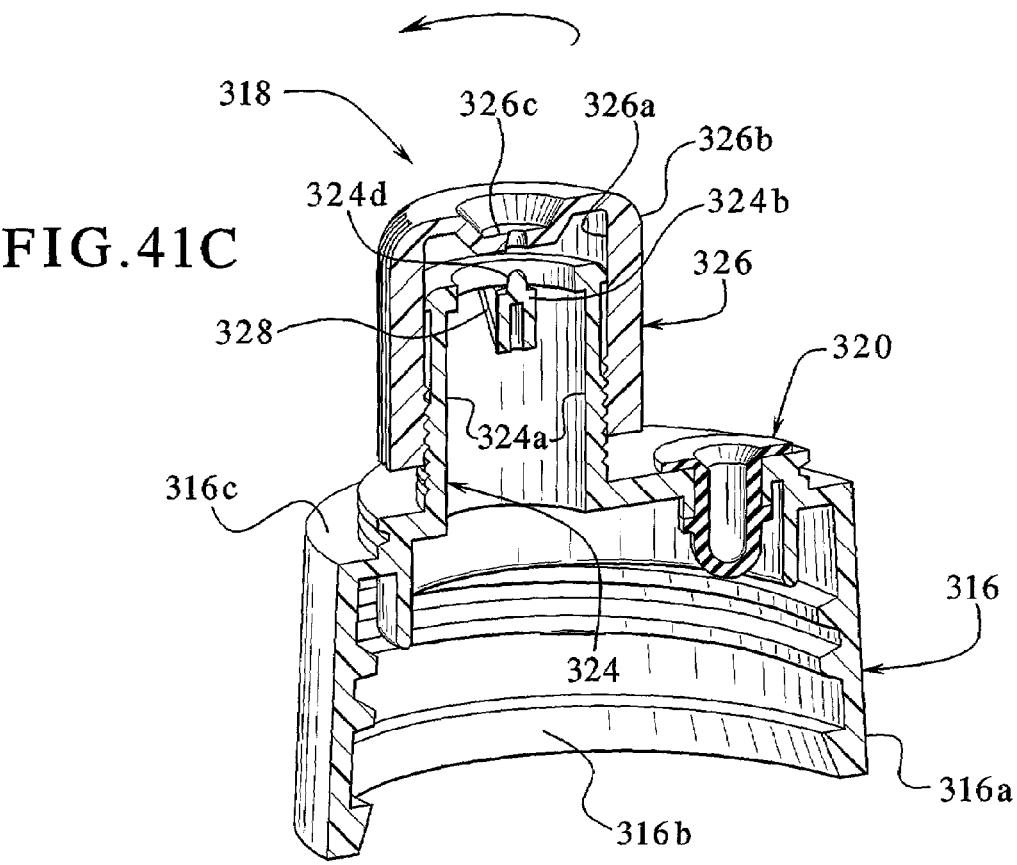
FIG. 41C is a fragmentary cross-sectional view of the valve assembly member in an open position of the drink supply canister of FIG. 38.
Figure 41D:
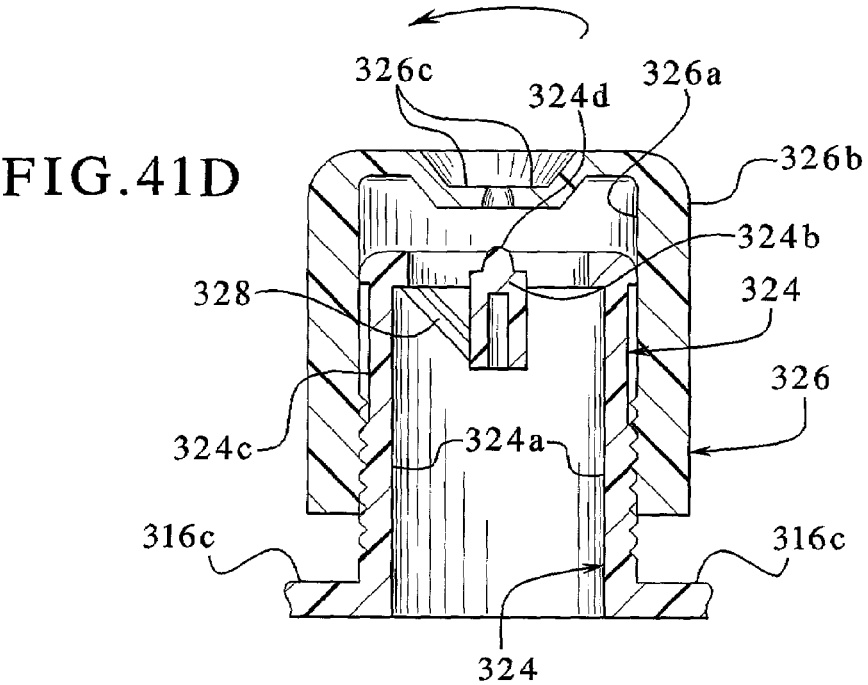
FIG. 41D is an enlarged cross-sectional view of the drink supply outlet valve of FIG. 41C.
Figure 42A:
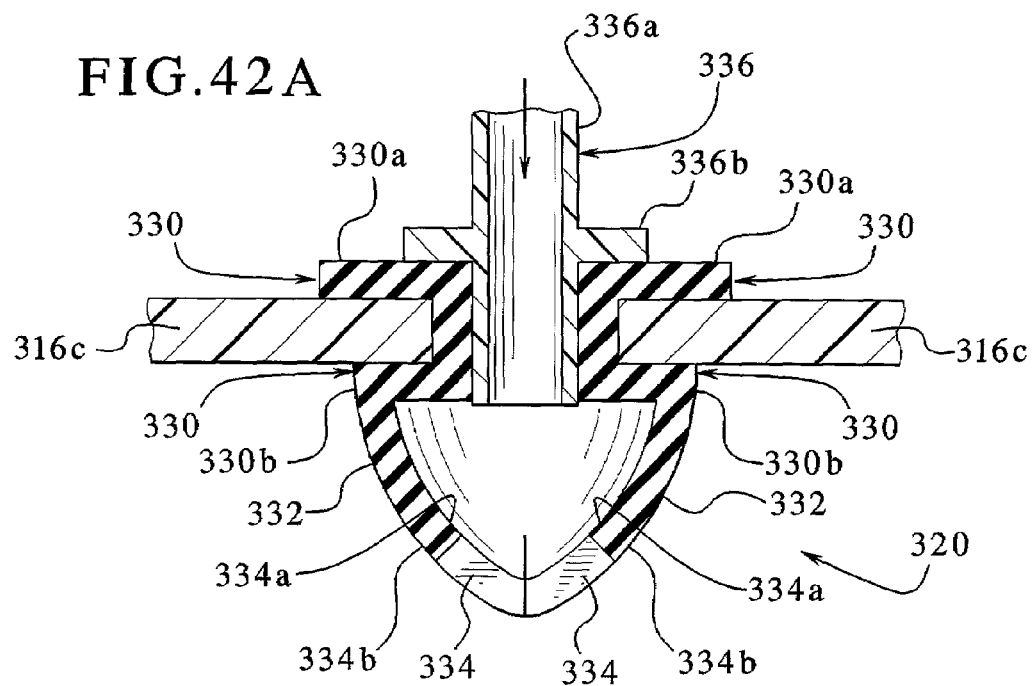
FIG. 42A is a fragmentary cross-sectional view of the gas inlet valve in a closed position of the valve assembly member of the drink supply canister of FIG. 38 taken substantially along line 42A—42A of FIG. 42B.
Figure 42B:
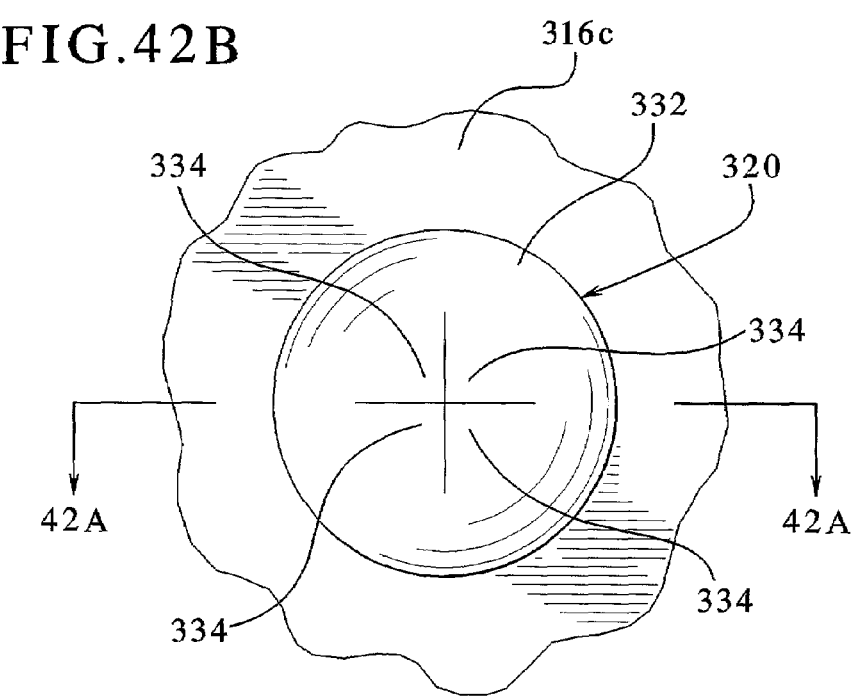
FIG. 42B is a fragmentary bottom view of the gas inlet valve in a closed position of the valve assembly member of the drink supply canister of FIG. 38.
Figure 43A:
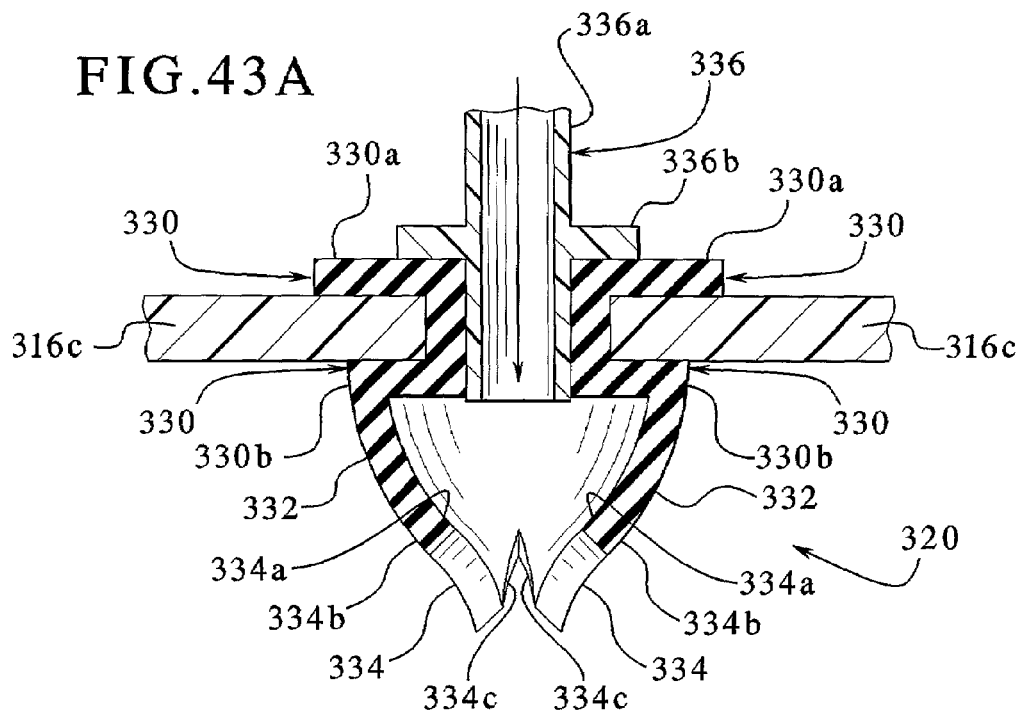
FIG. 43A is a fragmentary cross-sectional view of the gas inlet valve in an open position of the valve assembly member of the drink supply canister of FIG. 38 taken substantially along line 43A—43A of FIG. 43B.
Figure 43B:
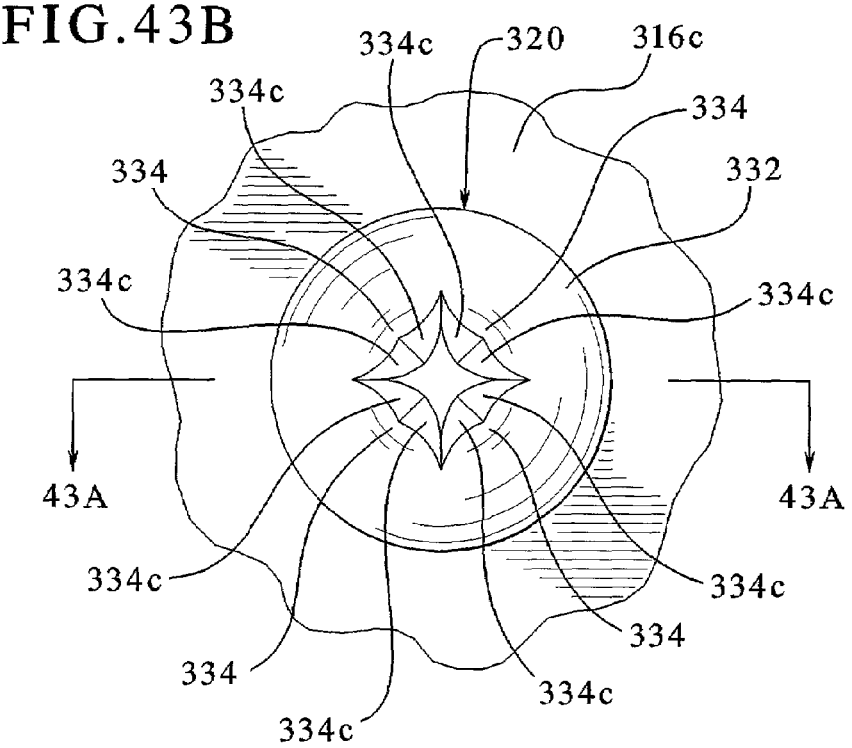
FIG. 43B is a fragmentary bottom view of the gas inlet valve in an open position of the valve assembly member of the drink supply canister of FIG. 38.
Figure 46:
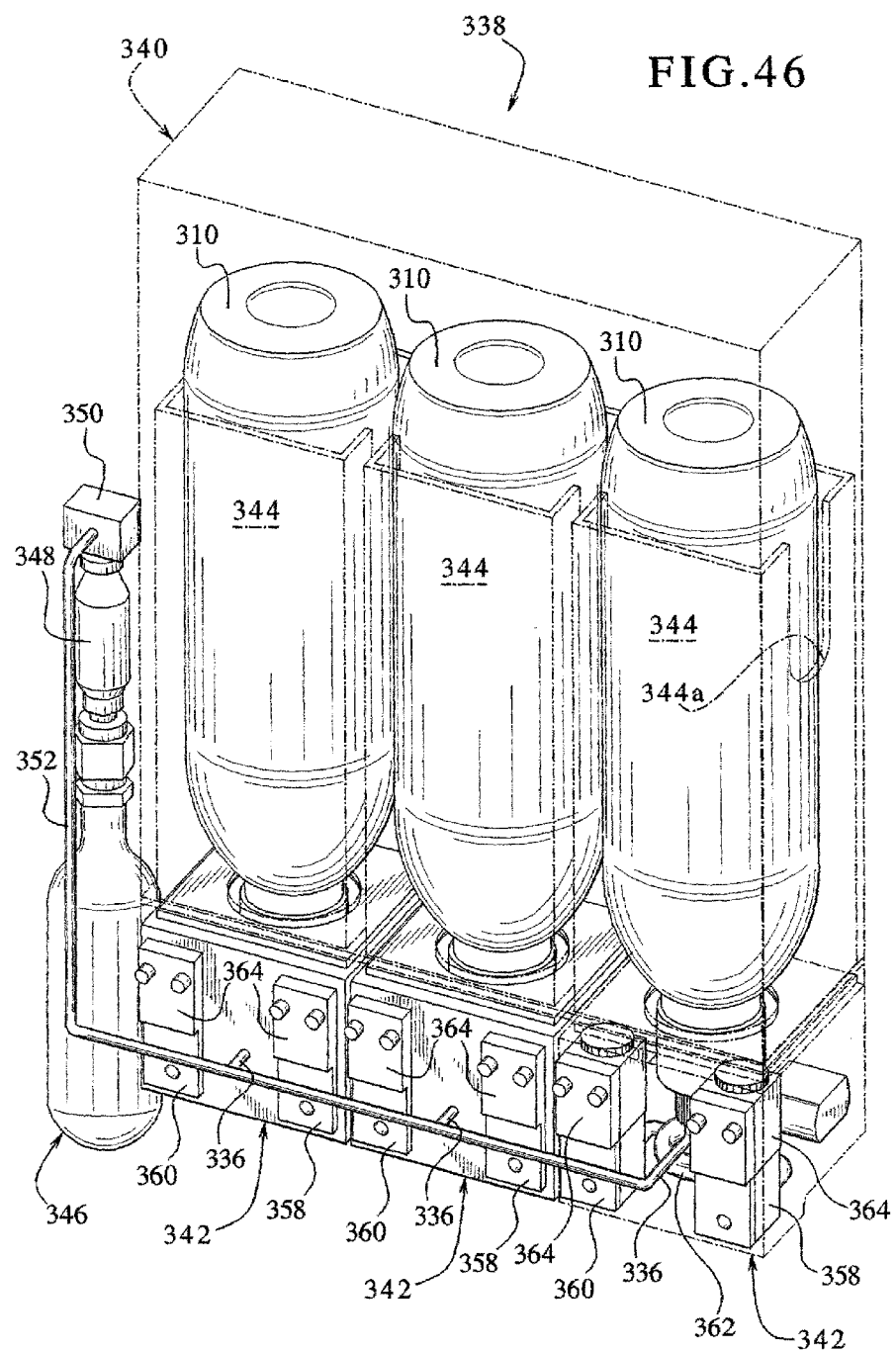
FIG. 46 is a rear perspective view of the drink supply canisters mounted in the drink supply canister holder and gas supply canister of one embodiment of the beverage dispenser of the present invention.
Figure 47:
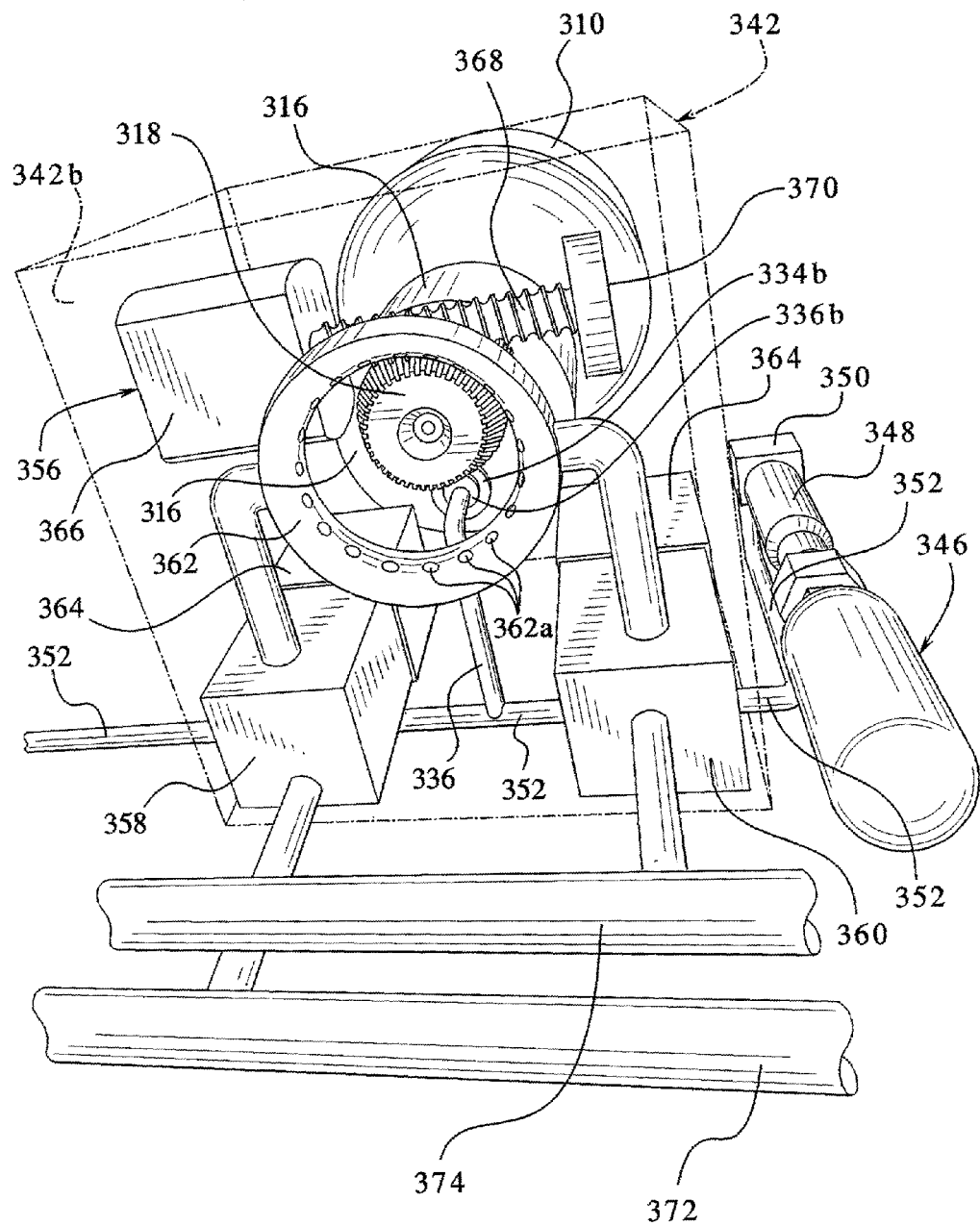
FIG. 47 is a bottom perspective of a drink supply canister inserted in one compartment of the drink supply canister holder of one embodiment of the beverage dispenser of the present invention.
Figure 48:
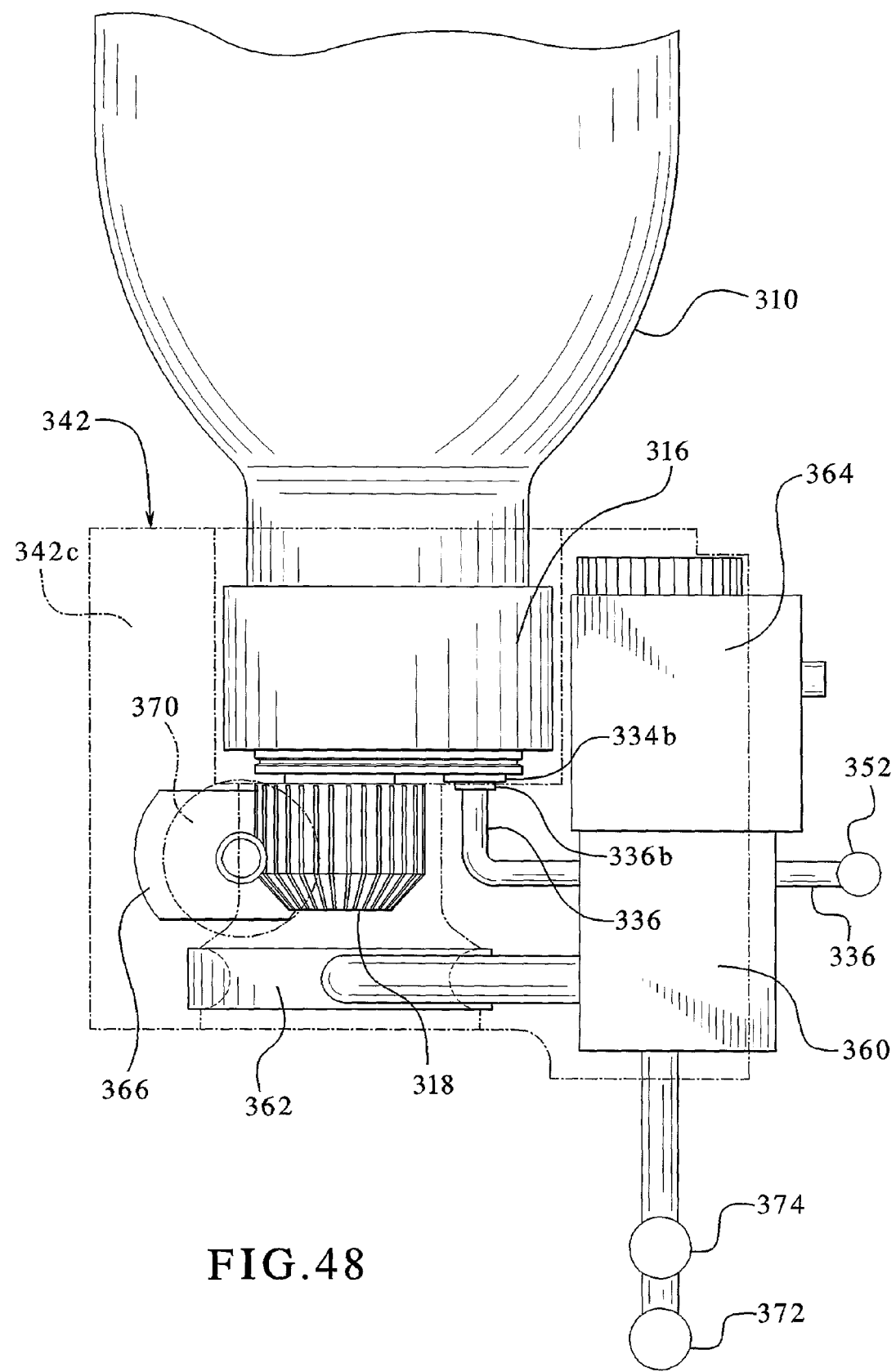
FIG. 48 is a fragmentary side view of a drink supply canister in one compartment of the drink supply canister holder in one embodiment of the present invention.

In any case, the drink supply outlet valve 318 is moveable between a closed position illustrated in FIGS. 38, 39A, 39B, 41A and 41B and an open position illustrated in FIGS. 41C and 41D which facilitates the flow of drink supply from the drink supply canister 310. The gas inlet valve 320 includes a closed state or position illustrated in FIGS. 38, 39A, 39B, 39D, 41A, 41C, 42A and 42B and an open position illustrated in FIGS. 43A and 43B which facilitates the flow of pressurized gas into the drink supply canister 310. The cover 322 guards and protects the drink supply outlet valve 318 and gas inlet valve 320 during shipping and handling, and is removed from the multi-valve support 316 prior to placement of the drink supply canister in the drink supply canister holder, as described below.

Referring to FIGS. 39A to 41D, the drink supply outlet valve 318 includes a director 324 and a closure member 326. In this embodiment, director 324 is integrally formed in the valve support member 316c. The director 324 is a member such as a spout which directs the flow of drink supply from the drink supply canister 310. The director 324 also co-acts with closure member 326 as described below. The director 324 has an inner surface 324a which directs the flow of drink supply from the drink supply canister 310, a sealing member 324b connected to the inner surface 324a and an outer threaded surface 324c. As described below, the outer threaded surface 324c enables the sealing member 324b of the director 324 to co-act with the closure member 326.

Sealing member 324b is rigidly connected to the inner surface 324a of the director 324 by support members 328. The support members 328 mount the sealing member 324b to the director 324, and the support members 328 also define a plurality of passageways or openings through which drink supply can flow. The sealing member 324b preferably includes a sealing surface 324d which, depending upon the position of the closure member 326, can seal or unseal the opening in the closure member 326 which is described below. In another embodiment (not shown), sealing member 324b does not include sealing surface 324d. In such embodiment, the sealing member has a flat or other suitably shaped upper sealing surface which can seal and unseal the opening in the closure member 326 by engaging the skirt or wall 326c of the closure member which is described below.

The closure member 326 of drink supply outlet valve 318 is adapted to engage and disengage director 324. Closure member 326 is preferably a rotatable engaging member, such as a rotatable sleeve. When director 324 and closure member 326 engage, the drink supply outlet valve 318 is closed and drink supply does not flow through the drink supply outlet valve 318. When director 324 and closure member 326 disengage, the drink supply outlet valve 318 is open, and drink supply flows through the drink supply outlet valve 318.

In the illustrated embodiment, the closure member 326 includes an inner threaded surface 326a, an outer surface 326b and a skirt or wall 326c which defines an opening through which drink supply can flow. When director 324 is engaged with closure member 326, the sealing surface 324d of the sealing member 324b seals the opening defined by wall 326c, which prevents drink supply from flowing from the drink supply canister 310. When director 324 and closure member 326 disengage, the opening defined by wall 326c is not sealed, and drink supply flows from the drink supply canister 310.

In one embodiment, sealing member 324b is a dome-shaped rod having a diameter greater than the diameter of the opening defined by wall 326c. When this larger sized rod engages the opening, the opening is obstructed or blocked, preventing the flow of drink supply from the drink supply container 310. When rotatable closure member 326 is rotated to a particular location relative to the fixed director 324, the drink supply outlet valve is open, as best illustrated in FIGS. 41C and 41D. When rotatable closure member 326 is rotated to a different location relative to the fixed director 324, the drink supply outlet valve is closed, as best illustrated in FIGS. 41A and 41B.

Closure member 326 also includes a plurality of teeth or gears 326d formed on its outer surface 326b. As described below, when the drink supply canister 310 is mounted in the drink supply canister holder, a drink supply outlet valve actuator engages the teeth or gears 326d and rotates closure member 326 clockwise or counterclockwise, thereby controlling the flow of drink supply from the drink supply canister 310.

The gas inlet valve 320, also mounted to the valve support member 316c, includes a securing member 330 which connects and secures the gas inlet valve 320 to the valve support member 316c. The gas inlet valve 320 also includes a body 332 defining a pocket or cavity and at least one, and preferably a plurality of flexible finger members, flaps or walls 334 connected to the body 332. The flexible finger members, flaps or walls 334 can also be included in the body 332, for example as separate portions of the body 332 integrally formed therein. In one embodiment (not shown), the gas inlet valve includes a body defining two walls formed by a single slit or cut in the body of the gas inlet valve. In another embodiment (not shown), the gas inlet valve includes a body defining one cylindrical wall preferably formed by lancing or poking the body of the gas inlet valve.

Each wall 334 has an inner surface 334a, an outer surface 334b and one or more edges 334c. The walls 334 and edges 334c are biased toward each other by the natural resiliency of the wall material. The inner surfaces 334a are constructed to withstand the gas pressure applied by the gas suppler, described below. The outer surface 334b are constructed to withstand the gas pressure applied by the gas pressure inside the drink supply canister 310. The differences, if any, between the pressures applied to the inner surface 334a and the outer surface 334b determines whether or not the gas inlet valve 320 will open, as described below.

The walls 334, and particularly the edges 334a of the walls 334, are constructed and formed in such a manner that the walls 334 and edges 334a are predisposed and biased to engage one another. When the edges 334a engage one another, this forms a seal which prevents gas from flowing out of the gas inlet valve 320. In one embodiment, the gas inlet valve 320 is constructed through molding of a thermoplastic elastomer (TPE) material, and after the gas inlet valve 320 is molded, the walls 334 are constructed by making a plurality of cuts or slits in the body 332 of the gas inlet valve 320. It should be appreciated however, that gas inlet valve 320 can be constructed of any suitable resiliently flexible material, such as silicon rubber, and the walls 334 can have any suitable shape and any suitable number of edges.

The body 332 of the gas inlet valve 320 defines a pressurizable reservoir or cavity for containing the gas provided by the gas supplier which is described below. When the gas pressure in this cavity exceeds the gas pressure in the drink supply canister 310, the pressure applied to the inner surface 324a causes the walls 334 to bend or flex outwardly. When they flex outwardly, the edges 334c disengage one another, forming an opening. Gas then flows from the gas supplier into the drink supply canister 310. It should be appreciated that the walls 334, alone or in conjunction with the body 332, can define the pressurizable reservoir or cavity for containing the gas provided by the gas supplier.

The edges 334 remain disengaged and the gas inlet valve 320 remains open until the gas pressure in the drink supply container 310 increases to a pressure level which is equal to or greater than the pressure level in the cavity of the gas inlet valve 320. At that point, the gas pressure in the drink supply container 310 applied to the outer surface 326b of the gas inlet valve 320 causes the walls 334 to bend or flex inwardly until the edges 334c engage each other, thereby closing the gas inlet valve 320.

The securing member 330 of the gas inlet valve 320 secures and attaches the gas inlet valve 320 to the valve support member 316c of the multi-valve support 316. Also, as described below, the securing member co-acts with a gas conduit which supplies gas to the gas inlet valve 320. The securing member 330 includes an outer member 330a which prevents the gas inlet valve 320 from sliding into the drink supply canister 310, and the gas inlet valve 320 includes an inner member 330b which prevents the gas inlet valve from sliding out of the drink supply canister 310. The securing member 330 functions as a locking member which, through the outer member 330a and the inner member 330b, locks the gas inlet valve 320 to the valve support member 316c of the multi-valve support 316.

Also, the securing member 330 defines an opening which receives gas conduit 336. In one embodiment, the opening in securing member 330 is equal to or slightly smaller in diameter than the diameter of the gas conduit 336. Here, the diameter of the opening relative to the gas conduit 336 causes a seal to form at the opening when the gas inlet valve 320 is forced onto the gas conduit 336. It is preferable that gas inlet valve 320 is adapted to be connected to gas conduit 336 through a removable, press-fit connection.

To facilitate such a removable connection, in one embodiment, the outer member 330a includes a bevel edge (not shown) which defines the opening for receiving the gas inlet valve. The beveled edge facilitates the direction of the gas inlet valve 330 onto the gas conduit 336. It should be appreciated that in other embodiments the securing member 330 can include any alternate suitable member or members which secure the gas inlet valve 320 to the multi-valve support 316 and which enable the gas inlet valve 320 to be removably inserted into the gas conduit 336.

It should also be appreciated that drink supply canister 310 can include any suitable gas inlet valve other than gas inlet valve 320, such as any suitable resealable valve. Preferably, the gas inlet valve enables gas conduit 336 to be connected to and disconnected from the gas inlet valve through a push-pull action or sliding action.

As described earlier, during the operation of the beverage dispensing apparatus of the present invention, the volume of drink supply in the drink supply canister steadily decreases. With the drink supply canister inverted, the drink supply produces a head pressure or pressure at the drink supply outlet valve. This pressure begins at a maximum level when the drink supply canister is full and steadily decreases as the volume of drink supply flows from the drink supply outlet valve.

The gas inlet valve 320 enables the beverage dispensing apparatus of the present invention to offset this decrease in pressure and maintain a relatively constant, predetermined pressure inside the drink supply canister 310. The presence of this constant pressure inside drink supply canister 310 facilities control over the quantity of drink supply provided for each mixed beverage. Also, such constant pressure generally facilitates the overall quality control over the beverage production process.

The drink supply canister of this embodiment both distributes drink supply and receives a gas supply all at one end of the drink supply canister. The drink supply canister includes a drink supply outlet valve which can be rotatably opened and closed by a drink supply outlet valve actuator. The drink supply canister also includes a resealable gas inlet valve which opens and closes based in part upon the internal gas pressure in the drink supply canister. The gas inlet valve includes a plurality of flexible walls which are biased toward each other. When the gas pressure in the drink supply canister falls below a certain level, the walls outwardly flex forming an opening for the supply of gas to the drink supply canister. Once the gas pressure in the drink supply canister is increased to a certain level, the walls flex inwardly and engage each other, stopping the supply of gas to the drink supply canister. This gas inlet valve enables the gas supplier to maintain a substantially constant gas pressure inside the drink supply canister even though the gas inlet valve does not include an electronic actuator or any other electronic parts.

Referring now to FIGS. 44A to 50, the drink supply canister frame or holder 338 of this embodiment includes a frame 340 for connecting multiple housings 342 together, and separate compartments 344 for holding each drink supply canister 310. Each housing 342 receives the valve assembly member 314 and also houses several components, including the drink supply valve actuator, water valve actuator, carbonated water valve, non-carbonated water valve and water dispenser, all of which are described below. Each housing 342 includes a drink supply canister support wall or member 342a which defines an opening for receiving valve assembly member 314, a base wall or member 342b which is mounted to a substantially horizontal surface inside a refrigerator and retaining walls or members 342c which fully enclose the drink supply outlet valve 318, drink supply valve actuator and other components, preventing these moving components from coming into contact with other parts of the beverage dispenser or parts of the refrigerator or refrigeration device in which the beverage dispenser is installed. In one embodiment, the drink supply canister support wall or member 342a includes a plurality of circular walls which guide the proper insertion of the drink supply canister 310 in the housing 342.

In the illustrated embodiment, each compartment 344 is pivotally connected to a housing 372 which facilitates a user's insertion and removal of drink supply canisters 310. Each compartment 344 has at least one side wall 344a which defines a slot. The slot assists users in inserting a drink supply canister 310 into the compartment 344. Also, each compartment 344 includes front and back walls 344b and a lower wall (not shown) which defines an opening for receiving valve assembly member 314. A user can outwardly tilt a compartment 344, insert a drink supply canister 310 and inwardly tilt the compartment 344. In doing so, the valve assembly member 314 is inserted into housing 342, and the gas inlet valve 320 of the drink supply canister 310 is forced or directed onto the gas conduit 336.

In one embodiment, the lower wall of the compartment 344 includes a plurality of circular walls which guide the proper insertion of the drink supply canister 310 in the compartment 344. It should be appreciated that the drink supply canister holder of the present invention can include any suitable compartments other than compartments 344. For example, in other embodiments, the compartments can have any suitable shape, including a cylindrical shape, and the compartments need not be pivotable.

In the illustrated embodiment, the gas conduit 336 includes a body 336a and a stopping member 336b. Stopping member 336b ensures that a predetermined portion of the body 336a extends into the gas inlet valve 320 when a user installs the gas supply canister 310 into the drink supply canister holder 338. In one embodiment, the body 336a has a bevel-shaped or dome-shaped end which facilitates the insertion of the gas inlet valve 320 onto the gas conduit 336. In another embodiment, the gas conduit 336 is supported by one or more support members (not shown) which prevent the gas conduit from moving or bending when the drink supply canister 310 is installed in the drink supply canister holder 338. Such support member or members rigidly connect the gas conduit 336 to the housing 342.

In this embodiment, gas conduit 336 delivers gas which is provided from a gas supply canister 346. Gas supply canister 346 is connected to a gas pressure regulator 348 which is connected to an on/off gas valve 350. The gas valve 350 is connected to a gas line 352 which is connected to a plurality of gas conduits 336, one for each of the drink supply canisters 310. The gas pressure regulator 348 maintains the gas pressure in the gas line 352 at a substantially constant predetermined pressure. The gas valve 350 controls whether or not gas flows through the gas line 352 and to the gas conduits 336. Though in this embodiment the gas supplier includes a gas supply canister, it should be appreciated that in other embodiments the gas can be provided to the drink supply canisters by any alternate suitable gas supplier.

When a user installs the drink supply canister 310 in the beverage dispensing apparatus of the present invention, the gas inlet valve 320 of the drink supply canister 310 is directed onto the gas conduit 336. After the user installs the drink supply canister 310, a controller (not shown) causes the gas valve 350 to open which causes gas to flow through gas line 352 and to gas conduit 336. Gas then flows into the gas inlet valve 320. As described above, whenever the pressure level inside the drink supply canister 310 deviates from the pressure level in the gas line 352 to a certain degree, the gas inlet valve 320 opens for a length of time. The gas inlet valve 320 closes when the two pressure levels in the gas line 352 and drink supply canister 310 are substantially the same. Therefore, by setting the pressure level in the gas line 352 to a desired level (using the gas pressure regulator 348), the pressure level in the drink supply canister 310 is also set to that desired pressure level.

Housing 342 houses a drink supply valve actuator 356 which actuates the drink supply outlet valve 318, a carbonated water valve 358 and a non-carbonated water valve 360 (both of which are connected to a water dispenser 362), and two water valve actuators 364 which separately actuate the carbonated water valve 358 and the non-carbonated water valve 360. The drink supply valve actuator 356 actuates the drink supply outlet valve 318, causing the drink supply outlet valve 318 to open and close in response to beverage requests as described above. In one embodiment, the drink supply valve actuator 356 includes a motor 366 coupled to a worm gear 368 which is adapted to engage the outer surface 326b of the closure member 326. Specifically, the worm gear 368 mates with the teeth 326d of the closure member 326, causing the closure member 326 to rotate to the open or closed positions.

A stop member 370 is connected to the end of the worm gear 368, preferably to guide the free end and to prevent the free end of the gear from engaging other components within the housing 342 when the worm gear 368 is rotating. Stop member 370 is preferably shaped as a disk, though stop member 370 can have any suitable shape. Depending upon which electrical signal the controller sends to motor 366, drink supply valve actuator 356 can open or close drink supply outlet valve 318 by driving and rotating worm gear 368 a predetermined amount or for a predetermine length of time in a clockwise or counterclockwise direction.

Each of the water valve actuators 364 are connected to the carbonated water valves 358 and the non-carbonated water valves 360. The water valve actuators 364 control the opening and closing of these valves which controls the flow of carbonated and non-carbonated water to the water dispenser 362. Carbonated water is supplied to each carbonated water valve 358 through the carbonated water line 372. Non-carbonated water is supplied to each non-carbonated water valve 360 through non-carbonated water line 374. The carbonated water valve 358 and non-carbonated water valve 360 are both connected to the water dispenser 362 for distributing water through the water dispenser 362 into a beverage collector.

In one embodiment, the water dispenser 362 is a water ring having a plurality of openings or orifices 362a as described above. Depending upon which signal the controller sends, the water valve actuators 364 can cause carbonated water or non-carbonated water to flow into the water dispenser 362. The water (carbonated or non-carbonated) which flows into water dispenser 362, flows out of orifices 362a, into the drink supply stream 376 and into the beverage collector 378.

Figure 49:
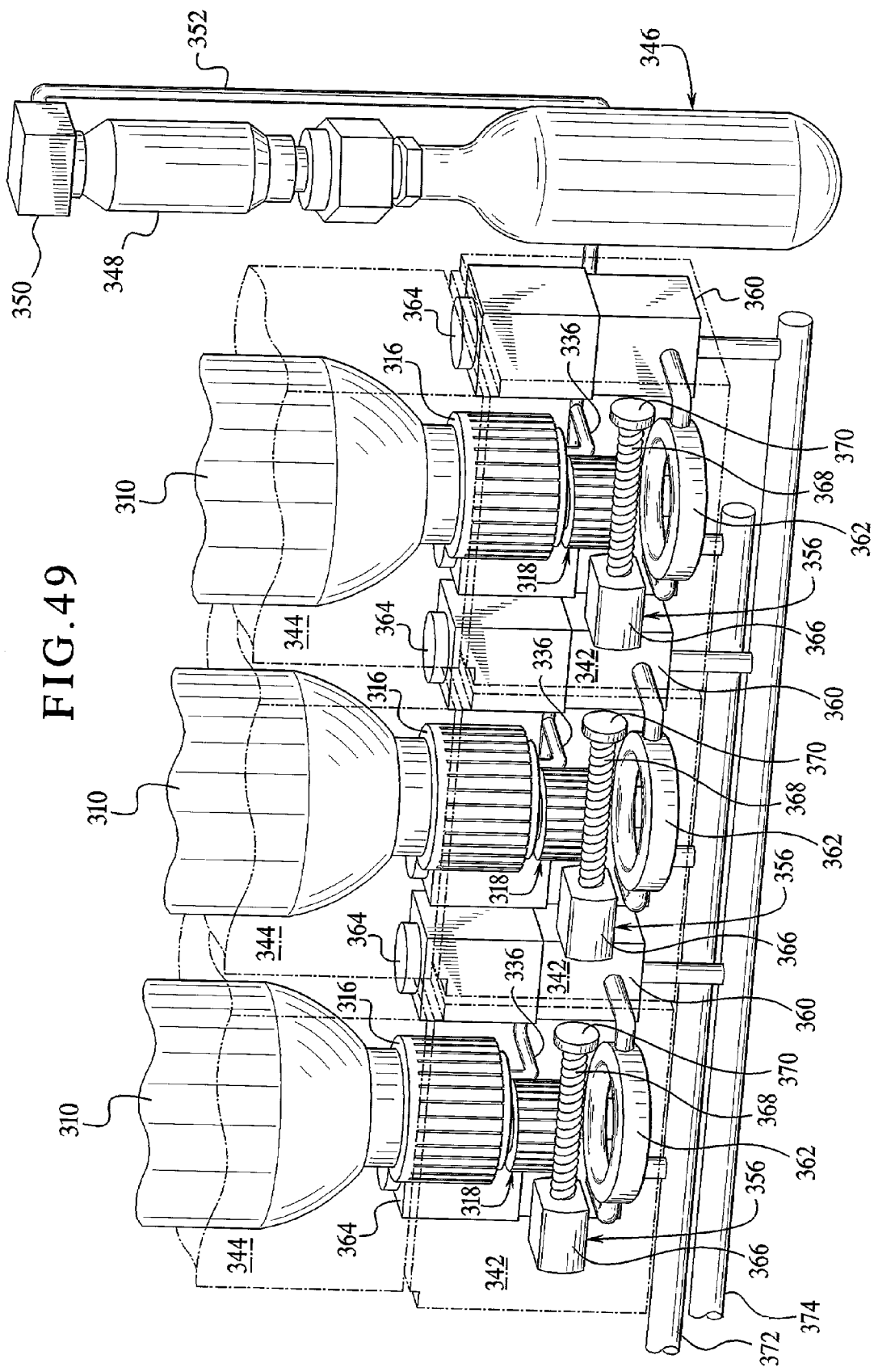
FIG. 49 is a fragmentary side perspective view of the drink supply canisters mounted in the drink supply canister holder illustrating the drink supply outlet valve in a closed position.
Figure 50:
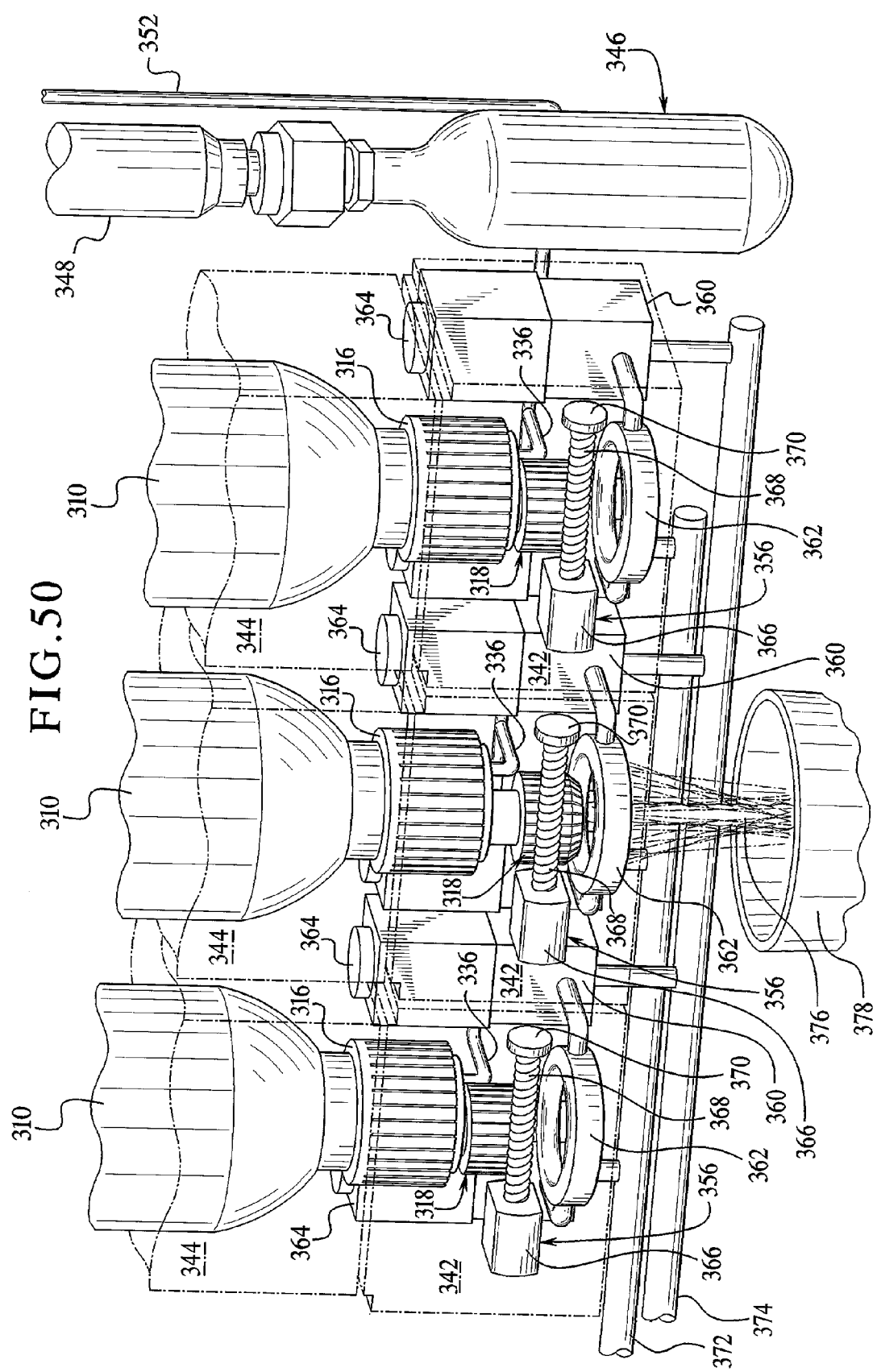
FIG. 50 is a fragmentary side perspective view of the drink supply canisters mounted in the drink supply canister holder illustrating a worm gear having opened a drink supply outlet valve and further illustrating the flow of drink supply and water to a beverage collector.

With reference to FIG. 49, when worm gear 368 has rotated the closure member 326 of the drink supply outlet valve 318 a certain amount in one direction, the closure member 326 rotates and engages director 324. At this position, drink supply outlet valve 318 is closed, preventing the flow of drink supply from the drink supply canister 310. With reference to FIG. 50, when worm gear 368 has rotated the closure member 326 of the drink supply outlet valve 318 a certain amount in the opposite direction, the closure member 326 rotates and disengage the seal with the director 324. At this position, the drink supply outlet valve 318 is open, causing drink supply to flow from the drink supply canister 310 and through the center of the water dispenser 362. Simultaneously, the controller causes the water valve actuators 364 to open the carbonated water valve 358 or non-carbonated water valve 360, distributing water (carbonated or non-carbonated) into the water dispenser 362. The carbonated or non-carbonated water flows out of the orifices 362a, preferably combines with the drink supply stream 376 and flows into the beverage collector 378.

The drink supply canister holder, in this embodiment, enables a user to conveniently install and remove drink supply canisters in the beverage dispensing apparatus of the present invention. By outwardly tilting a compartment, the user can insert a drink supply canister into the compartment. When the user inwardly tilts the compartment, the user causes a gas conduit to be connected to the drink supply canister. The gas conduit connects to the gas inlet valve of the drink supply canister. The operation of the gas inlet valve maintains a substantially constant predetermined pressure inside the drink supply canister. When a user pushes a beverage requester, a drink supply valve actuator actuates the drink supply outlet valve, causing the closure member of the drink supply outlet valve to rotate. This rotation causes drink supply to flow from the drink supply canister through the center of the water dispenser and into the beverage collector. The drink supply combines with the water, as described above, and the beverage is then ready for consumption.

As the user consumes drink supply from time to time, the volume of drink supply in the drink supply canister decreases. Though the volume of drink supply decreases, the gas pressure inside the drink supply canister is substantially constant because the gas inlet valve causes gas to flow into the drink supply canister whenever the internal pressure of the drink supply canister falls below a predetermined pressure level. This type of drink supply canister and drink supply canister holder is advantageous because it is reliable, robust and relatively simple to operate and maintain.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention claimed is:

1. A drink supply canister for a beverage dispensing apparatus of a refrigeration device, said refrigeration device having a source of pressurized gas, said source having a gas supply line connected to said source, said drink supply canister comprising:
   a body having a first end, a second end and a liquid-holding space located between the first end and the second end, the body configured to be mounted in a portion of the refrigeration device such that the first end is located vertically below the second end;
   a cap connected to the first end, the cap having an end portion and a side wall extending from the end portion, the cap defining a plurality of openings, each one of the openings being in fluid communication with the liquid-holding space;
   a gas inlet valve mounted to the end portion of the cap adjacent to, and in communication with, one of the openings, the gas inlet valve having a portion sized and shaped to sealingly engage with said supply line such that said gas inlet valve is predisposed to have a closed condition which is changeable to an open position condition in response to the gas inlet valve being fluidly connected to said gas supply line of said source of pressurized gas; and
   a drink supply outlet valve mounted to the end portion of the cap adjacent to, and in communication with, another one of the openings, the drink supply outlet valve having a rotatable outer part, the rotatable outer part having a substantially cylindrical exterior surface including a plurality of engagement members disposed substantially about a perimeter of the exterior surface, the engagement members being engagable by an actuator member, the drink supply outlet valve being operable to output a portion of a liquid contained in the liquid-holding space as a result of: (i) the drink supply outlet valve being opened; (ii) the gas inlet valve being opened; and (iii) pressurized gas from the source applying a pressure to the liquid in the liquid-holding space.

2. The drink supply canister of claim 1, wherein the cap includes a removable valve assembly member connected to said first end, said removable valve assembly member including a multi-valve support, wherein said gas inlet valve and said drink supply outlet valve are each connected to said multi-valve support.

3. The drink supply canister of claim 1, wherein the gas inlet valve is a resealable valve.

4. The drink supply canister of claim 1, wherein the gas inlet valve has at least one biasing member predisposing the gas inlet valve to have the closed position.

5. The drink supply canister of claim 1, wherein the gas inlet valve includes at least one flexible wall which forms said open position and said closed position.

6. The drink supply canister of claim 1, wherein the gas inlet valve includes a plurality of flexible walls which form said open position and said closed position.

7. The drink supply canister of claim 2, wherein the gas inlet valve includes a securing member which attaches the gas inlet valve to the multi-valve support.

8. The drink supply canister of claim 7, wherein the securing member includes a locking member which affixes the gas inlet valve to a portion of the multi-valve support.

9. The drink supply canister of claim 7, wherein the gas inlet valve includes a body defining a pressurizable cavity.

10. The drink supply canister of claim 9, wherein the gas inlet valve includes a plurality of flexible walls connected to the body.

11. The drink supply canister of claim 10, wherein each of the flexible walls includes a plurality of edges.

12. The drink supply canister of claim 11, wherein the flexible walls have a shape which causes the edges to be biased toward each other.

13. The drink supply canister of claim 11, wherein the flexible walls are made of a resilient material which causes the edges to be biased toward each other.

14. The drink supply canister of claim 1, wherein the drink supply outlet valve has an open position and a closed position.

15. The drink supply canister of claim 14, wherein the drink supply outlet valve includes a first engaging member and a second engaging member which co-act to form said open position and said closed position.

16. The drink supply canister of claim 15, wherein the first engaging member includes a director which directs drink supply from the drink supply canister.

17. The drink supply canister of claim 15, wherein the second engaging member includes a movable closure member which moves relative to the first engaging member to form said open position and said closed position.

18. The drink supply canister of claim 15, wherein the second engaging member includes a rotatable closure member adapted to be rotated by a drink supply outlet valve actuator.

19. The drink supply canister of claim 15, wherein one of the first engaging member and second engaging member includes a sealing member adapted to engage the other engaging member to form a seal.

20. A drink supply canister for a beverage dispensing apparatus of a refrigeration device, said refrigeration device having a source of pressurized gas, said source having a gas supply line connected to said source, the drink supply canister comprising:

a body having a first end, a second end and a liquid-holding space located between the first end and the second end, the body configured to be held by a portion of the refrigeration device such that the first end is located vertically below the second end, the first end having a mount surface and a wall connecting the mount surface to the body, the mount surface defining a plurality of openings, each one of the openings being in fluid communication with the liquid-holding space;

a gas inlet valve mounted to the mount surface of the first end adjacent to, and in communication with, one of the openings, the gas inlet valve having at least one flexible wall, a portion of which wall being sized and shaped to sealingly engage with said supply line such that said flexible wall is flexible between: (i) a first position forming a seal; and (ii) a second position defining a passageway, the flexible wall being predisposed to have a first closed condition, the first condition changeable to a second open condition in response to the gas inlet valve being fluidly connected to said gas supply line of said source of pressurized gas, and a drink supply outlet valve mounted to the mount surface of said first end adjacent to, and in communication with, another one of the openings, the drink supply outlet valve having a rotatable outer member, the rotatable outer member having a substantially cylindrical exterior surface including a plurality of engagement members disposed substantially about a perimeter of the exterior surface, the engagement members being engagable by an actuator member, the drink supply outlet valve being operable to output a portion of a liquid contained in the liquid-holding space as a result of: (i) the drink supply outlet valve being opened; (ii) the gas inlet valve being opened; and (iii) pressurized gas of the source applying a pressure to the liquid in the liquid-holding space.

21. The drink supply canister of claim 20, wherein the gas inlet valve has a pressurizable body defined by the at least one flexible wall.

22. The drink supply canister of claim 20, wherein the gas inlet valve has a plurality of flexible walls which form said first position and said second position.

23. The drink supply canister of claim 20, which includes a removable valve assembly member connected to said first end, said removable valve assembly including a multi-valve support, said gas inlet valve and said drink supply outlet valve each connected to said multi-valve support.

24. The drink supply canister of claim 23, wherein the gas inlet valve includes a securing member which attaches the gas inlet valve to the multi-valve support.

25. The drink supply canister of claim 23, wherein the securing member includes a locking member which affixes the gas inlet valve to a portion of the multi-valve support.

26. The drink supply canister of claim 22, wherein each of the walls includes a plurality of edges.

27. The drink supply canister of claim 26, wherein the flexible walls have a predetermined shape which causes the edges to be biased toward each other.

28. The drink supply canister of claim 26, wherein the flexible walls are made of a resilient material which causes the edges to be biased toward each other.

29. A drink supply canister for a beverage dispensing apparatus of a refrigeration device, said refrigeration device having a source of pressurized gas, said source having a gas supply line connected to said source, the drink supply canister comprising:

a body having a first end, a second end and a liquid-holding space located between the first end and the second end, the body configured to be held by a portion of the refrigeration device such that the first end is located vertically below the second end, the first end having a mount surface and a wall connecting the mount surface to the body, the mount surface defining a plurality of openings, each one of the openings being in fluid communication with the liquid-holding space;

a gas inlet valve mounted to the mount surface of the first end adjacent to, and in communication with, one of the openings, the gas inlet valve having a portion sized and shaped to sealingly engage with said supply line such that said gas inlet valve is predisposed to have a closed condition which is changeable to an open condition in response to the gas inlet valve being fluidly connected to said gas supply line of said source of pressurized gas; and a drink supply outlet valve mounted to the mount surface of the first end adjacent to, and in communication with, another one of the openings, the drink supply outlet valve having a first part and a second part, the second part being rotatably coupled to the first part, the second part having a seal portion and a plurality of engagement portions, the seal portion being movable between: (i) a predisposed first position wherein said another opening is sealed; and (ii) a second position wherein said another opening is unsealed, the engagement portions being engagable by an actuator member, the drink supply outlet valve being operable to output a portion of a liquid contained in the liquid-holding space as a result of:

(i) the drink supply outlet valve being opened;

(ii) the gas inlet valve being opened; and (iii) pressurized gas of the source applying a pressure to the liquid in the liquid-holding space.

30. The drink supply canister of claim 29, wherein the gas inlet valve includes a securing member which attaches the gas inlet valve to the mount surface of the first end.

31. The drink supply canister of claim 30, wherein the securing member includes a locking member which affixes the gas inlet valve to the mount surface of the first end.

32. The drink supply canister of claim 29, wherein the gas inlet valve includes a plurality of flexible walls, each of the flexible walls including a plurality of edges.

* * * * *

UNITED STATES PATENT AND TRADEMARK OFFICE
CERTIFICATE OF CORRECTION

| | | |
|---|---|---|
| PATENT NO. | : 7,083,071 B1 | Page 1 of 1 |
| APPLICATION NO. | : 10/137608 | |
| DATED | : August 1, 2006 | |
| INVENTOR(S) | : Crisp, III et al. | |

It is certified that error appears in the above-identified patent and that said Letters Patent is hereby corrected as shown below:

Claim 20, line 6, column 42, change "gas, and" to --gas; and--;

Claim 29, line 65, column 42, change "said supply" to --said gas supply--.

Signed and Sealed this

Sixth Day of November, 2007

JON W. DUDAS
*Director of the United States Patent and Trademark Office*